US011932297B2

(12) United States Patent
Ibarra et al.

(10) Patent No.: US 11,932,297 B2
(45) Date of Patent: *Mar. 19, 2024

(54) DOUBLE-SIDED TERMINAL BOARD FOR GRADE CROSSING GATE CONTROLLER

(71) Applicant: C.D.L. Electric Company, Inc., Pittsburg, KS (US)

(72) Inventors: Marco Antonio Ibarra, Pittsburg, KS (US); Devin Steven Sage, Pittsburg, KS (US); Michael Carmen Lawson, Pittsburg, KS (US)

(73) Assignee: C.D.L. Electric Company, Inc., Pittsburg, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/884,228

(22) Filed: Aug. 9, 2022

(65) Prior Publication Data
US 2022/0379935 A1    Dec. 1, 2022

Related U.S. Application Data

(63) Continuation of application No. 16/418,646, filed on May 21, 2019, now Pat. No. 11,414,109.

(60) Provisional application No. 62/674,412, filed on May 21, 2018.

(51) Int. Cl.
*B61L 5/06* (2006.01)
*B61L 29/02* (2006.01)
*B61L 29/04* (2006.01)
*B61L 29/08* (2006.01)
*B61L 29/22* (2006.01)
*B61L 29/28* (2006.01)
*B61L 29/30* (2006.01)
*G01B 21/22* (2006.01)

(52) U.S. Cl.
CPC ............... *B61L 5/06* (2013.01); *B61L 29/026* (2013.01); *B61L 29/04* (2013.01); *B61L 29/08* (2013.01); *B61L 29/22* (2013.01); *B61L 29/288* (2013.01); *B61L 29/30* (2013.01); *G01B 21/22* (2013.01)

(58) Field of Classification Search
CPC .......... B61L 5/06; B61L 29/02; B61L 29/026; B61L 29/04; B61L 29/22; B61L 29/288; B61L 29/30
See application file for complete search history.

(56) References Cited

U.S. PATENT DOCUMENTS 11,414,109 B2 * 8/2022 Ibarra ..................... B61L 5/06

* cited by examiner

*Primary Examiner* — Robert J McCarry, Jr.
(74) *Attorney, Agent, or Firm* — Hovey Williams LLP

(57) ABSTRACT

A crossing gate mechanism includes a gate mechanism enclosure defining an interior space, external wires located substantially outside the gate mechanism enclosure, and a terminal board positioned within the interior space of the gate mechanism enclosure. The external wires are connected to the terminal board. The terminal board is coupled to and swingable relative to the gate mechanism enclosure.

22 Claims, 36 Drawing Sheets

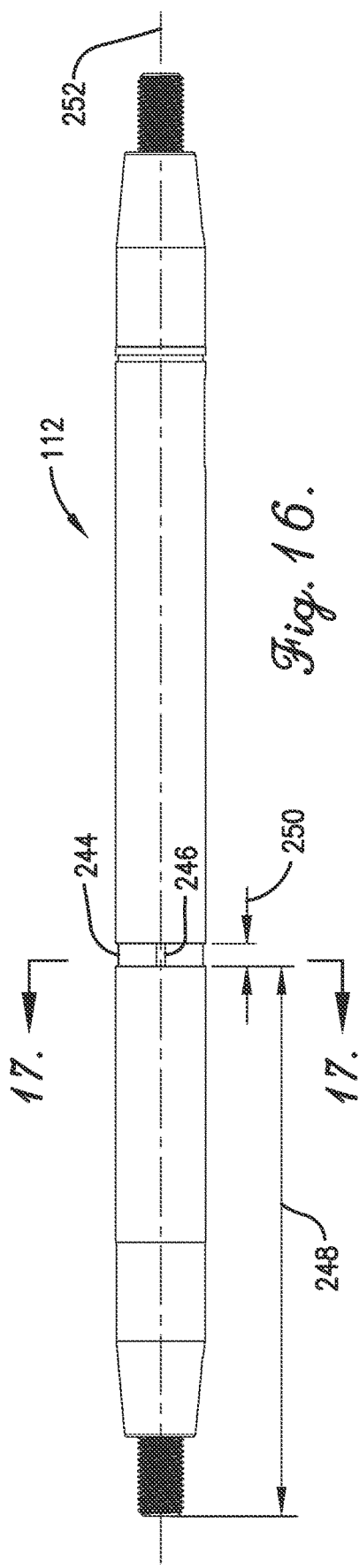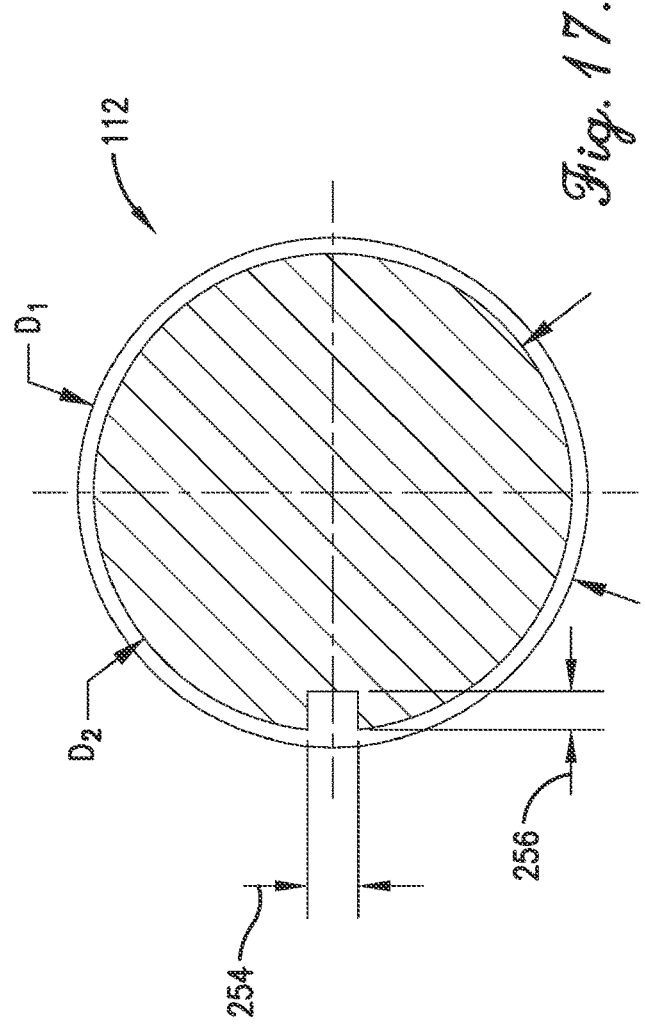

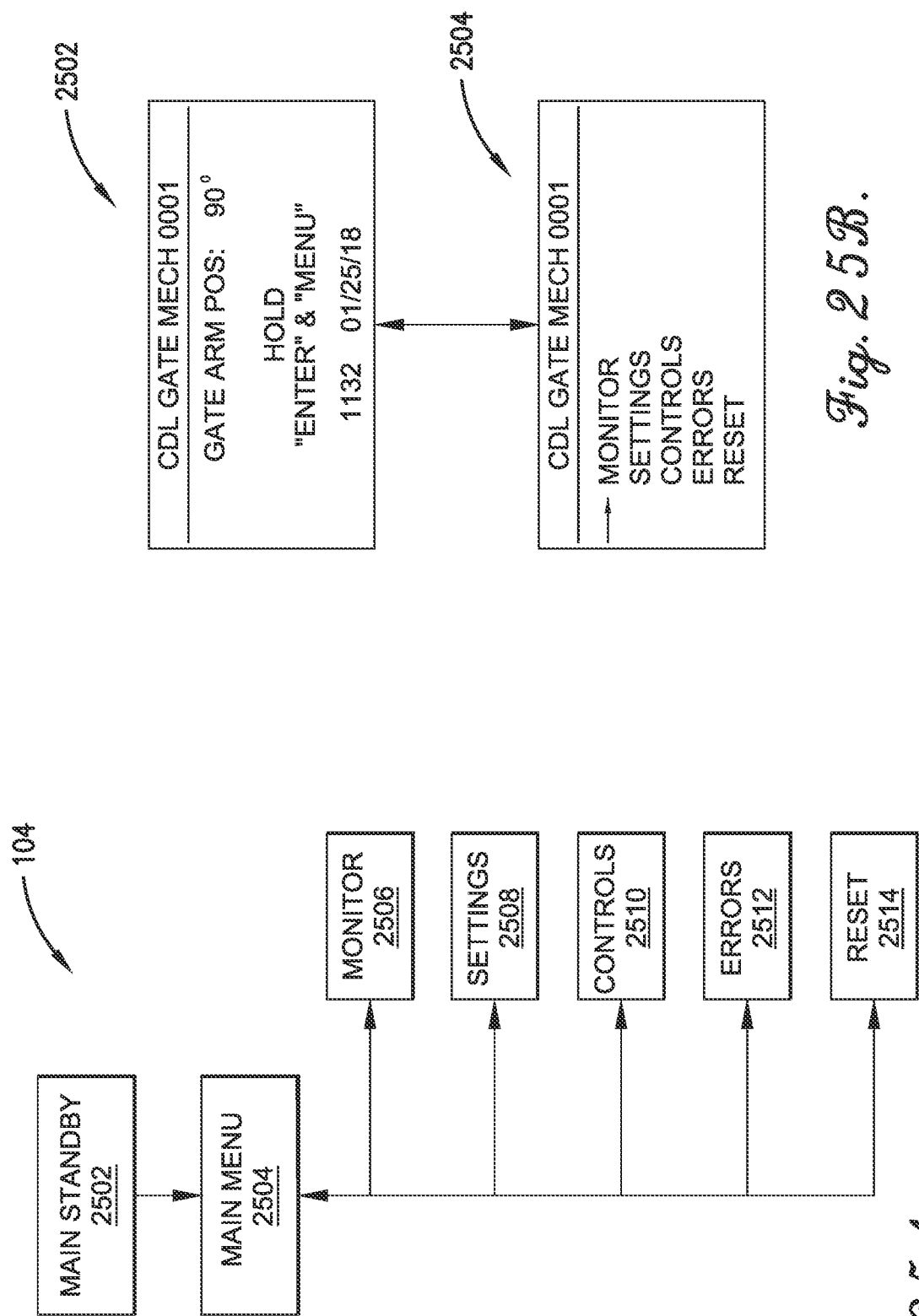

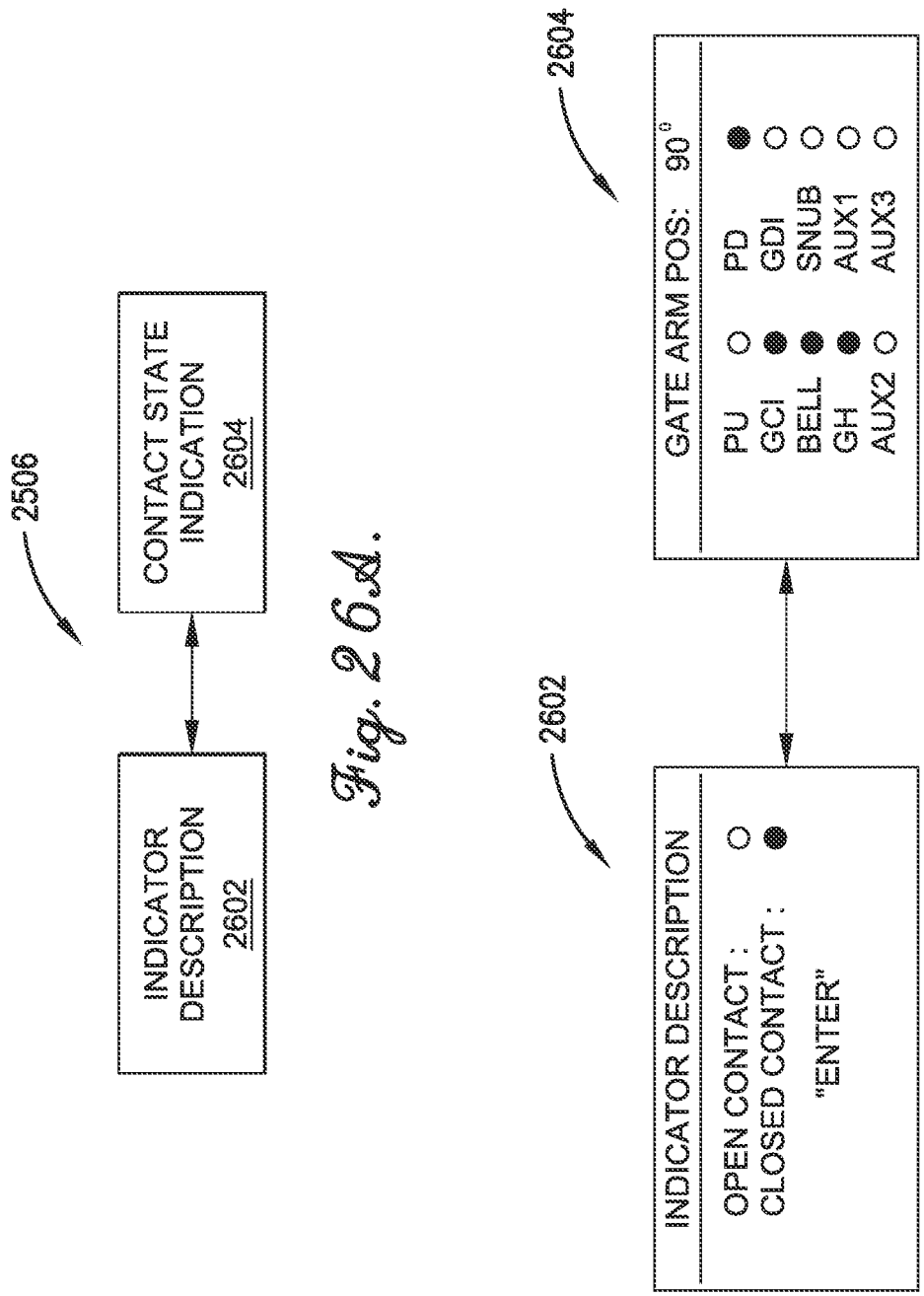

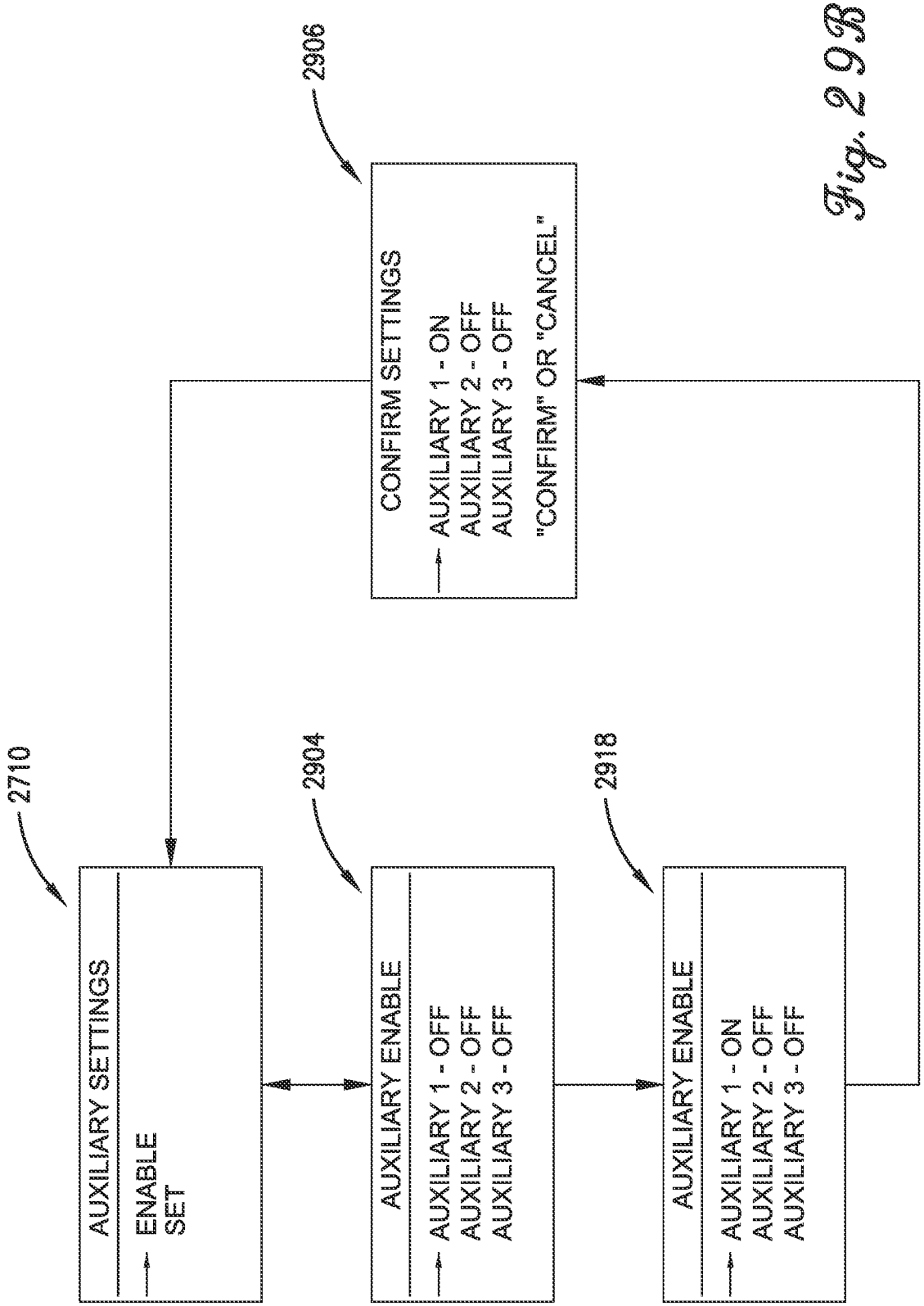

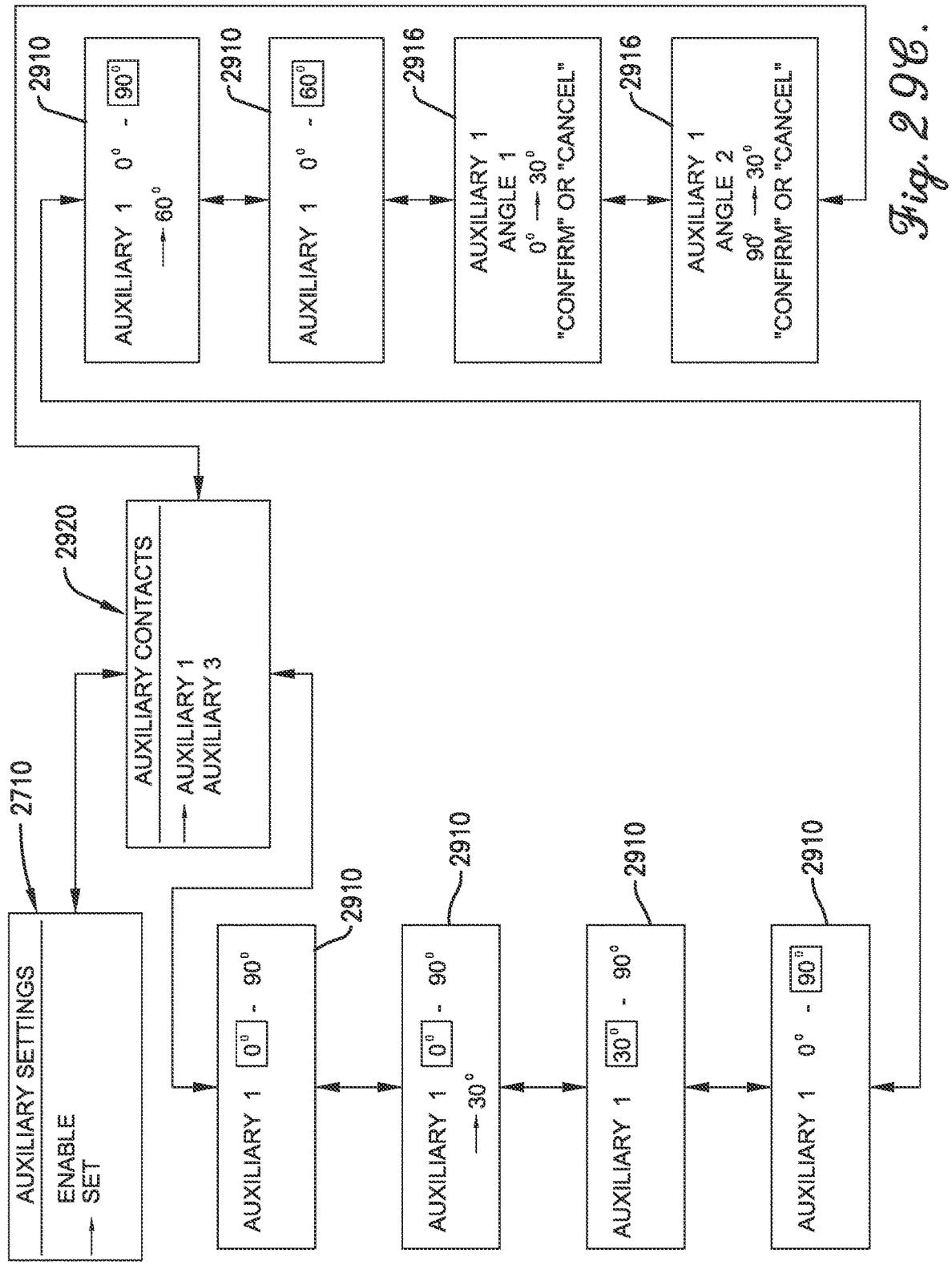

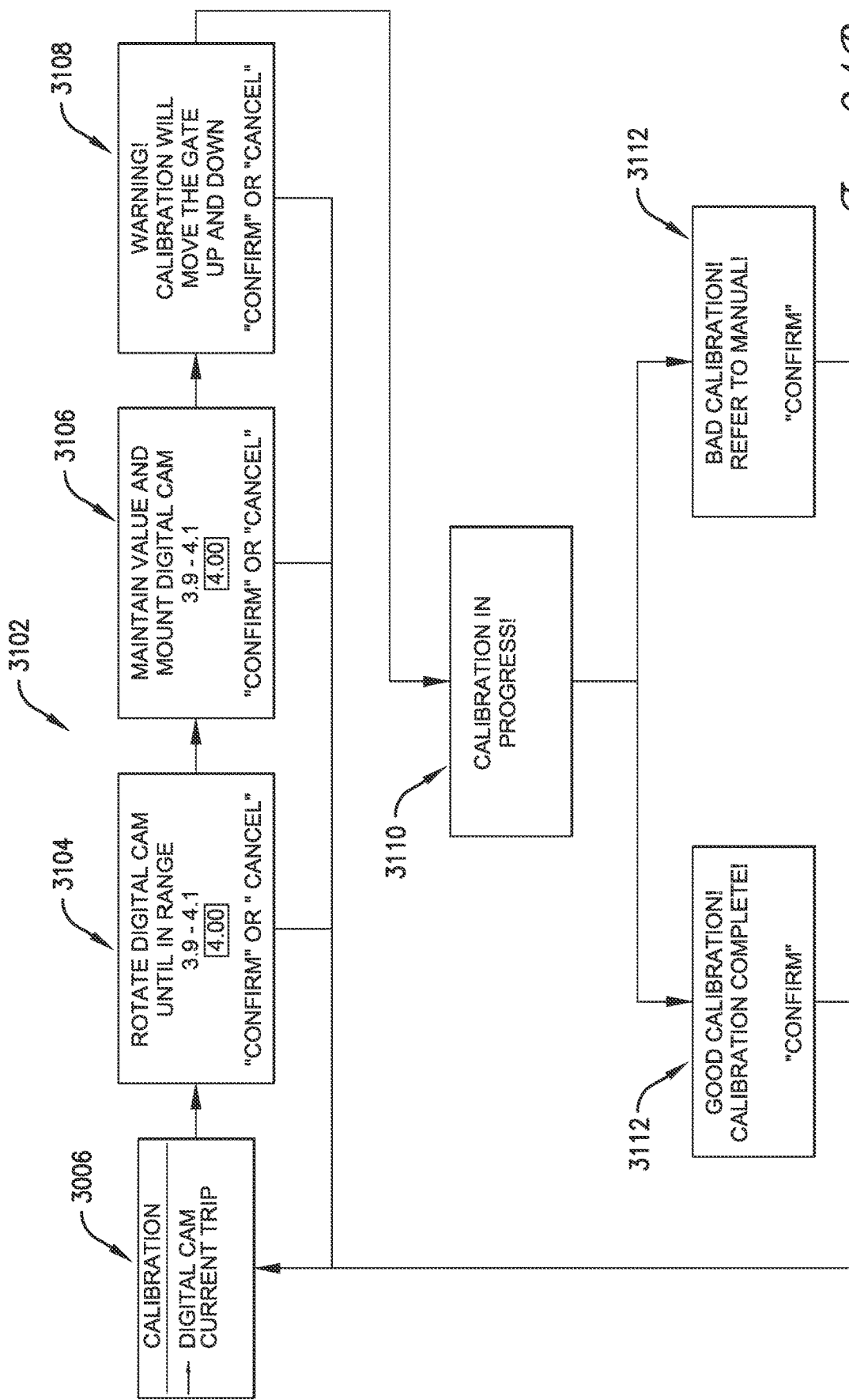

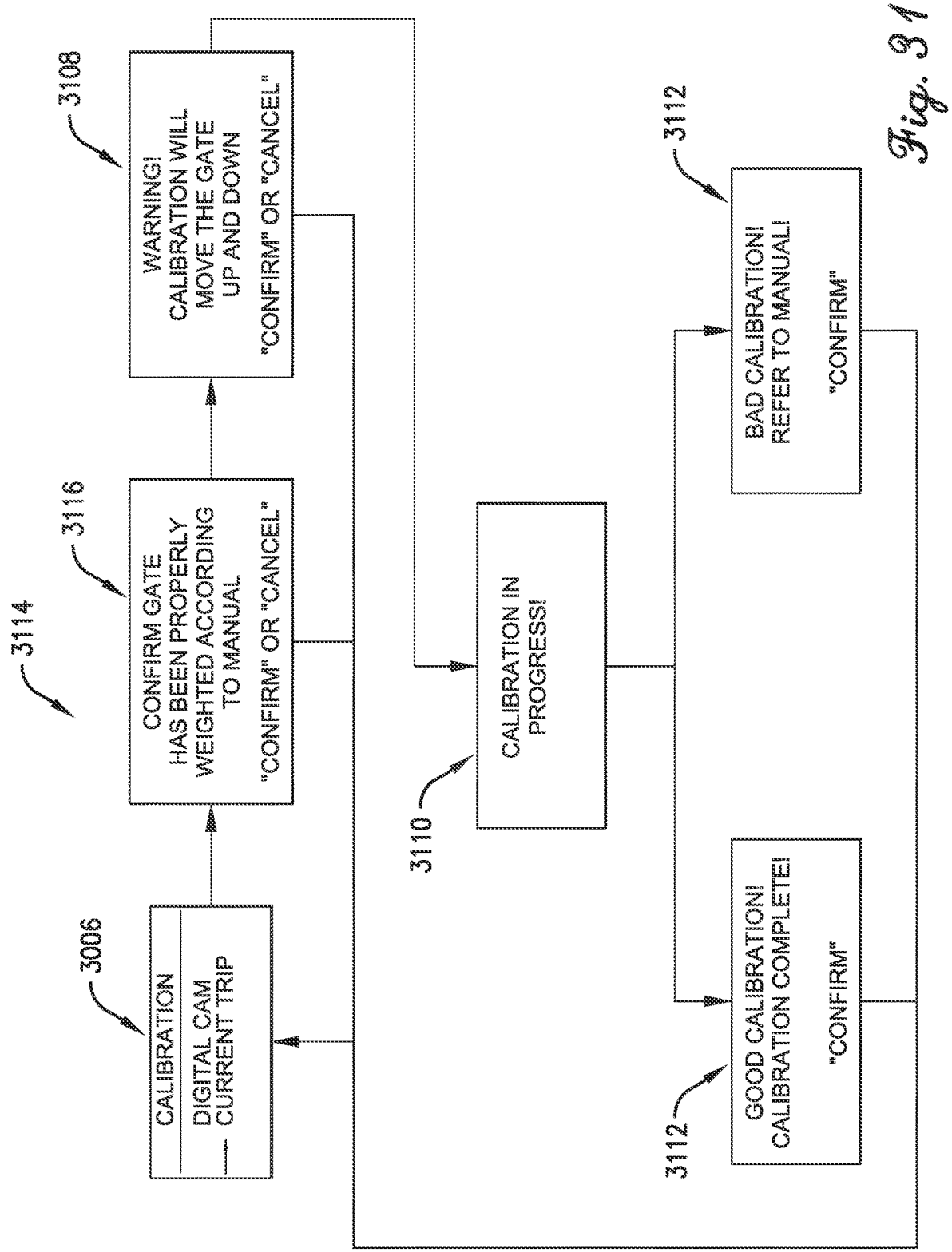

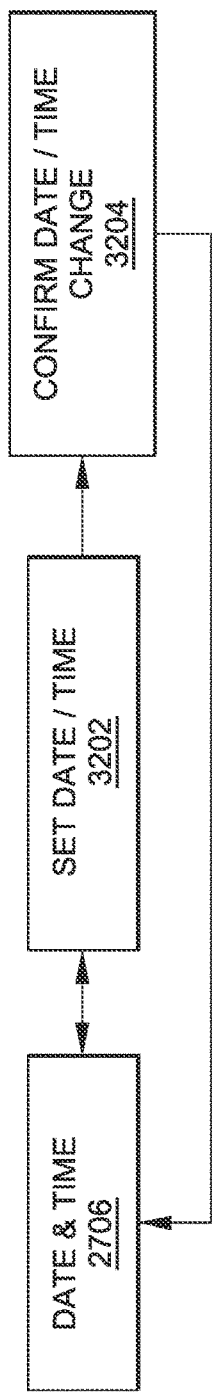
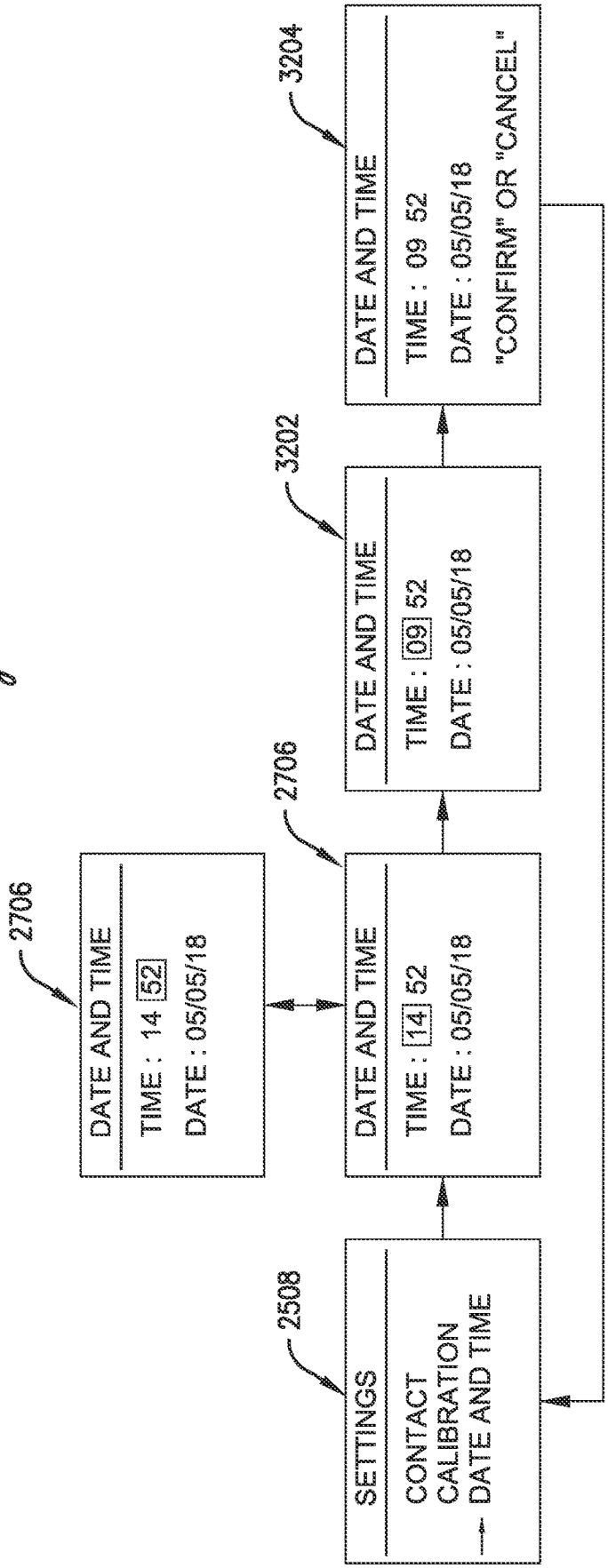

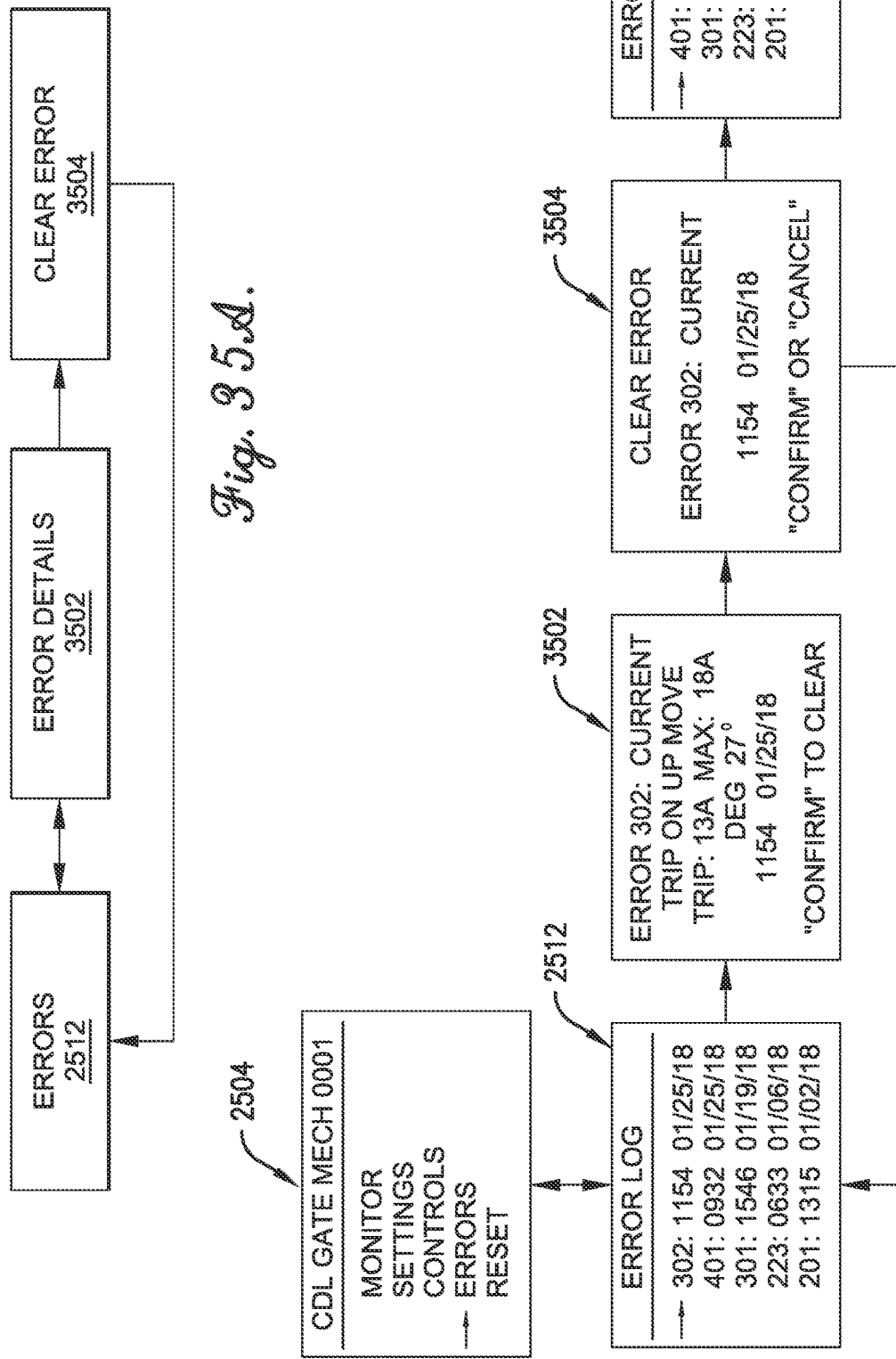

DOUBLE-SIDED TERMINAL BOARD FOR GRADE CROSSING GATE CONTROLLER

CROSS-REFERENCE TO RELATED APPLICATIONS

The present application is a continuation of U.S. patent application Ser. No. 16/418,646, filed May 21, 2019, and entitled DOUBLE-SIDED TERMINAL BOARD FOR GRADE CROSSING GATE CONTROLLER, which claims priority from U.S. Provisional Patent Application No. 62/674,412, filed May 21, 2018, and entitled GRADE CROSSING GATE MECHANISM, and which was filed contemporaneously with U.S. patent application Ser. No. 16/418,623, entitled GRADE CROSSING GATE ARM POSITION DETECTION SYSTEM, filed May 21, 2019; and U.S. patent application Ser. No. 16/418,663, entitled USER INTERFACE FOR GRADE CROSSING GATE CONTROLLER, filed May 21, 2019. The listed earlier-filed applications are incorporated herein by reference in their entireties.

FIELD OF THE DISCLOSURE

The field of the disclosure relates generally to grade crossing gate mechanisms and, more particularly, to wire management and sensor systems for grade crossing gate mechanisms.

BACKGROUND

At least some known automatic grade crossing gates systems use a cam lobe assembly to sense an angle of a gate arm shaft. The cam lobe assembly is used to open and close a cam contact for gate motor control, gate brake control, and gate status information that is relayed back to a crossing control logic unit housed in a remote control shelter. Adjusting a cam lobe assembly is typically done by manually rotating the cam lobe around the gate arm shaft. With this technique, there is no exact measurement of the angle at which the cam lobe is rotated. Rather, a service technician typically "eyeballs" the angle and subsequently activates the crossing gate mechanism to determine whether the adjusted angle is correct. As such, the cam lobe assembly generally requires several adjustments to be made with each adjustment requiring testing to determine if the angle is correct.

In addition, some known automatic grade crossing gates systems include a fixed terminal board housed in a gate mechanism enclosure. Power and control wires routed from the remote control shelter and local wires coupled to the signal lights, warning bell, etc., are typically routed into the gate mechanism enclosure behind the fixed terminal board. All the wires are routed through a cable management opening in the terminal board so the wires terminate on a front side of the terminal board for easy access. However, having all the connections on the front side of the terminal board can make it difficult to diagnose or troubleshoot errors with the grade crossing gates system. Moreover, the large number of wire connections can cause difficulty in ensuring that the proper connections are made prior to testing the grade crossing gates system.

FIG. 1A is a plan view of a prior art cam lobe assembly 44 for use in a typical crossing gate system, illustrating a cam contact 54 in a closed position. FIG. 1B is a plan view of the cam lobe assembly 44, illustrating the cam contact 54 in an opened position. The cam lobe assembly 44 includes a cam lobe frame 48 coupled to the gate arm shaft 26 for rotation therewith. A lobe 50 is defined on a portion of the cam frame 48. As the gate arm shaft 26 rotates, the lobe 50 contacts a flexible cam contact 46 and pushes it into contact with a fixed contact 52, thereby completing an electrical connection therebetween. However, the cam lobe assembly 44 must be manually tuned or adjusted before a grade crossing system installation is operable so that the contact 54 will open and close at the correct angular position of the gate arm shaft 26. With the cam lobe assembly 44, adjusting the rotational position of the lobe 50 can be very difficult. In addition, if the cam lobe assembly 44 is not adjusted properly, the crossing gate system may not operate properly, leading to a possibly dangerous situation.

BRIEF DESCRIPTION

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

In one aspect, a crossing gate mechanism is provided. The crossing gate mechanism includes a gate mechanism enclosure defining an interior space, external wires located at substantially outside the gate mechanism enclosure, and a terminal board positioned within the interior space of the gate mechanism enclosure. The external wires are connected to the terminal board. The terminal board is swingably coupled to the gate mechanism enclosure.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

FIG. 16 is a front view of a gate arm shaft;

FIG. 17 is a section view of the gate arm shaft taken along line 17-17 of FIG. 16;

FIG. 25A is a block diagram of the user interface;

FIG. 25B depicts an image of the graphical user interface (GUI) of the user interface;

FIG. 26A is a block diagram of the Monitor submenu of the user interface;

FIG. 26B is a GUI representation of the Monitor submenu;

FIG. 29B is a GUI representation of the Enable submenu of the Contact submenu as depicted in FIG. 29A;

FIG. 29C is a GUI representation of the Set submenu of the Contact submenu as depicted in FIG. 29A;

FIG. 31B is a GUI representation of the Digital Cam submenu of the Calibration List screen as depicted in FIG. 31A;

FIG. 31C is a GUI representation of the Current Trip submenu of the Calibration List screen as depicted in FIG. 31A FIG. 32A is a block diagram of the Date & Time submenu of the user interface;

FIG. 32B is a GUI representation of the Date & Time submenu;

FIG. 35A is a block diagram of the Errors submenu of the user interface; and

FIG. 35B is a GUI representation of the Errors submenu.

Figure 1B:
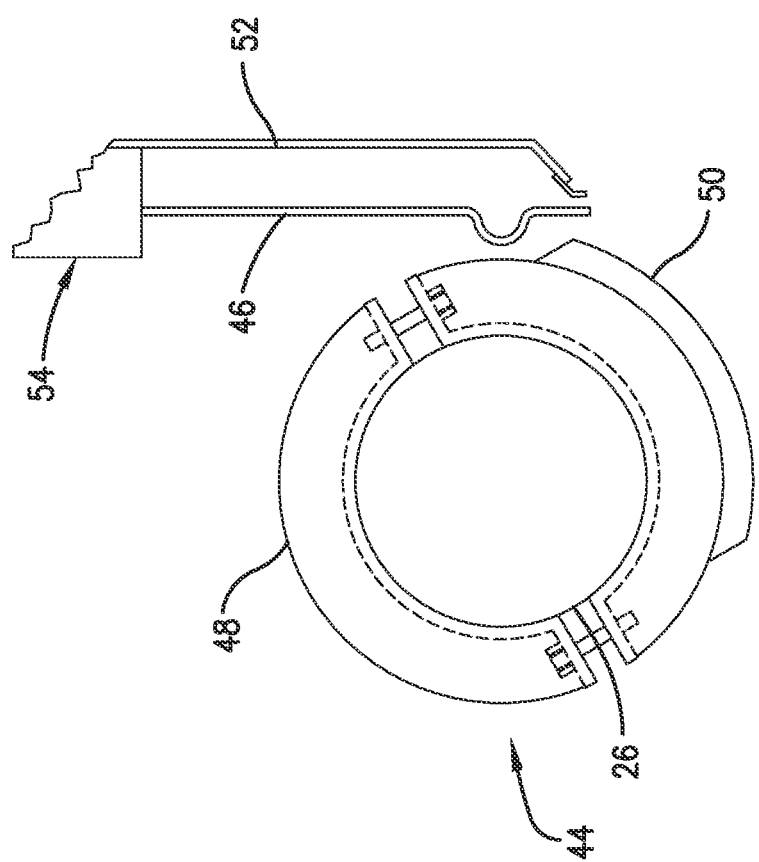
FIG. 1B is a plan view of the cam lobe assembly of FIG. 1A, illustrating the cam contact in an opened position.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein. While the drawings do not necessarily provide exact dimensions or tolerances for the illustrated components or structures, the drawings are to scale with respect to the relationships between the components of the structures illustrated in the drawings.

DETAILED DESCRIPTION

The following detailed description of embodiments of the disclosure references the accompanying figures. The embodiments are intended to describe aspects of the disclosure in sufficient detail to enable those with ordinary skill in the art to practice the disclosure. The embodiments of the disclosure are illustrated by way of example and not by way of limitation. Other embodiments may be utilized, and changes may be made without departing from the scope of the claims. The following description is, therefore, not limiting. The scope of the present disclosure is defined only by the appended claims, along with the full scope of equivalents to which such claims are entitled.

In this description, references to "one embodiment," "an embodiment," or "embodiments" mean that the feature or features referred to are included in at least one embodiment of the disclosure. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments but is not necessarily included. Thus, particular implementations of the present disclosure can include a variety of combinations and/or integrations of the embodiments described herein.

In the following specification and the claims, reference will be made to several terms, which shall be defined to have the following meanings. The singular forms "a," "an," and "the" include plural references unless the context clearly dictates otherwise. "Optional" or "optionally" means that the subsequently described feature, event, or circumstance may or may not be required or occur, and that the description includes instances with or without such element.

Approximating language, as used herein throughout the specification and the claims, may be applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, directional references, such as, "top," "bottom," "front," "back," "side," and similar terms are used herein solely for convenience and should be understood only in relation to each other. For example, a component might in practice be oriented such that faces referred to herein as "top" and "bottom" are in practice sideways, angled, inverted, etc. relative to the chosen frame of reference.

Figure 2:
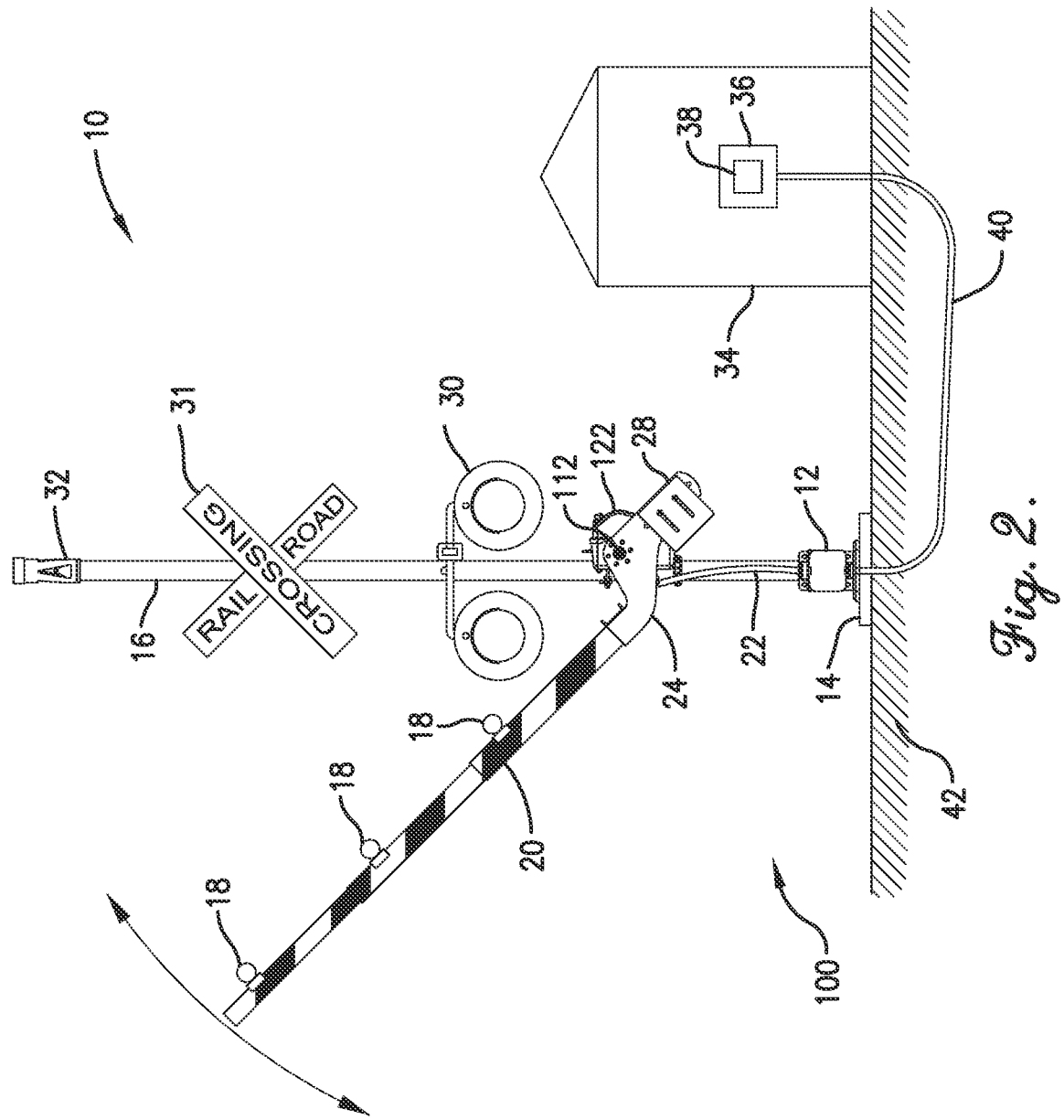
FIG. 2 is an elevation view of a grade crossing gate system in accordance with one aspect of the present invention.

FIG. 2 is an elevation view of a grade crossing gate system 10, constructed in accordance with a preferred embodiment of the present invention. The crossing gate system 10 includes a crossing gate mechanism 100 having a base 12 secured to the ground 42 by a concrete foundation 14. The base 12 supports a mast 16. A gate mechanism enclosure 122 is coupled to the mast 16 and houses electrical and mechanical components (not shown in FIG. 2) for raising and lowering a gate arm 20. Power and control wires 22 (also referred to herein as external wires) run between the base 12 and the gate mechanism enclosure 122. The gate arm 20 is coupled to one or more rotatable counterweight arms 24 swingably supported on the mast 16. The counterweight arm 24 is coupled to a gate arm shaft 112 that extends through the gate mechanism enclosure 122 and is coupled to a gear train 110 (not shown in FIG. 2) enclosed therein. A plurality of counterweights 28 are coupled to the counterweight arm 24 opposite the gate arm 20. The counterweights 28 are adjustable relative to the counterweight arm 24 to facilitate counterbalancing the gate arm 20, thereby reducing the power required to raise the gate arm 20 from a substantially horizontal position to a generally vertical position. In addition, a plurality of signal lights 30, a warning sign 31, and a warning bell 32 are coupled to the mast 16 above the gate mechanism enclosure 122. Furthermore, a plurality of warning lights 18 are coupled to the gate arm 20.

The crossing gate system 10 includes a control shelter 34 located remote relative to the crossing gate mechanism 100. The control shelter 34 houses a crossing control logic unit 36 that is programmed with crossing control logic 38. The crossing control logic unit 36 is electrically coupled to the power and control wires 22 of the crossing gate mechanism 100 via a signal cable 40. The crossing control logic 38 generates commands that are transmitted by the crossing control logic unit 36 as command signals to the electrical and mechanical components of the crossing gate mechanism 100. The command signals command the gate arm 20 to clear or block traffic by moving between the vertical or horizontal positions. In addition, the crossing control logic 38 receives status information from the gate mechanism 100.

Figure 3:
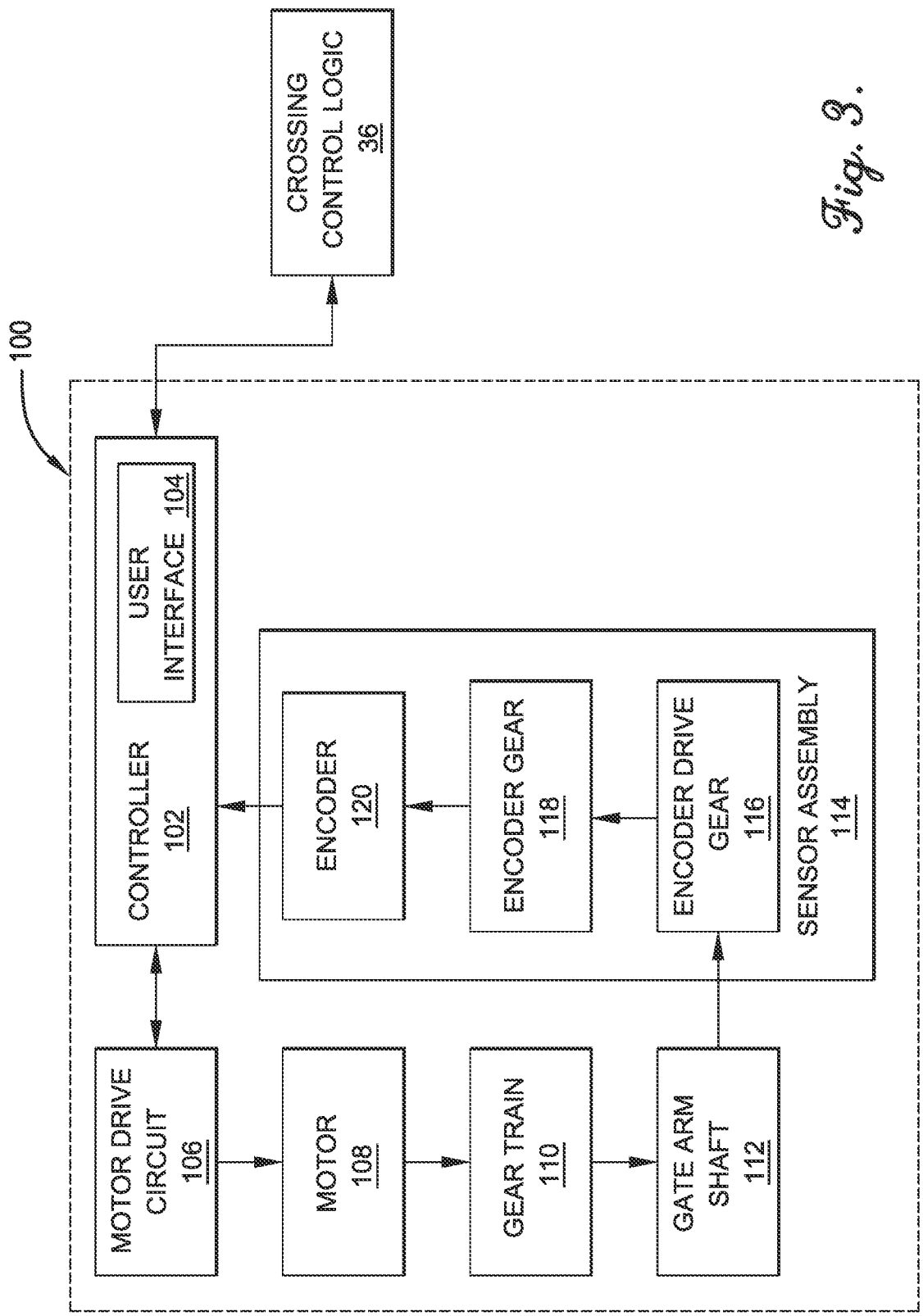
FIG. 3 is a block diagram for the grade crossing gate mechanism as shown in FIG. 2.

FIG. 3 is a block diagram for the grade crossing gate mechanism 100, in accordance with one aspect of the present invention. In the exemplary embodiment, the grade crossing gate mechanism 100 includes a controller 102 that has a user interface 104. The user interface 104 may include, for example, and without limitation, a graphical user interface (GUI) and/or a command line interface. The controller 102 receives inputs (e.g., command signals) from the crossing control logic 38 and transmits status information to the crossing control logic 38. The controller 102 is coupled to a motor drive circuit 106 configured to channel electrical power to a motor 108. The motor drive circuit 106 is also used to switch the polarity of the electrical power, thereby changing a rotational direction of the motor 108, upon instruction by the controller 102.

The motor 108 is coupled to the gear train 110. The gear train 110 includes the gate arm shaft 112 coupled to a gate arm, such as the gate arm 20, to raise or lower the gate arm. The motor 108 generates torque to rotate the gate arm shaft 112 when electrical power is supplied to the motor 108. The gear train 110 operates to multiply the torque of the motor 108, thereby reducing the power requirements and physical size of the motor 108.

The grade crossing gate mechanism 100 also includes an electronic sensor assembly 114. The sensor assembly 114 includes a driving element 116 and an electronic transducer 120 having a driven element 118 coupled thereto. In the exemplary embodiment, the electronic transducer 120 is an encoder, the driving element 116 is an encoder drive gear, and the driven element 118 is an encoder gear. While the electronic sensor assembly 114 is shown as employing an intermeshed gear drive assembly for driving the encoder 120, other aspects of the present invention contemplate alternative positive drive systems including, without limitation, chain drives, toothed belt drives, positive clutch drives, or other positive drive systems that enable the electronic sensor assembly 114 to function as described herein.

In the exemplary embodiment, the encoder drive gear 116 is mechanically coupled to the gate arm shaft 112, as will be described further herein. The encoder drive gear 116 is drivingly coupled to the encoder gear 118. The encoder gear 118 rotates the encoder 120 upon rotation of the gate arm shaft 112. The angular position of the gate arm shaft 112 is sensed (e.g., detected) by the encoder 120 and a position signal corresponding thereto is transmitted to the controller 102 by the encoder 120. The controller 102 transmits the corresponding position signal as status information to the crossing control logic 38 of the crossing control logic unit 36.

Figure 4:
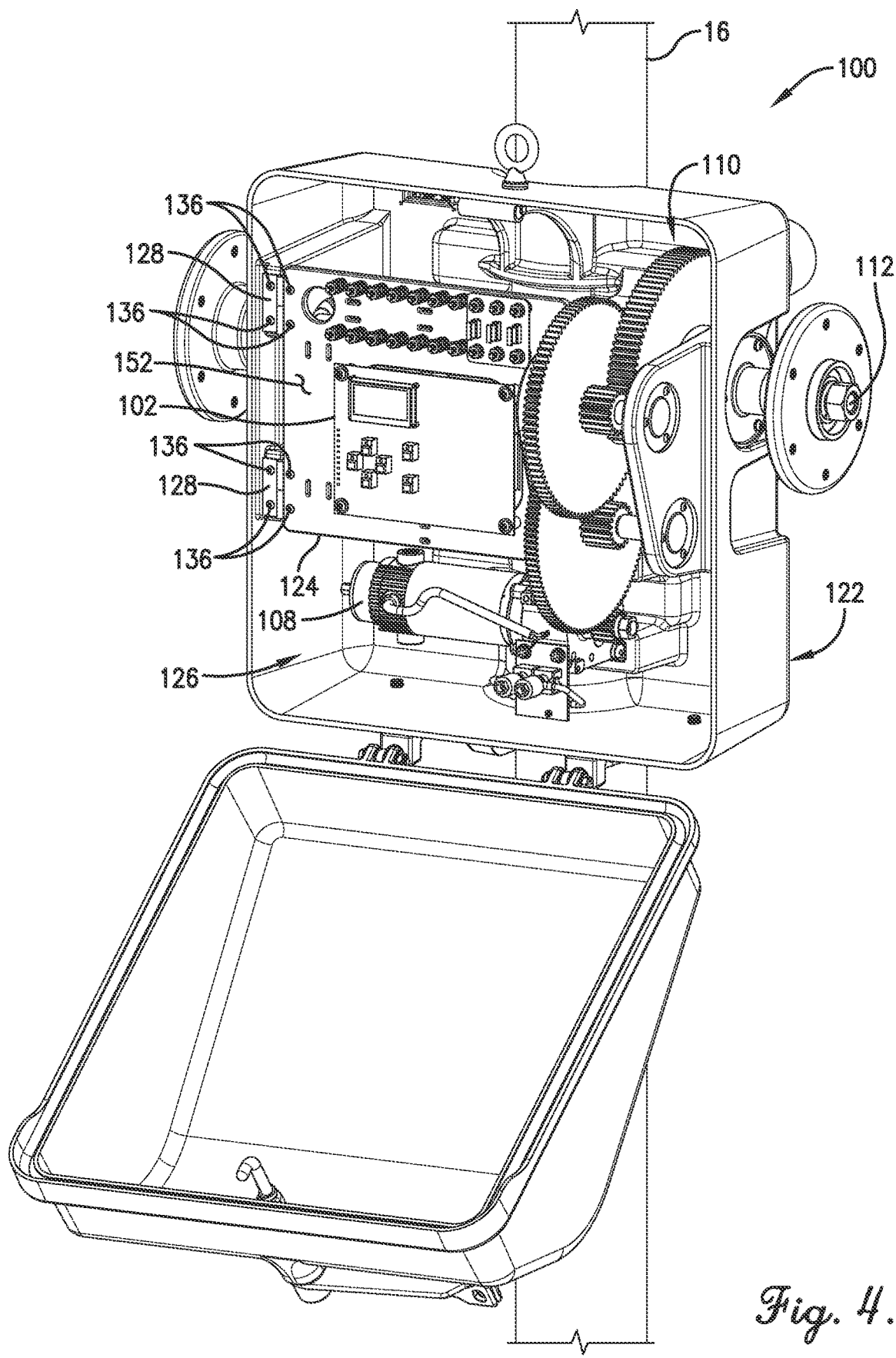
FIG. 4 is a front, right partial perspective of the grade crossing gate mechanism of FIG. 2, showing a gate mechanism enclosure in an opened configuration.
Figure 5:
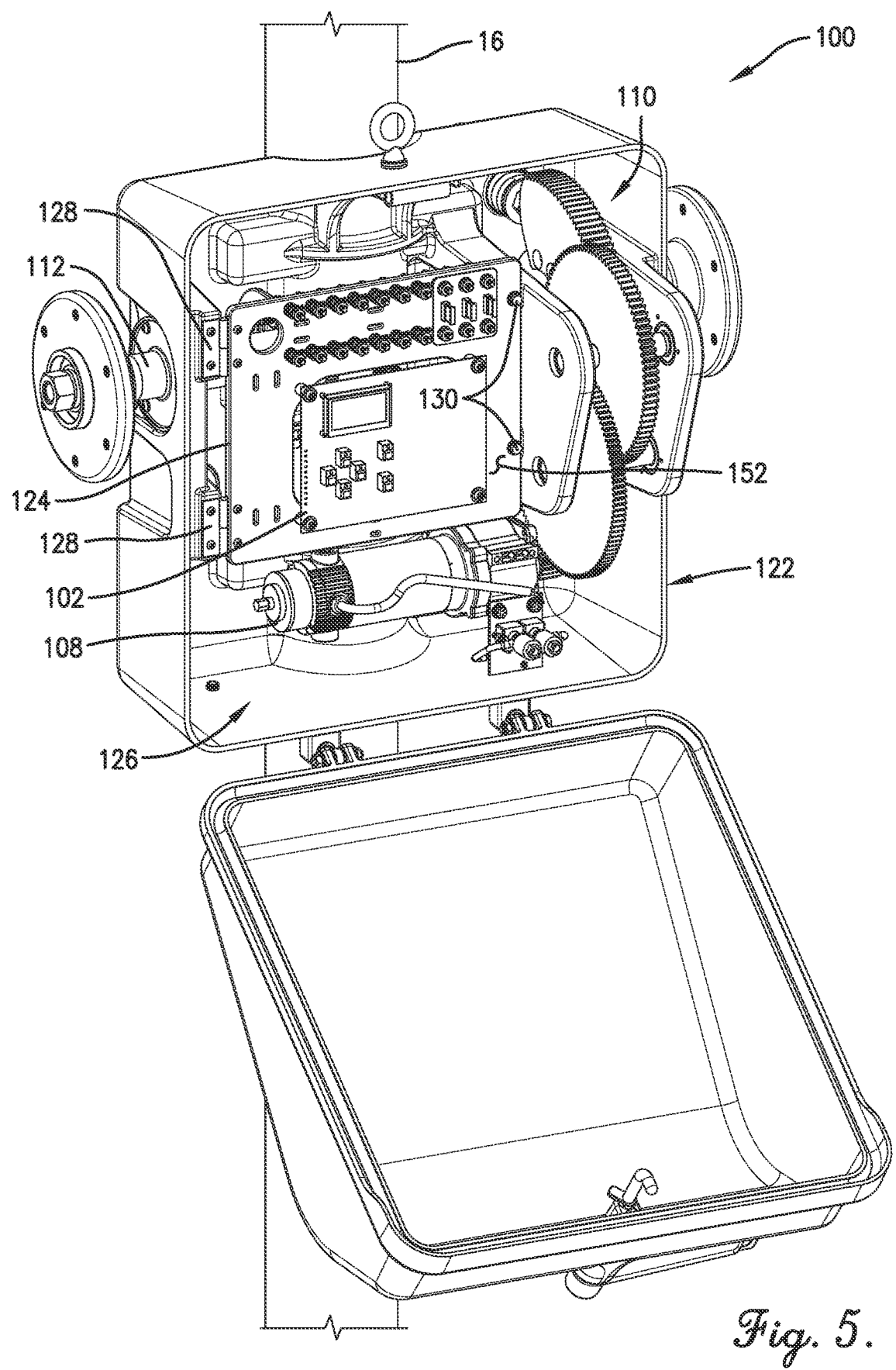
FIG. 5 is a front, left partial perspective of the grade crossing gate mechanism of FIG. 2, showing a terminal board in the operative configuration.
Figure 6:
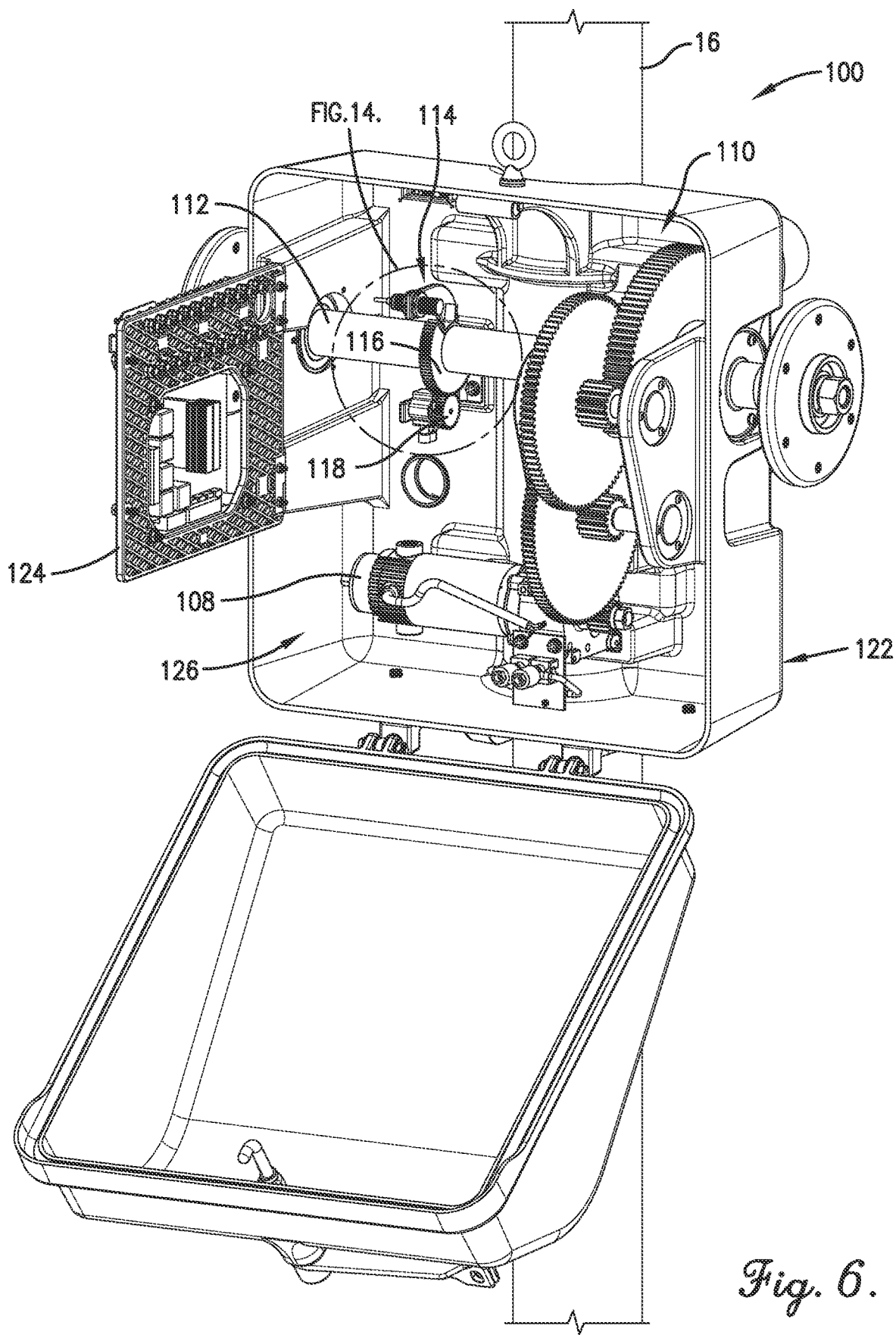
FIG. 6 is a front, right partial perspective of the grade crossing gate mechanism of FIG. 2, showing the terminal board in an access configuration.

FIG. 4 is a front, right partial perspective of the grade crossing gate mechanism 100, showing the gate mechanism enclosure 122 in an opened configuration and a terminal board 124 in an operative configuration (also referred to as a secured configuration). FIG. 5 is a front, left partial perspective of the grade crossing gate mechanism 100, showing the terminal board 124 in the operative configuration. FIG. 6 is a front, right partial perspective of the grade crossing gate mechanism 100, showing the terminal board 124 in an access configuration (also referred to as an unsecured configuration). Referring to FIGS. 4-6, in the exemplary embodiment, the gate mechanism enclosure 122 is coupled to a mast, such as the mast 16, described herein. The gate mechanism enclosure 122 defines an interior space 126. The motor 108 is positioned within the interior space 126 and is coupled to the gate mechanism enclosure 122. The gear train 110 is at least partially positioned within the interior space 126. An output shaft of the gear train 110, referred to as the gate arm shaft 112, extends through the gate mechanism enclosure 122, and therefore the interior space 126. The gear train 110 and the motor 108 are rotatably coupled together.

In the exemplary embodiment, the terminal board 124 and the controller 102 are positioned above the motor 108 within the gate mechanism enclosure 122, as illustrated in FIGS. 4-5. However, aspects of the present invention contemplate positioning the terminal board 124 and the controller 102 within the gate mechanism enclosure 122 in any location relative to the motor 108 that enables the grade crossing gate mechanism 100 to function as described herein. As shown in FIGS. 4 and 5, the terminal board 124 is swingably or rotatably coupled to the gate mechanism enclosure 122 by one or more hinges 128 (also referred to as mounting components). In the exemplary embodiment, the hinges 128 are lift off hinges. However, in other aspects of the present invention, the hinges 128 may include, for example, and without limitation, a fixed-pin hinge, a barrel hinge, a pivot hinge, a butt hinge, a continuous hinge, a living hinge, and the like.

It is noted that the hinges 128 enable the terminal board 124 to be swung or rotated relative to the gate mechanism enclosure 122 between the operative configuration (see FIGS. 4 and 5) and the access configuration (see FIG. 6). In a preferred embodiment, the sensor assembly 114 is positioned behind the terminal board 124, such that the terminal board 124 overlies the sensor assembly 114 when the terminal board is in the operative configuration. In the access configuration, the terminal board 124 may be freely rotated about a rotation axis of the hinges 128 to facilitate access, for example, to the sensor assembly 114.

Referring to FIG. 5, the terminal board 124 is further coupled to the gate mechanism enclosure 122 by one or more closure components 130 when in the operative configuration. The closure components 130 engage a front surface 152 of the terminal board 124, opposite the hinges 128, and are coupled to the gate mechanism enclosure 122 to prevent rotation of the terminal board 124 about the hinge axis. In the exemplary embodiment, the closure components 130 are threaded fasteners. However, in other aspects of the present invention, the closure components 130 may include any fastening device that enables the grade crossing gate mechanism 100 to function as described herein, including, for example, pins, rivets, latches, and the like.

Figure 7:
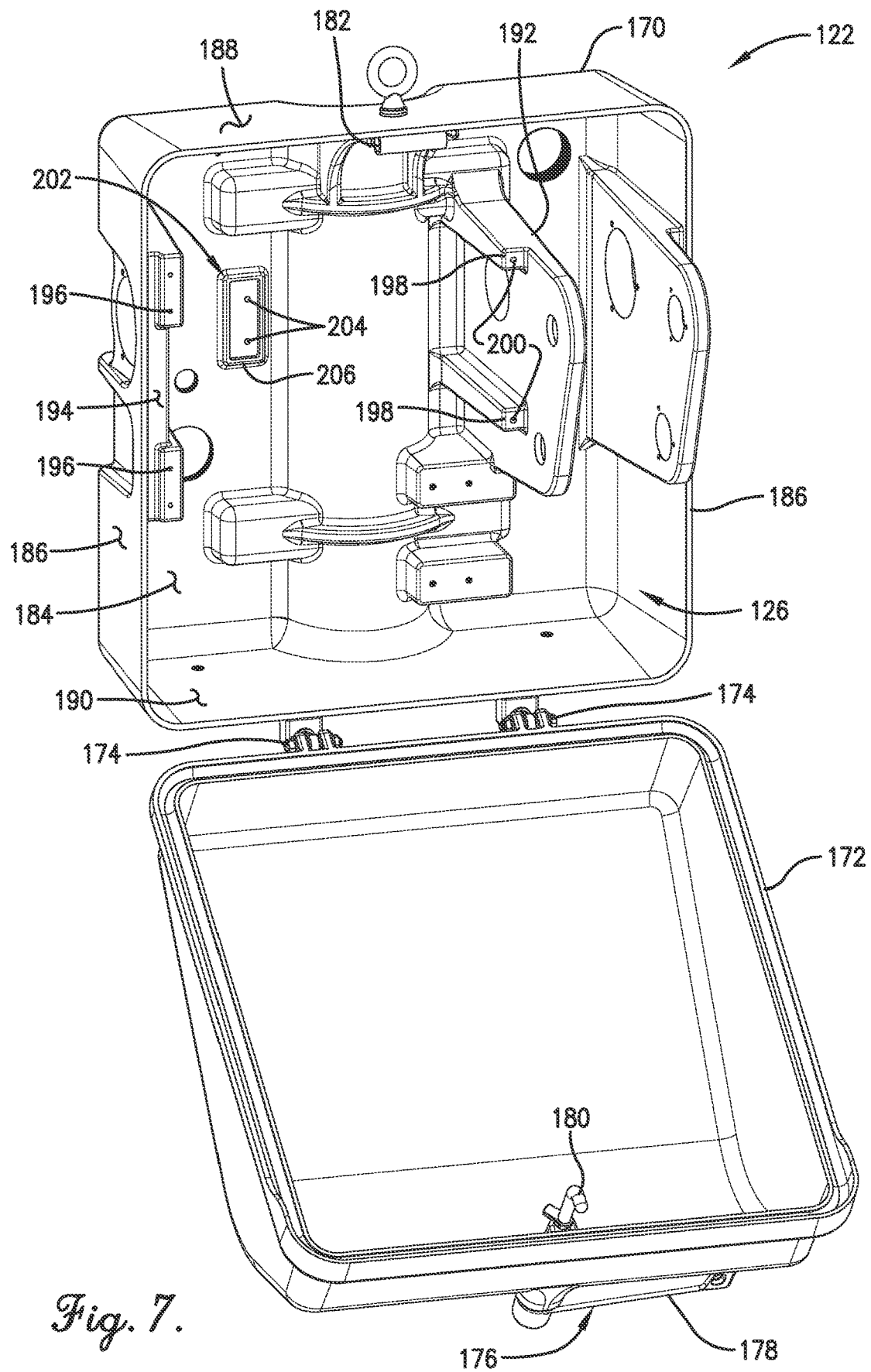
FIG. 7 is a perspective view of the gate mechanism enclosure as depicted in FIGS. 4-6, shown in an open configuration, with various elements removed to depict the construction of the enclosure itself.
Figure 8:
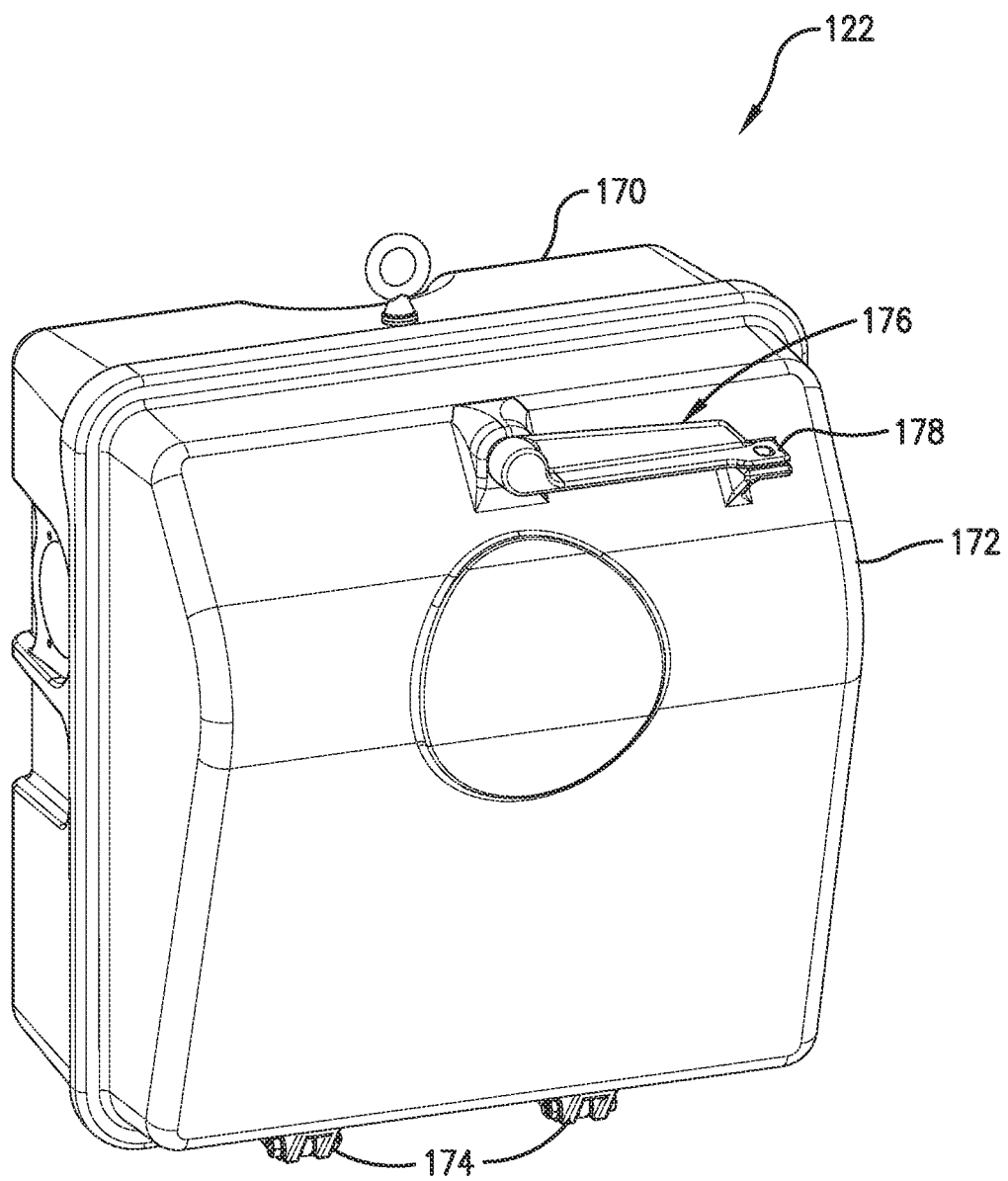
FIG. 8 is a perspective view of the gate mechanism enclosure, shown in a closed configuration.

FIG. 7 is a perspective view of the gate mechanism enclosure 122, depicting the enclosure in an open configuration. FIG. 8 is a perspective view of the gate mechanism enclosure 122, depicting the enclosure in a closed configuration. In the exemplary embodiment, the gate mechanism enclosure 122 generally comprises a base 170 and a lid 172 (together broadly defining a housing). The lid 172 is releasably connectable to the base 170 for positioning relative to the base 170, such that the gate mechanism enclosure 122 is shiftable between an opened configuration and a closed configuration. In the closed configuration (FIG. 8), the lid 172 and base 170 together form a substantially enclosed interior space 126.

In the opened configuration (FIG. 7), the lid 172 is generally positioned at least in part away from the base to provide access to the interior space 126 for servicing or maintenance of the crossing gate mechanism 100 such as, without limitation, inspecting the components contained therein (e.g., the motor 108, the gear train 110, etc.), adjusting the sensor assembly 114, and accessing the controller 102. The base 170 and lid 172 may be suitably fabricated from any number of materials, including for example, and without limitation, metal, plastic, fiber-reinforced polymers, or other suitable weather resistant material. For example, the base 170 and lid 172 may be formed in a molding process used for producing parts from thermoplastic or thermosetting plastic materials. However, in alternative aspects of the present invention, the base 170 and lid 172 may be constructed from other suitable materials. The base 170 and the lid 172 may also be alternatively constructed of different materials from each other, without departing from the scope of the invention.

The lid 172 is suitably hinged to the base 170, such as by a plurality of hinges 174, including for example, mechanical hinges or other suitable hinge configurations for enabling hinged movement of the lid 172 (and therefore correspondingly shifting of the gate mechanism enclosure 122 between the opened and closed configurations), while maintaining connection of the lid 172 to the base 170 to inhibit loss of the lid during servicing of the crossing gate mechanism 100. It is understood that in alternative aspects of the present invention, the lid 172 may be attached to the base 170 other than by a hinge and remain within the scope of this invention. Furthermore, alternative aspects of the present invention contemplate that the lid 172 may be entirely separable from the base 170 without departing from the scope of this invention.

In the closed configuration of the gate mechanism enclosure 122, the lid 172 and base 170 are further releasably held together (i.e., secured or interlocked) by a suitable locking mechanism 176 to inhibit unauthorized or unintended opening of the gate mechanism enclosure 122. Additionally, more than one locking mechanism may be employed to releasably hold together the lid 172 and base 170 in the closed configuration of the gate crossing mechanism 100. The locking mechanism 176 includes a rotatable handle 178 that is exterior to the interior space 126. A latching member 180, which is on the interior side of the lid 172, is coupled to the handle 178 and is configured to engage or catch a lock member 182 coupled to the base 170. In alternative embodiments of the present invention, the handle 178 and latching member 180 may be coupled to the base 170, and the lock member 182 may be coupled to the lid 172 in a manner that enables the locking mechanism 176 to function as described herein. To unlock the locking mechanism 176, the handle 178 is rotated about ninety degrees (90°) in an upward direction, as indicated in FIG. 8. The latching member 180 subsequently rotates about ninety degrees (90°) and disengages the lock member 182. The lid 172 may then be rotated to the opened configuration (FIG. 7) for access to the interior space 126.

The illustrated base 170 comprises a back panel 184, laterally opposite sidewalls 186 that broadly define opposite sides of the gate mechanism enclosure 122, a top wall 188, and a bottom wall 190. In the illustrated embodiment the back panel 184, sidewalls 186, top wall 188, and bottom wall 190 of the base 170 together define an open, generally rectangular shape. It is understood, however, that the base 170 may be shaped other than as illustrated without departing from the scope of this invention, and that in alternative aspects of the present invention, the lid 172 may instead, or additionally define one or more of the sides of the housing and/or the top or bottom walls of the housing. The back panel 184, sidewalls 186, top wall 188, and bottom wall 190 of the base are formed integrally in the illustrated embodiment, such as by being molded as a single piece. However, in other aspects of the present invention, one or more of these walls may be formed separate from the others and connected thereto such as by welding, fastening, adhering, or other suitable connection technique.

In the exemplary embodiment, the base 170 also has at least one interior, upstanding wall 192 (otherwise referred to herein as an upstanding sidewall or interior wall) extending outward relative to the back panel 184. Such an arrangement enables the gear train 110 to be easily serviced when the lid 172 is opened for servicing, e.g., without having to remove and/or open a separate gear train housing.

In the illustrated embodiment of FIG. 7, the leftmost sidewall 186 comprises an outer edge 194 defining a hinge mounting surface and having a plurality of mounting structures 196 thereon. The outer edge 194 is generally parallel to the back panel 184. As described above, the terminal board 124 is rotatably coupled to the gate mechanism enclosure 122 by one or more hinges 128 (shown in FIGS. 4 and 5). More particularly, in the exemplary embodiment, each female half of the lift off hinge 128 is coupled to the outer edge 194 via one of the mounting structures 196, although the male half may be used in other aspects of the present invention. A plurality of hinge fasteners 136 are used to removably attach the hinges 128 to the mounting structures 196. Each hinge fastener 136 passes through a mounting hole in the hinge 128 and is threaded into the mounting structure 196.

The upstanding wall 192 comprises a pair of outer edge portions 198 defining support surfaces and having a plurality of securing structures 200 thereon. The outer edge portions 198 are generally parallel to the back panel 184. The back panel 184 and upstanding wall 192 are preferably formed integrally, such as by molding them as a single piece, although these components may be formed separate and connected by any suitable connection technique. As described above with reference to FIG. 5, the terminal board 124 is coupled to the gate mechanism enclosure 122 by one or more closure components 130 when in the operative configuration. In particular, the back surface 154 of the terminal board 124 is in face-to-face contact with the outer edge portions 198. The closure components 130 engage the front surface 152 of the terminal board 124, extend through a closure hole 234 (shown in FIG. 11) of the terminal board 124, and are threadedly coupled to the securing structures 200.

Figure 14:
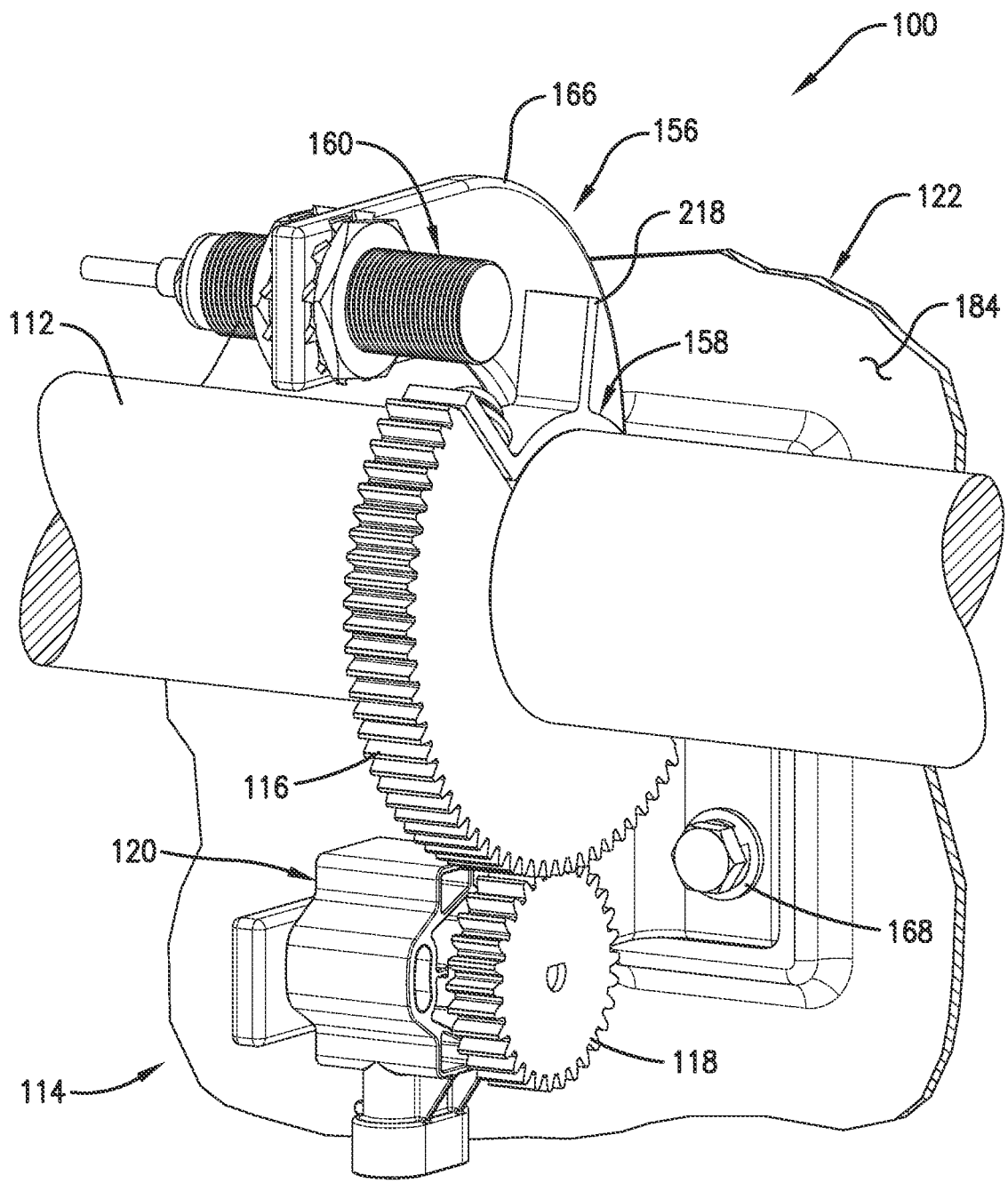
FIG. 14 is an enlarged view of a portion of the crossing gate mechanism shown in FIG. 6, illustrating an electronic sensor assembly.

The back panel 184 includes a sensor assembly mounting pad 202. The mounting pad 202 is generally defined by a raised peripheral wall 206 defining the extent of the mounting pad 202. Located within the area enclosed by the peripheral wall 206 are one or more mounting holes 204 for securing the sensor assembly 114 to the back panel 184 of the gate mechanism enclosure 122. As shown in FIG. 14, one or more fasteners 168 extend through a fixed mount 166 and are threadedly coupled to the mounting holes 204. However, in alternative aspects of the present invention, the fasteners 168 may extend through the mounting holes 204 and be secured to the back panel 184 using, for example, corresponding threaded nuts.

Figure 9:
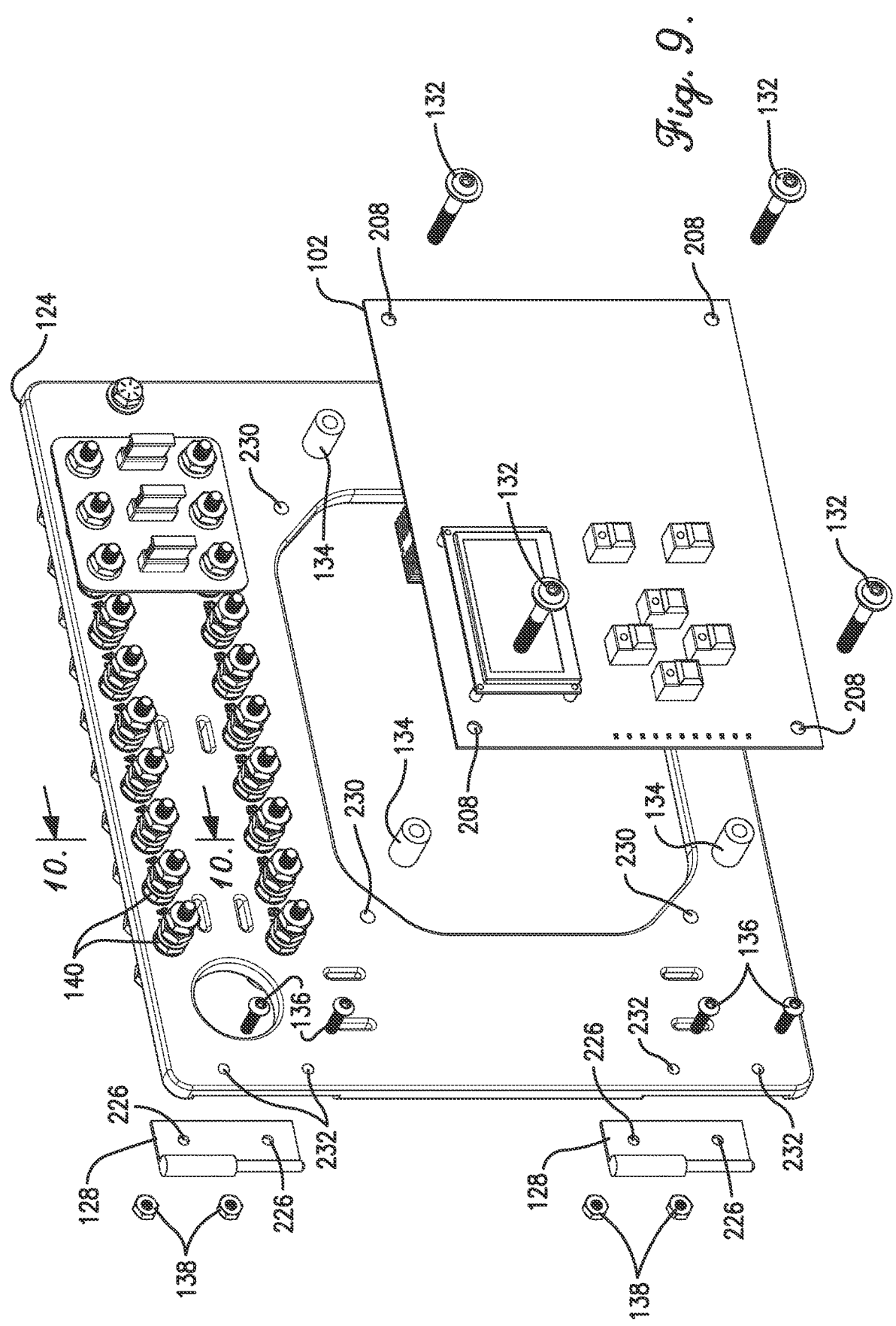
FIG. 9 is an exploded perspective of the terminal board and a controller.

Referring back to FIGS. 4-5, in the exemplary embodiment, the controller 102 is coupled to the terminal board 124 for rotation therewith. However, in some aspects of the present invention, the controller 102 may be mounted within the interior space 126 free of the terminal board 124. FIG. 9 is an exploded perspective of the terminal board 124 and the controller 102. The controller 102 is supported by or coupled to the terminal board 124 by a plurality of fasteners 132, such that the controller 102 is swingable with the terminal board 124 relative to the gate mechanism enclosure 122. Each fastener 132 extends through a mount opening 208 in the controller 102, a standoff 134, and a mount opening 230 in the terminal board 124. The fasteners 132 may be coupled to the terminal board 124, for example, and without limitation, by threadedly coupling to mount opening 230, passing through the mount opening 230 and being threadedly secured by a nut (not shown), and the like. The standoffs 134 facilitate spacing the controller 102 away from the terminal board 124 to allow space for components and/or solder connections (not shown) that may extend from the back side of the controller 102.

As described above, the hinges 128 are coupled to the terminal board 124. FIG. 9 shows the male half of the lift off hinge 128 being coupled to the terminal board, although the female half may be used in other aspects of the present invention. A plurality of hinge fasteners 136 are used to removably attach the hinges 128 to the terminal board 124. Each hinge fastener 136 passes through a hinge mounting hole 232 in the terminal board 124 and a mounting hole 226 in the hinge 128. A nut 138 is coupled to the hinge fastener 136 to secure the hinge 128 in place.

Figure 10:
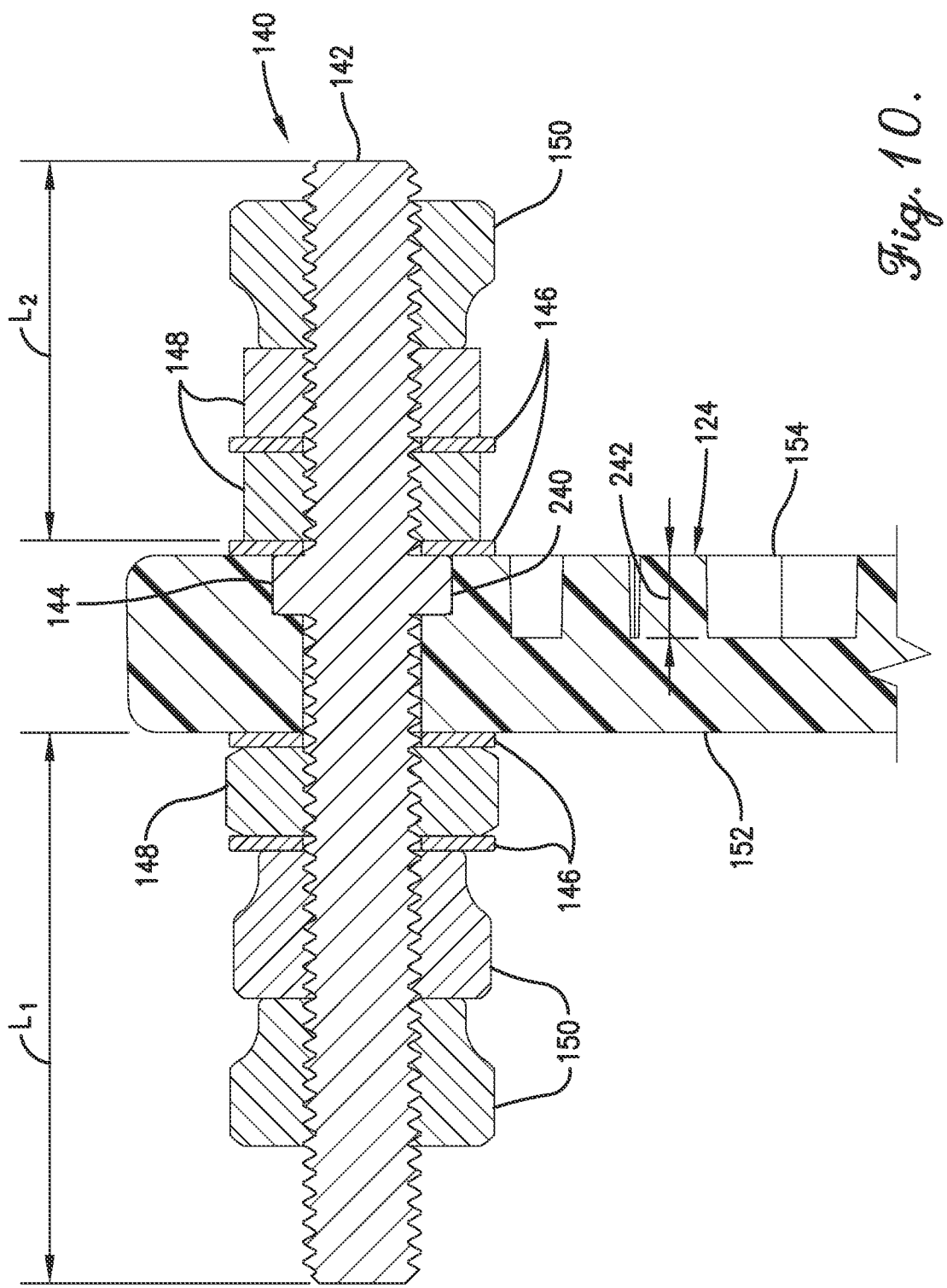
FIG. 10 is a partial section view of the terminal board and the controller taken along line 10-10 of FIG. 9.

As shown in FIG. 9, a plurality of double-sided terminals 140 are coupled to the terminal board 124. Each double-sided terminal 140 extends through a respective terminal mount hole 236 (shown in FIG. 11) of the terminal board 124. FIG. 10 is a partial section view taken about line 10-10 shown in FIG. 9. The double-sided-terminal 140 includes an electrically conductive threaded shaft 142 extending through the terminal board 124 (i.e., the terminal mount hole 236). The threaded shaft 142 includes an anti-rotation flange portion 144 that is fitted into a cavity 240 defined on the terminal board 124. The anti-rotation flange portion 144 facilitates preventing the threaded shaft 142 from rotating about its axis. The double-sided terminal 140 extends outward from a front surface 152 of the terminal board 124 a predefined distance of $L_1$ defining a first terminal portion. In addition, the double-sided terminal 140 extends outward from a back surface 154 of the terminal board 124 a predefined distance of $L_2$ defining a second terminal portion. The distances $L_1$ and $L_2$ may include any measurement that enables the double-sided terminal 140 to function as described herein.

A plurality of washers 146 and jam nuts 148 are coupled to the threaded shaft 142 to fix it to the terminal board 124. More particularly, in the exemplary embodiment, a washer 146 is positioned against the front surface 152 and the back surface 154, respectively. A jam nut 148 is tightened against the washers 146, thereby fixing the threaded shaft 142 to the terminal board. Each double-sided terminal 140 is therefore securely and rigidly coupled to the terminal board 124. One or more washers 146 and jam nuts 148 may further be coupled to the threaded shaft 142, as may be determined.

A plurality of terminal nuts 150 may be coupled to the threaded shaft 142 for securing one or more wire terminals to the double-sided terminal 140. In the exemplary embodiment, the double-sided terminal 140 has two (2) serially arranged terminal nuts 150 proximate the front side of the terminal board 124, and one (1) terminal nut 150 proximate the back side of the terminal board 124. Other aspects of the present invention contemplate any number of terminal nuts 150 coupled to the thread shaft 142 as may be required for connecting wire terminals thereto. In one aspect of the present invention, a plurality of local electrical connections are made using a plurality of electrical connection wires extending between the second terminal portions of the double-sided terminals 140 and one or more of the electrical components of the crossing gate mechanism 100, including, without limitation, the warning lights 18, the signal lights 30, the warning bell 32, and the motor 108. In another aspect of the present invention, the power and control wires 22 are coupled to the first terminal portions of the double-sided terminals 140.

Figure 11:
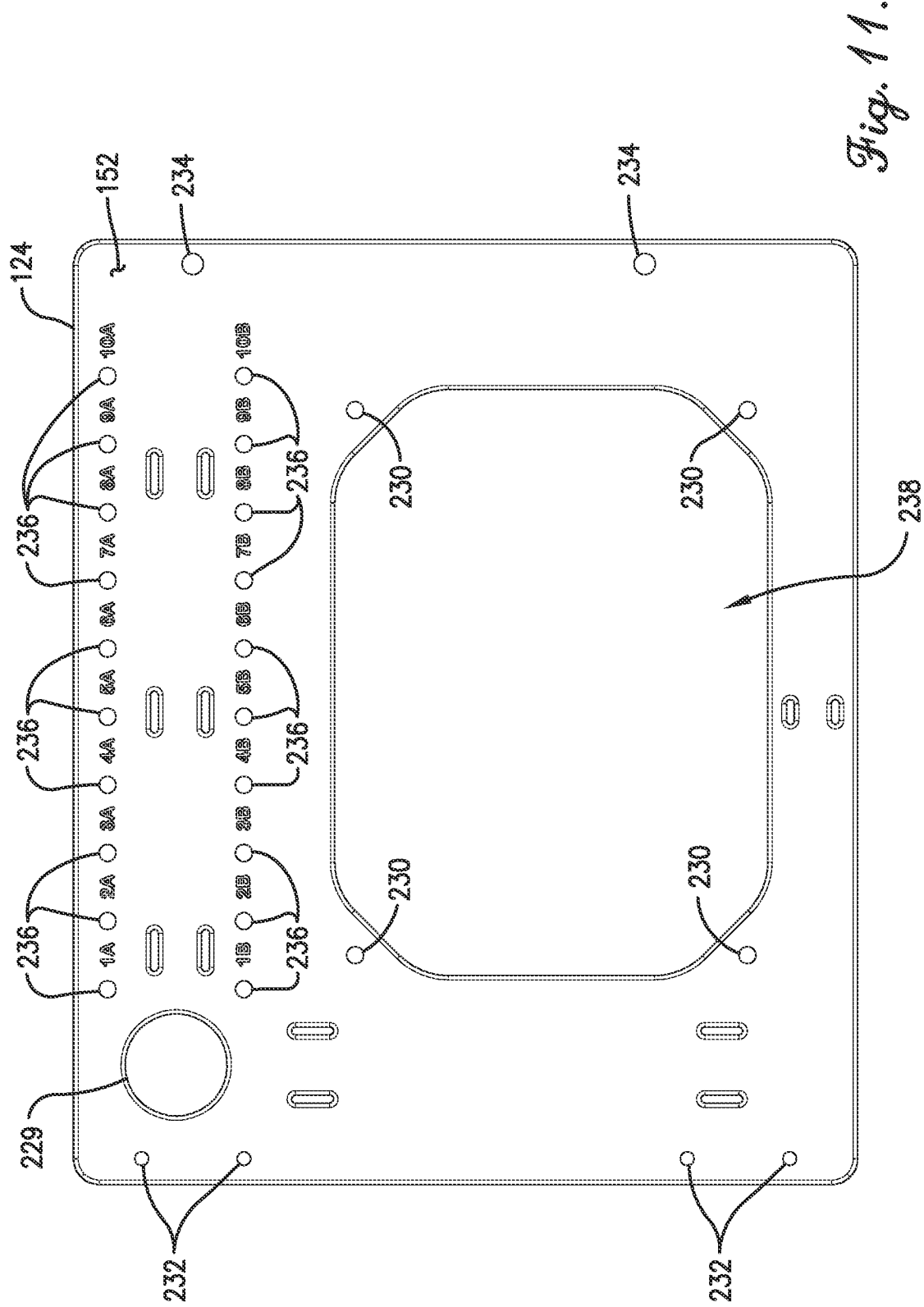
FIG. 11 is a front surface plan view of the terminal board as depicted in FIG. 9.

As shown in the front surface plan view of FIG. 11, the terminal board 124 is generally rectangular in shape having a height and width sized to enable the terminal board 124 to fit within the interior space 126 of the gate mechanism enclosure 122, as described herein. Although the terminal board is shown having a rectangular shape, in other aspects of the present invention, the terminal board 124 may have any peripheral shape that enables the terminal board to function as described herein. A cable management opening 229 is provided to enable cables and/or wires, such as the power and control wires 22, to pass through the terminal board 124.

Referring back to FIG. 9, as noted, the terminal board 124 preferably includes a plurality of mount openings 230 for attaching the controller 102 to the terminal board. Each mount opening 230 comprises an aperture that extends through the terminal board. However, in certain aspects of the present invention, one or more of the mount openings 230 may not extend through the terminal board but may comprise "blind" holes that extend partially therethrough.

The mount openings 230 are generally spaced about a clearance opening 238 defined through the terminal board 124. The clearance opening 238 is provided to enable components or portions of the control 102 to extend therethrough when the controller is coupled to the terminal board as is described herein. In addition, the clearance opening 238 facilitates airflow therethrough that may facilitate cooling of the controller 102 and/or other electrical components enclosed in the gate mechanism enclosure 122.

As described above, the terminal board 124 includes a plurality of hinge mounting holes 232. The hinge mounting holes 232 are spaced generally vertically along an edge of the terminal board to facilitate coupling to one or more hinges, such as the hinges 128 described above. Each hinge mounting hole 232 comprises an aperture that extends through the terminal board 124. However, in certain aspects of the present invention, one or more of the hinge mounting holes 232 may not extend through the terminal board 124 but may comprise "blind" holes that extend partially therethrough.

In the exemplary embodiment, as described above, the terminal board 124 includes a plurality of terminal mount holes 236. As shown in FIG. 11, the terminal mount holes 236 extend along a top edge of the terminal board 124, forming a pair of substantially parallel rows. While the terminal board 124 is shown having two (2) rows of ten (10) terminal mount holes 236, in other aspects of the present invention, the terminal board may have fewer or more terminal mount holes 236 arranged in any configuration that enables the terminal board 124 to function as described herein. In the exemplary embodiment, each terminal mount hole 236 comprises an aperture that extends through the terminal board.

Figure 12:
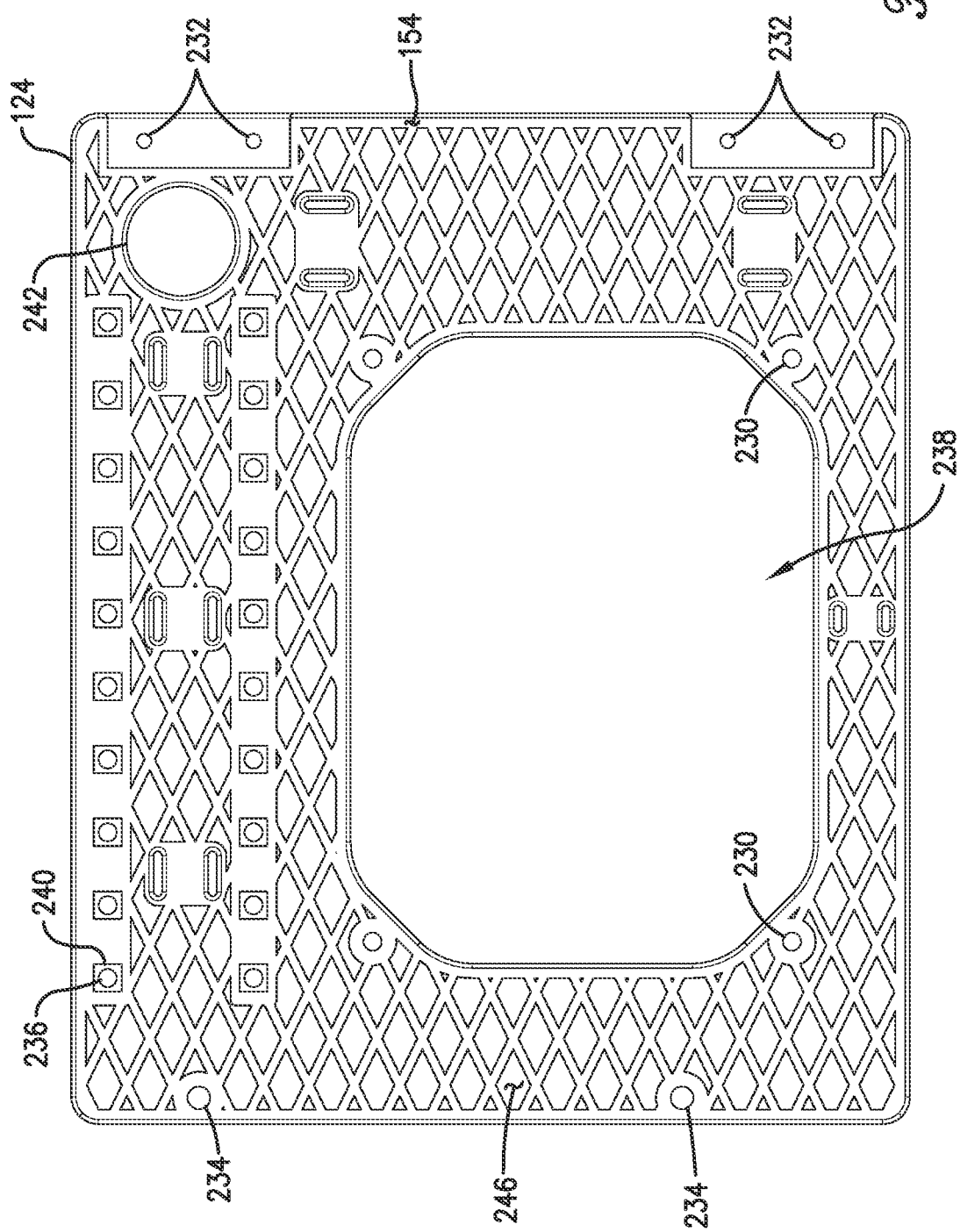
FIG. 12 is a back surface plan view of the terminal board as depicted in FIG. 9.

As shown in the back surface plan view of FIG. 12, each terminal mount hole 236 is associated with a blind cavity 240 (e.g., a counterbore) for receiving the anti-rotation flange portion 144 of the double-sided terminal 140, as described above with respect to FIGS. 7 and 8. In the exemplary embodiment, the cavity 240 is generally square and extends a predefined depth 242 from the back surface 154, which is about one half (½) a thickness of the terminal board 124. However, in alternative aspects of the present invention, the cavity 240 may have any alternative shape and the depth 242 may have any alternative measurement that enables the terminal board 124 to function as described herein.

The terminal board 124 may be suitably fabricated from any number of substantially electrically insulative materials, including for example, and without limitation, a plastic resin. For example, the terminal board 124 may be formed in a molding process used for producing parts from thermoplastic or thermosetting plastic resin materials. However, in alternative aspects of the present invention, the terminal board 124 may be fabricated from other suitable substantially electrically insulative materials without departing from the scope of the present invention.

Figure 13:
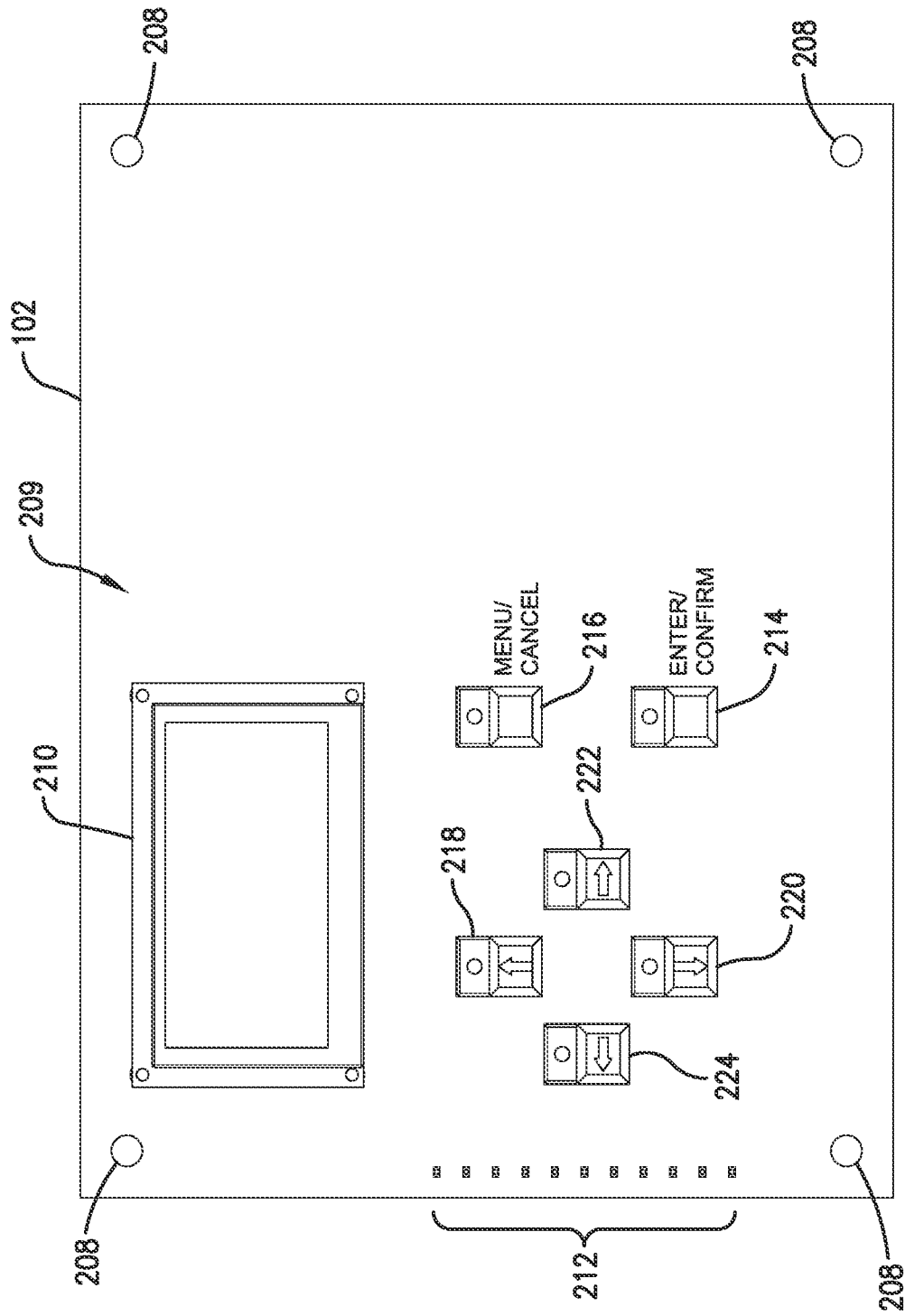
FIG. 13 is a front plan view of the controller as depicted in FIG. 9.

The controller 102, shown in the front plan view of FIG. 13, is generally rectangular in shape having a height and width sized to enable the controller 102 to be coupled to the terminal board 124 within the interior space 126 of the gate mechanism enclosure 122, as described herein. Although the controller 102 is shown having a rectangular shape, in other aspects of the present invention, the controller 102 may have any peripheral shape that enables the controller to function as described herein.

As discussed above, in the exemplary embodiment, the controller 102 preferably includes a plurality of mount openings 208 for use when attaching the controller 102 to the terminal board 124. Each mount opening 208 comprises an aperture that extends through the controller 102. As shown in FIG. 13, the mount openings 208 are generally located at the corners of the controller 102, although in some aspects of the present invention, the mount openings 208 may be located on the controller 102 in any position that enables the controller 102 to be securely coupled to the terminal board 124 as described herein.

The controller 102 includes an operator panel 209 configured to receive input from a user via a plurality of input devices, such as buttons 214, 216, 218, 220, 222, and 224. In addition, the operator panel 209 is configured to present information to the user via a display 210 and/or a plurality of light emitting diodes (LEDs) 212. The display 210 is any component capable of conveying information to the user, such as by displaying the user interface 104 (FIG. 3). In some embodiments, the display 210 is an integrated display, which can include, for example, and without limitation, a liquid crystal display (LCD), an organic light emitting diode (OLED) display, or an "electronic ink" display. In some embodiments, the integrated display 210 may optionally include a touch controller for support of touch capability. In such embodiments, the controller 102 may detect the user's presence by detecting that the user has touched the display 210 on the controller 102.

The input devices 214, 216, 218, 220, 222, and 224 may include, for example, discrete pushbuttons and/or buttons that are part of a touch pad. In other suitable embodiments, input devices 214, 216, 218, 220, 222, and 224 may be integrated into a touch sensitive panel or a touch screen, and/or may include a keyboard. A single component such as a touch screen may function as both the display 210 and the input devices 214, 216, 218, 220, 222, and 224. In the exemplary embodiment, the input devices are further designated as follows: ENTER/CONFIRM input 214, MENU/CANCEL input 216, UP input 218, DOWN input 220, RIGHT input 222, and LEFT input 224. In other aspects of the present invention, the controller may include fewer or more inputs devices.

In the exemplary embodiment, the plurality of LEDs 212 are located along the left edge of the controller 102, although other aspects of the invention contemplate the LEDs 212 being located in any position on the controller 102 that enables the controller to function as described herein. In certain other aspects of the invention, the LEDs 212 may include, without limitation, organic light emitting diodes (OLEDs), polymer light emitting diodes (PLEDs), surface-conduction electron emitters (SEDs), and/or any other device capable of presenting information to the user.

Referring back to FIG. 6, the electronic sensor assembly 114 is coupled to the back panel 184 of the gate mechanism enclosure 122, generally in a portion of the interior space 126 located behind the terminal board 124. The electronic sensor assembly 114, and in particular, the encoder 120 and a position sensor 160 (shown in FIG. 14), is communicatively coupled to the controller 102. As described herein, the encoder drive gear 116 is coupled to the gate arm shaft 112 and is drivingly intermeshed with the encoder gear 118.

FIG. 14 is an enlarged view of a portion of the crossing gate mechanism 100 shown in FIG. 6, illustrating the electronic sensor assembly 114. In the exemplary embodiment, the sensor assembly 114 includes a calibration assembly 156. The calibration assembly 156 is comprised of a calibration gear 158 and a position sensor 160. In the exemplary embodiment, the calibration gear 158 is fixedly coupled directly to the encoder drive gear 116 for rotation with the gate arm shaft 112. However, in alternative aspects of the present invention, the calibration gear 158 may be coupled to the gate arm shaft 112 separate from the encoder drive gear 116 in any manner that enables the calibration assembly 156 to function as described herein.

Figure 15:
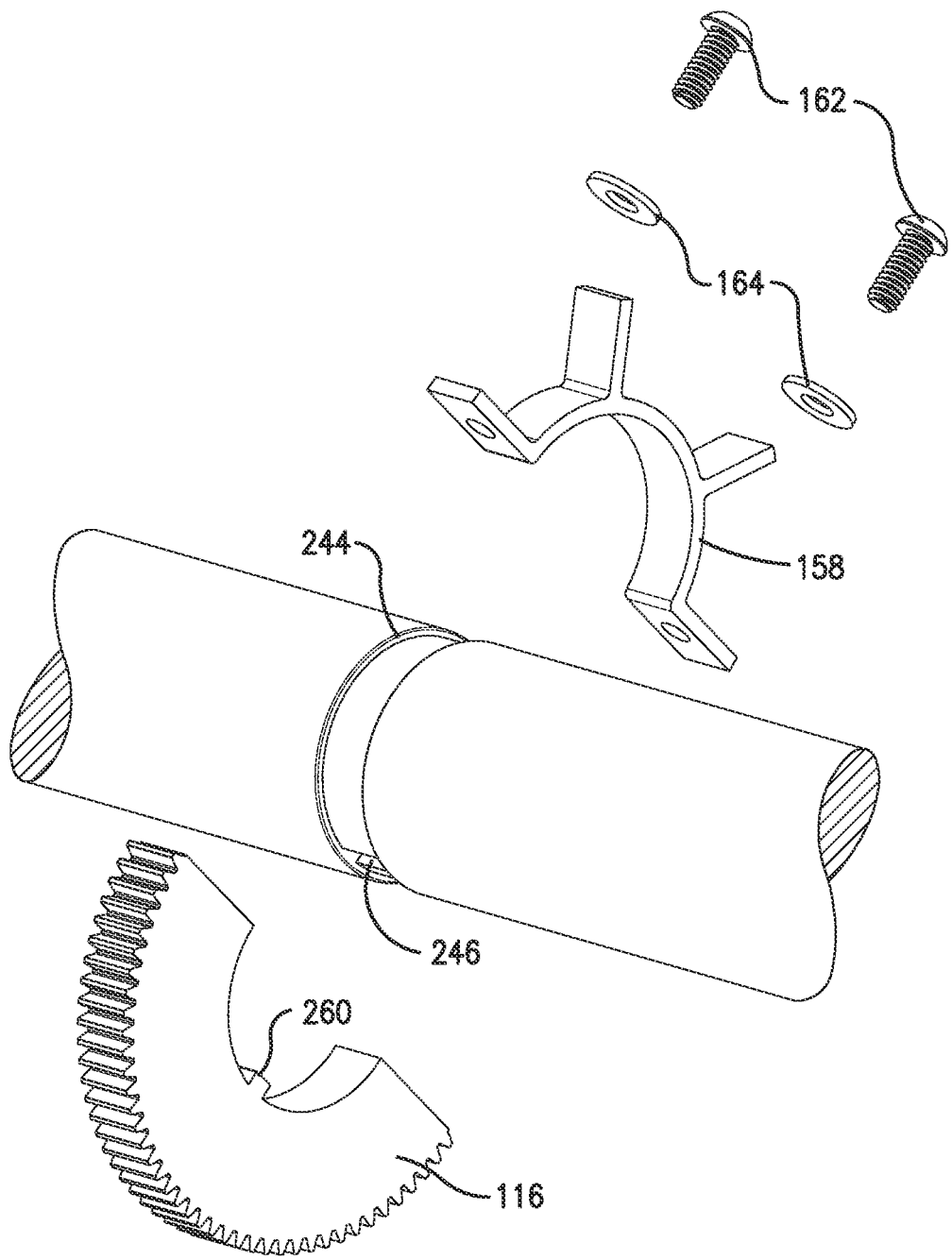
FIG. 15 is an exploded view of part of the electronic sensor assembly, particularly illustrating coupling of a calibration gear to an encoder drive gear as depicted in FIG. 14.

FIG. 15 is an exploded view illustrating coupling of the calibration gear 158 to the encoder drive gear 116, according to one embodiment of the present invention. A plurality of fasteners 162 extend through respective washers 164 and mounting holes 282 (shown in FIG. 21) of the calibration gear 158. Each of the fasteners 162 is coupled to the encoder drive gear 116, for example, by threading into a threaded hole 268 (shown in FIG. 19). The encoder drive gear 116 and the calibration gear 158 are fitted into a circumferential groove 244 of the gate arm shaft 112 to limit or eliminate axial movement of the encoder drive gear 116 and the calibration gear 158 relative to the gate arm shaft 112. In addition, in the exemplary embodiment, a locating key portion 260 of the encoder drive gear 116 is fitted into an axial groove 246 of the gate arm shaft 112 to rigidly secure the encoder drive gear 116 and calibration gear 158 for rotation therewith. However, in alternative aspects of the present invention, the encoder drive gear 116 may have a keyway defined therein rather than having the locating key portion 260 protruding therefrom. In such alternative embodiments, the encoder drive gear 116 may be coupled to the gate arm shaft 112 for rotation using a traditional key (not shown), as is well known in the art.

As shown in FIGS. 16 and 17, the gate arm shaft 112 is generally cylindrical in shape having a predetermined maximum outer diameter of $D_1$, determined, for example, at least in part on a strength necessary to carry the gate arm 20 (shown in FIG. 2). The circumferential groove 244 is spaced from an end of the gate arm shaft 112 a predetermined distance 248, which is determined, in part, to position the encoder drive gear 116 and the calibration gear 158 within the gate mechanism enclosure 122. The circumferential groove 244 is fabricated substantially perpendicular to the rotation axis 252 of the gate arm shaft 112 and has a predetermined width 250 sized to receive the encoder drive gear 116 and calibration gear 158, as described herein. As shown in FIG. 17, the circumferential groove 244 has a diameter of $D_2$, smaller than diameter $D_1$, thereby defining a depth of the circumferential groove 244.

The axial groove 246 is located within the circumferential groove 244, with the axial groove 246 extending axially across the circumferential groove 244. As shown in FIGS. 16 and 17, the axial groove 246 extends axially along the rotation axis 252 and is substantially centered thereon. As shown in FIG. 17, the axial groove 246 has a width 254 and a depth 256, which are sized and shaped to receive the locating key portion 260 (or in some aspects of the present invention, a traditional key) of the encoder drive gear 116. In particular, the width 254 and depth 256 are sized to slidably engage the locating key portion 260 of the encoder drive gear 116 (shown in FIG. 18).

Figure 18:
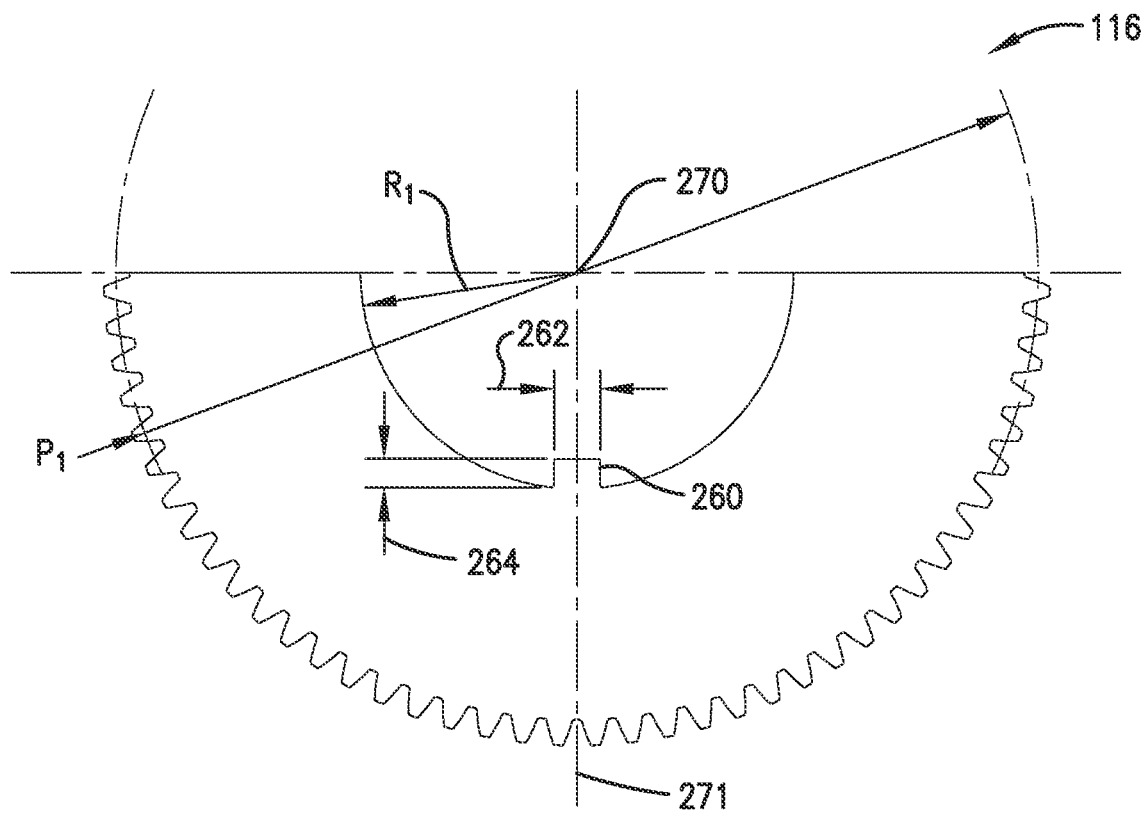
FIG. 18 is a front view of the encoder drive gear as depicted in FIG. 15.
Figure 19:
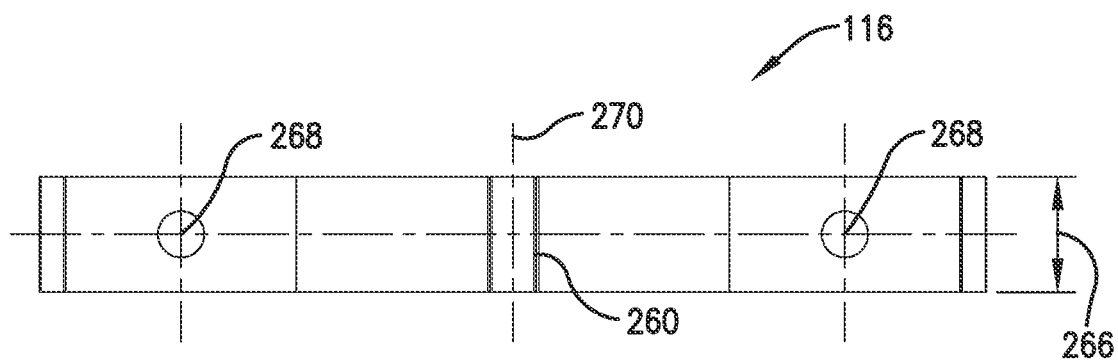
FIG. 19 is a top view of the encoder drive gear as depicted in FIG. 18.

As shown in FIGS. 18 and 19, in the exemplary embodiment, the encoder drive gear 116 is a half moon gear, extending about one hundred and eighty degrees (180°) about a central axis 270. It is noted that in the exemplary embodiment, the central axis 270 is aligned with the rotation axis 252 of the gate arm shaft 112 when assembled thereto (see FIG. 14). The encoder drive gear 116 is substantially symmetrical about a vertical axis 271. An inner radius $R_1$ defines a semicircular cutout, which is sized to correspond to the diameter $D_2$ of the circumferential groove 244 (shown in FIGS. 16 and 17) to facilitate being coupled thereto. The locating key portion 260 of the encoder drive gear 116 extends radially inward from an edge of the cutout and is substantially centered with respect to the vertical axis 271, as shown in FIG. 18. That is, the locating key portion 260 is substantially centered between the two (2) respective ends of the half moon gear. The locating key portion 260 has a width 262 and a height 264 that are sized and shaped to slidably engage the axial groove 246 of the gate arm shaft 112. However, in certain aspects of the present invention, the locating key portion 260 may be replaced with a keyway. In such embodiments, the keyway may be located in substantially the same position as the locating key portion 260 and may be sized and shaped to receive a key that slidably engages the axial groove 246 of the gate arm shaft 112.

In the exemplary embodiment, a threaded mounting hole 268 is defined in each of the two (2) respective ends of the half moon gear, being generally centered thereon as shown in FIG. 19. Referring to FIG. 18, a pitch diameter Pi defines the outer radial extent of the gear teeth and is selected to intermesh with the encoder gear 118 to define a gear ratio between the encoder drive gear 116 and the encoder gear 118. A predetermined thickness 266 of the encoder drive gear 116 is sized to be fitted within the circumferential groove 244 of the gate arm shaft 112 to limit or eliminate axial movement of the encoder drive gear 116 relative to the gate arm shaft 112.

As described above, the gate arm 20 is generally rotated between a substantially horizontal position to a generally vertical position, providing an angular range of gate arm motion of about ninety degrees (90°). It should be noted however, that the gate arm 20 may rotate more than ninety degrees (90°), for example, during setup and/or calibration procedures or instances of gate failure. The gear ratio between the encoder drive gear 116 and the encoder gear 118 is determined based on actual travel limits of the gate arm 20 and the desire to limit the encoder 120 from turning more than three hundred and sixty degrees (360°) between the gate arm travel limits. Limiting the rotation of the encoder 120 to less than a full turn facilitates ensuring that the encoder 120 provides unique position values for each position of the gate arm 20 at and between its travel limits. In the exemplary embodiment, the gear ratio is in a range between and including about three tenths to one (0.3:1) and about four tenths to one (0.4:1). In a preferred embodiment, the gear ratio is about three hundred and seventy-five thousandths to one (0.375:1). However, in alternative aspects of the present invention, the gear ratio may be any value that enables the sensor assembly 114 to function as described herein.

Figure 20:
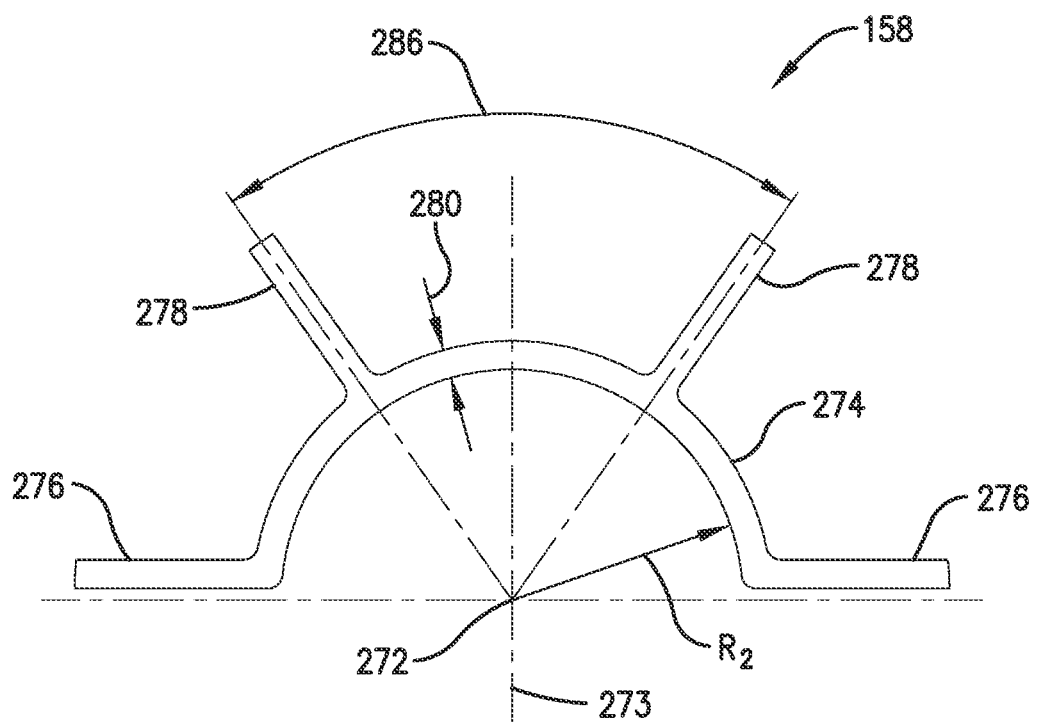
FIG. 20 is a front view of the calibration gear as depicted in FIG. 15.
Figure 21:
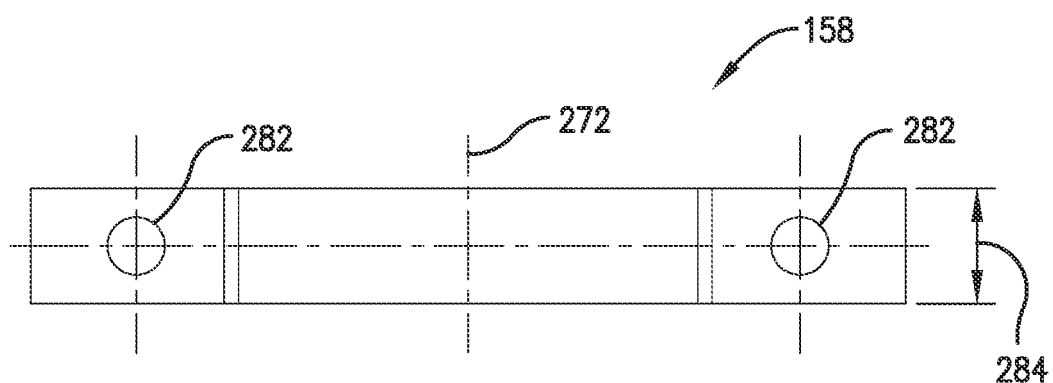
FIG. 21 is a top view of the calibration gear as depicted in FIG. 20.

Referring back to FIG. 15, the calibration gear 158 is coupled directly to the encoder drive gear 116. The calibration gear 158 and the encoder drive gear 116 cooperate to function as a two piece collar or clamp secured to the gate arm shaft 122. As shown in FIGS. 20 and 21, the calibration gear 158 includes an arcuate body portion 274. The body portion 274 is substantially semi-circular and extends about one hundred and eighty degrees (180°) about a central axis 270. The calibration gear 158 is substantially symmetrical about a vertical axis 273. At each end of the body portion 274, a mounting flange 276 extends radially outward therefrom. As shown in the bottom view (FIG. 21) of the calibration gear, a mounting hole 282 is defined on each flange 276. Each mounting hole 282 comprises an aperture that extends through the flange 276. The mounting holes 282 are generally located at the center of the flanges 276, although in some aspects of the present invention, the mounting holes 282 may be located on the flanges 276 in any position that enables the calibration gear 158 to be securely coupled to the encoder drive gear 116 as described herein.

As shown in FIG. 20, the calibration gear 158 preferably also includes a symmetric pair of reference elements 278 extending radially outward from the body portion 274. Each reference element 278 is located a predetermined distance from the position sensor 160 for enabling the reference element 278 to be detected as it passes by the position sensor 160 during rotation of the gate arm shaft 112. The two reference elements 278 are angularly spaced symmetrically about the vertical axis 273 to define a fixed angle 286 therebetween. In the exemplary embodiment, the fixed angle 286 is in a range between and including about twenty-five degrees (25°) and about seventy-five degrees (75°). However, in alternative aspects of the present invention, the fixed angle 286 may include any alternative measurements that enable the sensor assembly 114 to function as described herein. In addition, in certain alternative aspects of the present invention, the reference elements 278 need not be symmetric. Further, certain aspects of the present invention contemplate a single reference element.

In the exemplary embodiment, the calibration gear 158 has a predetermined thickness 284 that substantially corresponds to the thickness 266 of the encoder drive gear 116, and is sized to be fitted within the circumferential groove 244 of the gate arm shaft 112 to limit or eliminate axial movement of the calibration gear 158 relative to the gate arm shaft 112. Further, as shown in FIG. 20, the body portion 274, flanges 276, and reference elements 278 have a generally constant wall thickness 280.

Both the encoder drive gear 116 and the calibration gear 158 may be suitably fabricated from any number of suitable materials, including for example, and without limitation, metal, plastic, fiber-reinforced polymers, or other suitable materials. For example, the encoder drive gear 116 and the calibration gear 158 may be formed in a molding process used for producing parts from thermoplastic or thermosetting plastic materials. However, in alternative aspects of the present invention, the encoder drive gear 116 and the calibration gear 158 may be constructed from other suitable materials, and the encoder drive gear 116 and the calibration gear 158 may be constructed of different materials from each other, without departing from the scope of the invention. In some aspects of the present invention, the encoder drive gear 116 and/or the calibration gear 158 may alternatively be integrally formed with the gate arm shaft 112 or secured to the gate arm shaft 112 in manners other than shown.

Referring back to FIG. 14, the sensor assembly 114 includes a fixed mount 166, which is coupled to the gate mechanism enclosure 122, and in particular, the back panel 184 of the gate mechanism enclosure 122. The fixed mount 166 operates to fix a position of the encoder 120 and the position sensor 160 relative to the encoder drive gear 116 and the calibration gear 158. The fixed mount 166 may be coupled to the back panel 184 via the one or more fasteners 168.

Figure 22:
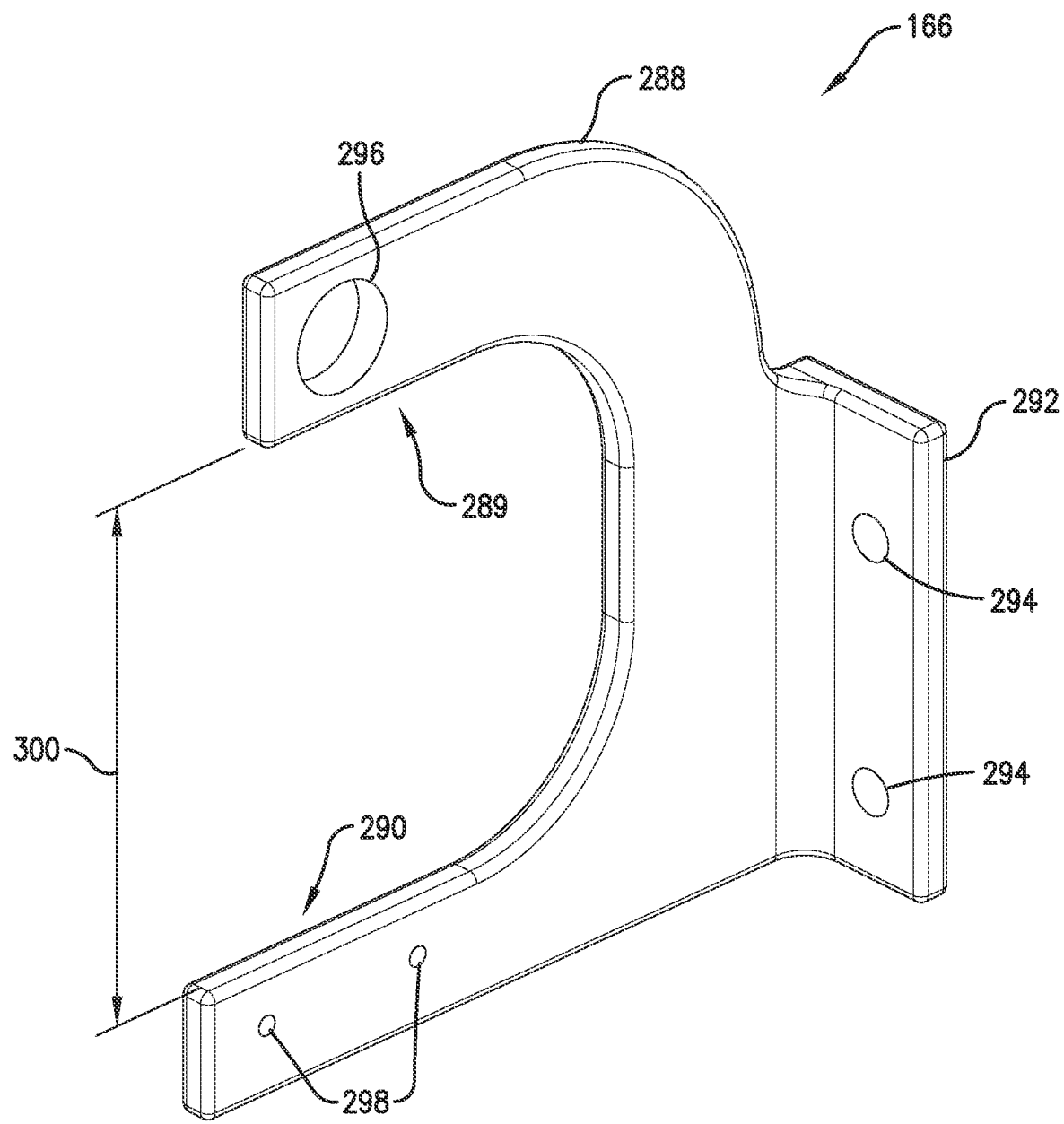
FIG. 22 is a perspective view of a fixed mount as depicted in FIG. 14.

As shown in FIG. 22, the fixed mount 166 has a generally C-shaped body portion 288 defining two (2) arms 289 and 290. A transverse mounting flange 292 projects from an edge of the body portion 288 opposite the arms 289 and 290. Proximate a distal end of the arm 289, the fixed mount 166 includes a mounting hole 296 sized to receive the position sensor 160, as shown in FIG. 14. In addition, proximate the distal end of the arm 290, the fixed mount 166 includes one or more mounting holes 298 for coupling the encoder 120 to the fixed mount 166. In the exemplary embodiment, the mounting holes 296 and 298 comprise circular apertures that extend through the arms 289 and 290, respectively. The arms 289 and 290 are spaced a predetermined distance 300 to facilitate receiving the gate arm shaft 112, as illustrated in FIG. 14.

In the exemplary embodiment, the position sensor 160 is an inductive proximity sensor, which detects the presence of nearby objects, such as the two reference elements 278 of the calibration gear 158, without physical contact. However, in alternative aspects of the present invention, the position sensor 160 may include, for example, a capacitive proximity sensor, a photoelectric proximity sensor, an ultrasonic proximity sensor, and the like. In one preferable embodiment, the position sensor 160 is a PNK-CN-3A proximity sensor, available from AUTOMATIONDIRECT.COM Inc., Cumming, GA.

In the exemplary embodiment, the encoder 120 is an absolute rotary encoder, which transforms a mechanical angular position of a shaft, such as the gate arm shaft 112, into an electronic position signal that can be processed by the controller 102. The absolute rotary encoder 120 provides unique position values (e.g., via discrete voltage outputs) from the moment it is powered up by scanning the position of a coded element of the encoder. All positions of the encoder 120 correspond to a unique value. Thus, any movement of the encoder 120 occurring while the encoder 120 is without power is translated into accurate position values once the encoder 120 is powered up again. In alternative aspects of the present invention, however, the encoder 120 may include for example, and without limitation, an incremental rotary encoder, an optical rotary encoder, a mechanical rotary encoder, and the like. In other aspects of the present invention, the encoder may be replaced with an electronic transducer that includes, without limitation, an accelerometer or gyroscopic sensor that is coupled to the gate arm shaft 112 to detect the position of the gate arm shaft 112.

In operation, the position of the gate arm shaft 112, and therefore, the gate arm 20, is detected by the encoder 120 and transmitted to the controller 102. The calibration assembly 156 is used to calibrate the encoder 120 and to continuously monitor the accuracy of the detected position of the gate arm 20. The controller 102 is operable to determine an out of tolerance or calibration error and notify a user via the user interface 104. Upon a determination that an out of tolerance condition exists, the controller 102 can place the crossing gate mechanism 100 into a fail-safe state, whereby the controller 102 turns off the motor 108 and turns on a snubber circuit (not shown) to affect a slow descent of the gate arm 20.

Referring to FIGS. 14 and 20, the sensor assembly 114 is shown when the gate arm 20 is in the upward most position. In the exemplary embodiment, the position sensor 160 detects a fixed angular characteristic of the gate arm shaft 112. As the gate arm 20 is rotated downward, the gate arm shaft 112 rotates in the counterclockwise direction relative to FIG. 14. As the gate arm shaft 112 rotates, a first reference element 278 passes in front of the position sensor 160. The position sensor 160 detects the reference element 278 and transmits a characteristic signal to the controller 102 indicating that a calibration reference point has been detected. The controller 102 compares a known rotational angle position of the reference element 278 to the detected angle received from the encoder 120, when the reference element 278 is detected by the position sensor 160. If a difference between the two angles is greater than an acceptable tolerance (e.g., ±two degrees (2°)), the controller 102 determines that an out of tolerance condition exists for the crossing gate mechanism 100 and places the crossing gate mechanism 100 in the fail-safe state until the problem is addressed.

The second reference element 278 functions substantially the same as the first reference element described above. This enables the controller 102 to calibrate the encoder 120. Before calibration, the gate arm 20 is lowered to a substantially horizontal position. In the horizontal position, the two (2) reference elements 278 are located angularly outward from the position sensor 160, relative to the FIG. 14. The gate arm 20 is raised upward to a generally vertical position. As the gate arm shaft 112 rotates the gate arm 20 upward, the two (2) reference elements 278 pass by the position sensor 160, for example, in one suitable embodiment, at thirty degrees (30°) and sixty degrees (60°) respectively. The two reference element angles are known (stored in the controller 102) because they are fixed to the gate arm shaft 112 and defined by the calibration gear 158. The output signal of the encoder 120 is noted with each reference element 278 detection by the position sensor 160. These values are then used to calibrate the encoder 120. In the exemplary embodiment, calibration is completed by rotating the gate arm 20 upward and then downward. This allows for error checking that will accept or reject the calibration based on the differences between the upward rotation and downward rotation results. If the difference between the first and second reference elements 278 is greater than an acceptable tolerance (e.g., ±two degrees (2°)), the calibration fails. The user should refer to the user manual in instances of calibration failure for troubleshooting the crossing gate mechanism 100. The calibration process must be repeated until the data is acceptable in both directions of movement before the crossing gate mechanism 100 can operate in a safe manner.

Figure 23:
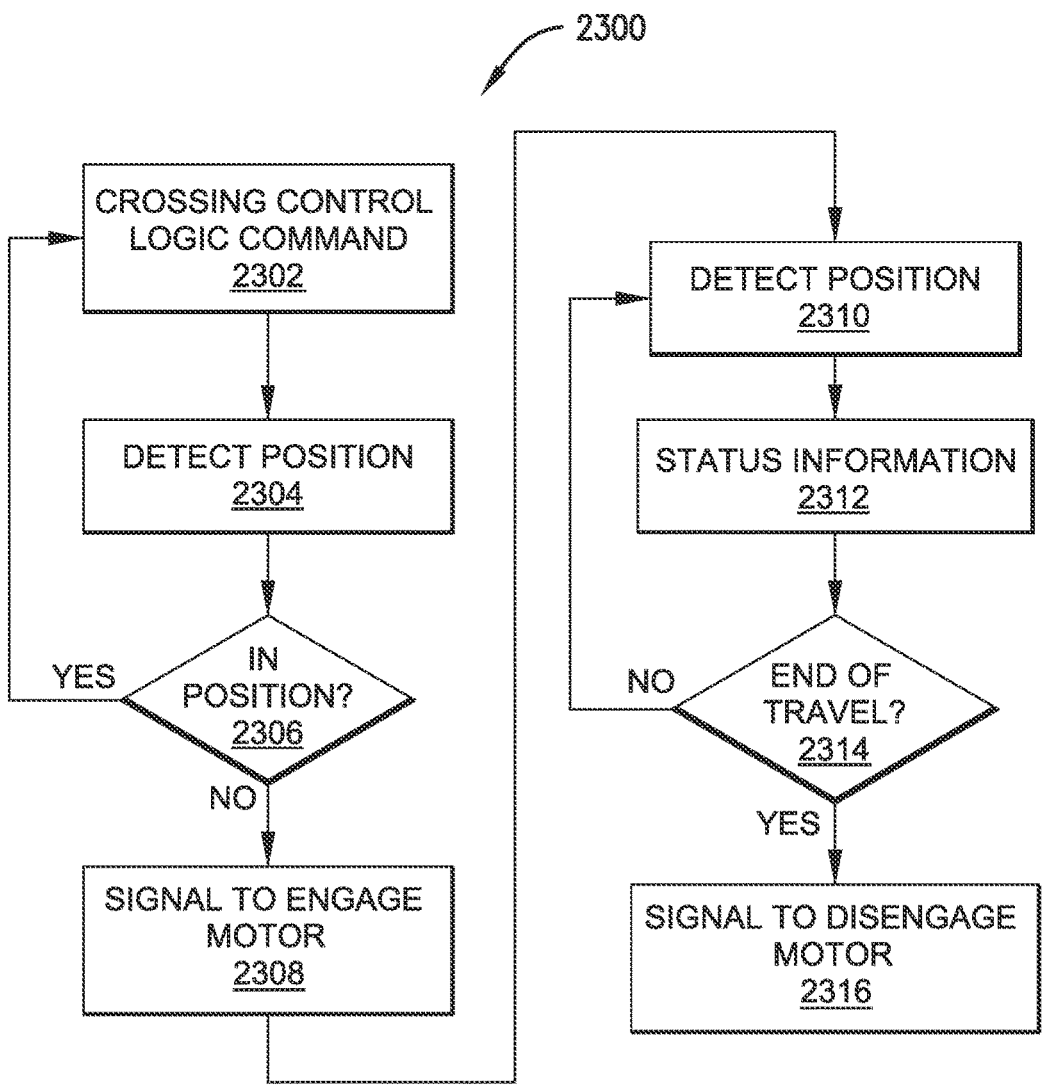
FIG. 23 is a flow chart illustrating a gate control method for controlling the gate arm shaft by the controller.

FIG. 23 is a flow chart illustrating a gate control method 2300 for controlling the gate arm shaft 112 by the controller 102, using the encoder 120 to detect the position of the gate arm shaft 112. In the exemplary embodiment, at operation 2302, a crossing control logic command generated, for example, by the crossing control logic 38 of the crossing control logic unit 36, is received by the controller 102. The crossing control logic command may be generated, for example, in the event of approaching rail traffic. The controller 102 receives the command sent by the crossing control logic 38 and, in operation 2304, detects the position of the gate arm shaft 112 from the encoder 120 to determine if the gate arm shaft 112 is in a proper position. If the gate arm shaft 112 is not in the proper position, at operation 2308 the controller 102 transmits the command signal, for example, to the motor drive circuit 106 to engage motor 108. At operation 2310, the controller 102 continues to detect the position of the gate arm shaft 112 from the encoder 120 until the gate arm shaft 112 has reached its end of travel. While the gate arm shaft 112 is rotating, at operation 2312, the controller 102 transmits status information to the crossing control logic 38 based on the position of the gate arm shaft 112. At operation 2314, the controller 102 determines whether the gate arm shaft 112 has reached its commanded end of travel. Once the gate arm shaft 112 has reached its commanded end of travel and is in the proper position, the controller 102 transmits a signal to disengage the motor 108. The controller 102 subsequently waits to receive another crossing control logic command from the crossing control logic 38 and the gate control method 2300 is repeated.

In certain aspects of the present invention, the controller 102 may include one or more pre-programmed contact functions that include predetermined angle ranges for switching a state of one or more contacts of the crossing gate mechanism 100, respectively. For example, and without limitation, in one suitable embodiment, the controller 102 may include a preset range for switching the state of a bell contact that turns a warning bell, such as the warning bell 32, on or off. In such an embodiment, the controller 102 may close the bell control contact when the gate arm 20 is in a range between and including about five degrees (5°) and about ninety degrees (90°). Furthermore, in some embodiments, the controller 102 may include a preset range for switching the state of a signal light contact that turns the flashing signal lights, such as the signal lights 30, on or off. For example, the controller 102 may close the signal light contact when the gate arm 20 is in a range between and including about eighty-two degrees (82°) and about ninety degrees (90°). Moreover, in some embodiments of the present invention, the controller 102 may include a preset range for switching the state of a gate down contact that signals the crossing control logic unit 36 when the gate arm 20 is in the down or horizontal position. For example, the controller 102 may close the gate down contact when the gate arm 20 is in a range between and including about zero degrees (0°) and about five degrees (5°). It is noted that the controller 102 may include one or more of the pre-programmed contact functions discussed above, may not include any of the pre-programmed contact functions, and/or may include other pre-programmed contact functions not described.

Figure 1A:
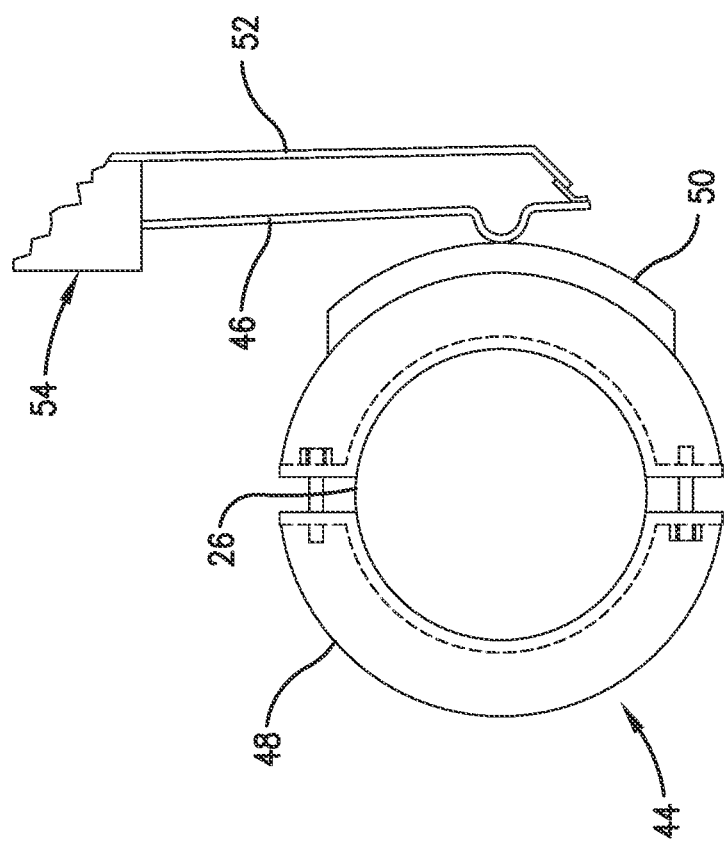
FIG. 1A is a plan view of a prior art cam lobe assembly, illustrating a cam contact in a closed position.
Figure 24:
FIG. 24 is a block diagram describing the function of the user interface.

FIG. 24 is a block diagram describing the function of the user interface 104. In the exemplary embodiment, a user controls and inputs information into the user interface 104 using, for example, input devices 214, 216, 218, 220, 222, and 224. In addition, the user receives feedback from the user interface 104 in a graphical representation on the display 210. The user interface 104 enables the use of digital values to digitally represent the mechanical operation of a traditional cam lobe assembly of the prior art (shown in FIGS. 1A and 1B). The controller 102 functions, in part, as the safety check on parameters entered into the grade crossing gate system 10 to represent the opened and closed angles of the gate arm 20. The controller 102 automatically dictates the specific ranges that the user can set, preventing the crossing gate mechanism 100 from being setup in an unsafe manner. The controller 102 monitors the angle of the gate arm shaft 112 and controls the status of the outputs sent to the crossing control logic 38.

FIG. 25A is a block diagram of the user interface 104. The user may access a main menu 2504 of the user interface 104 from a main standby screen 2502. The main menu 2504 consists of the following information categories or submenus: MONITOR 2506, SETTINGS 2508, CONTROLS 2510, ERRORS 2512, and RESET 2514. The user can access any of these submenus from the main menu 2504. FIG. 25B depicts an image of the graphical user interface (GUI) of the user interface 104. In the exemplary embodiment, to step into the main menu 2504 from the main standby screen 2502 screen, the user presses and holds the ENTER/CONFIRM input 214 and the MENU/CANCEL input 216 of the operator panel 209 (FIG. 13) for about three (3) seconds. Once in the main menu 2504, the arrow icon indicates to the user the submenu currently selected. The user may press the UP input 218 and DOWN input 220 to move the indicator arrow up or down respectively to change the selected submenu. Pressing the ENTER/CONFIRM input 214 or the RIGHT input 222 will select the submenu and present the selected submenu screen to the user.

FIG. 26A is a block diagram of the MONITOR 2506 submenu and FIG. 26B is a GUI representation of the MONITOR 2506 submenu. The MONITOR 2506 submenu displays the contact state indication 2604 of one or more relay contacts of the crossing gate mechanism 100. In addition, the one or more LEDs 212 on the controller 102 may also present a contact state indication of the relay contacts. An indicator description 2602 of this submenu defines for the user the visual difference between an open relay contact and a closed relay contact by displaying an example with an empty circle and a filled circle labeled open contact and closed contact, respectively. An associated LED 212 may be turned on for a closed contact and off for an open contact. Pressing the ENTER/CONFIRM input 214 functions to display the contact state indication 2604 screen.

The contact state indication 2604 screen displays one or more relay labels and the current state of each relay contact associated with a respective label so that all the outputs of the crossing gate mechanism 100 can be monitored and/or viewed by the user. In the exemplary embodiment, the contact state indication 2604 screen indicates that the contacts for Gate Clear Indicator (GCI), Bell, Gate Hold (GH), and Power Down (PD) are all closed. Because the gate arm 20 is in the ninety degree (90°) position, as indicated at the top of the display, all the relay outputs are indicated as working properly. The visual indication of the state of the outputs, by the contact state indication 2604 screen and/or the LEDs 212, facilitates reducing troubleshooting time by giving the user a quick representation of the output states at any given time. This provides a quick check on the outputs of the crossing gate mechanism 100 to determine if the relay contacts are opening and closing at the desired angles of the gate arm shaft 112 during operation.

Figure 27B:
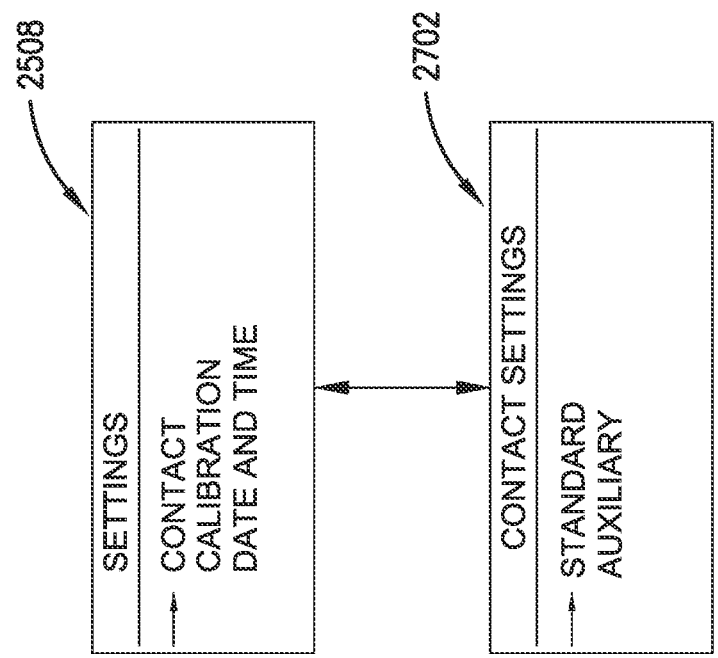
FIG. 27B is a GUI representation of the Settings submenu.
Figure 27A:
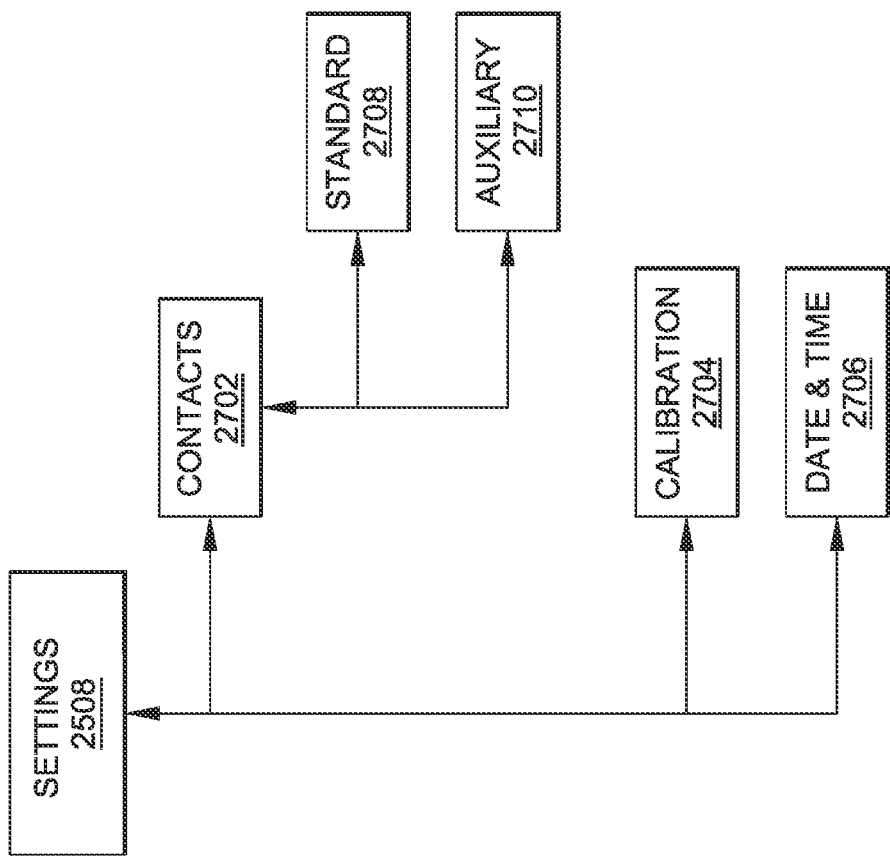
FIG. 27A is a block diagram for the Settings submenu of the user interface.

FIG. 27A is a block diagram for the SETTINGS 2508 submenu. In the exemplary embodiment, SETTINGS 2508 includes three (3) main sections: Contacts 2702, Calibration 2704, and Date & Time 2706. The Contacts 2702 include Standard 2708 and Auxiliary 2710 contacts. FIG. 27B is a GUI representation of the SETTINGS 2508 submenu. The SETTINGS 2508 submenu may be navigated in substantially the same manner as described above with reference to the main menu 2504, where an indicator arrow represents which line is selected. Pressing the UP input 218 or the DOWN input 220 moves the indicator arrow up or down respectively to change the selection and pressing the RIGHT input 222 or ENTER/CONFIRM input 214 will display the selected submenu screen.

Figure 28A:
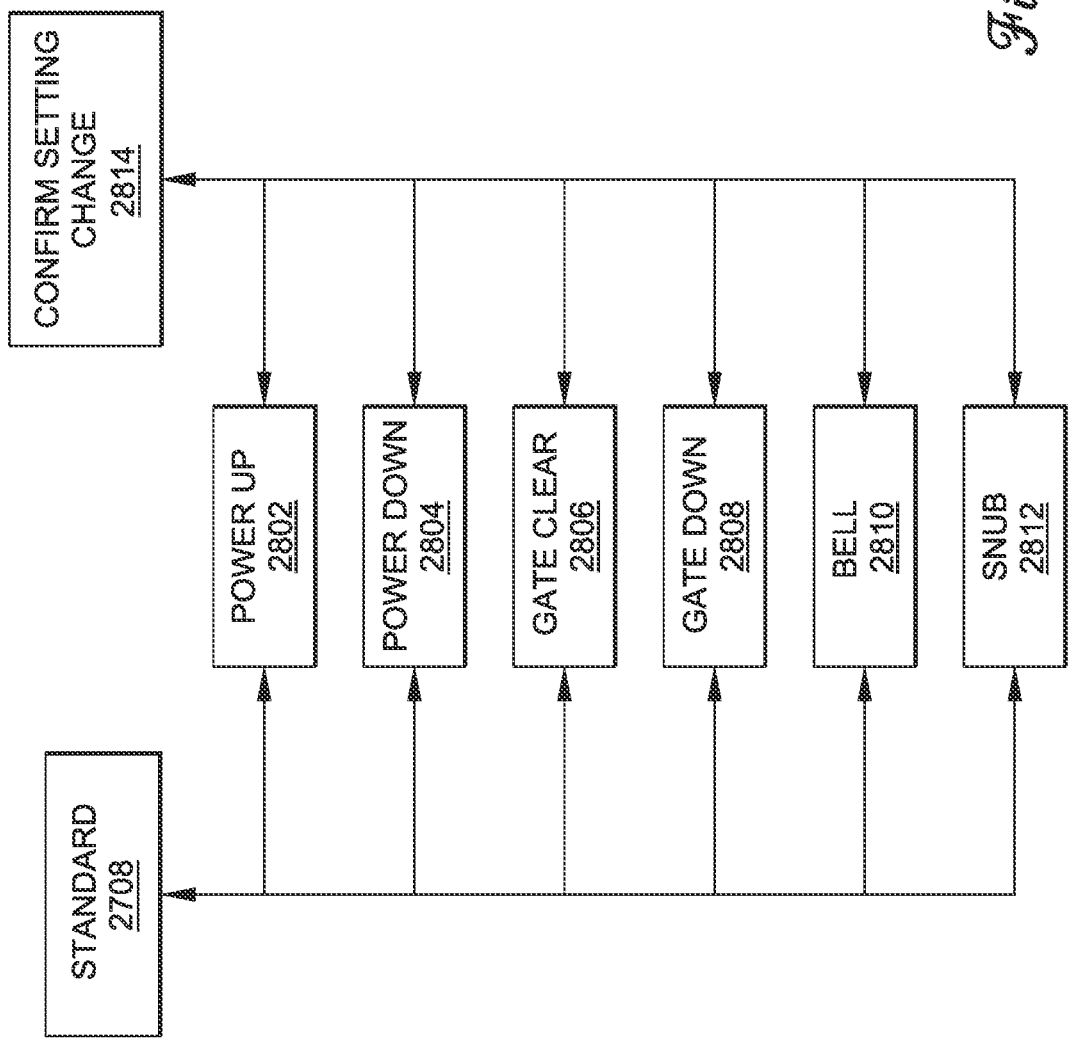
FIG. 28A is a block diagram for the Standard Contact submenu of the user interface.

FIG. 28A is a block diagram for the Standard Contact 2708 submenu. In the exemplary embodiment, the Standard 2708 contacts include six (6) contacts, although in certain alternative aspects of the present invention, more or fewer standard contacts may be included. The six (6) standard contacts are permanently enabled and have default values consistent with average physical cam settings on a typical gate mechanism. The standard contacts have minimum and maximum limits, of which the values have been predetermined and stored in the controller 102.

In the exemplary embodiment, the Standard 2708 contacts include the following: Power Up 2802, Power Down 2804, Gate Clear 2806, Gate Down 2808, Bell 2810, and Snub 2812. After the user has selected a contact, for example, by pressing the UP input 218 or the DOWN input 220, and subsequently pressing the RIGHT input 222 or ENTER/CONFIRM input 214, the selected contact's screen is displayed to the user.

Figure 28B:
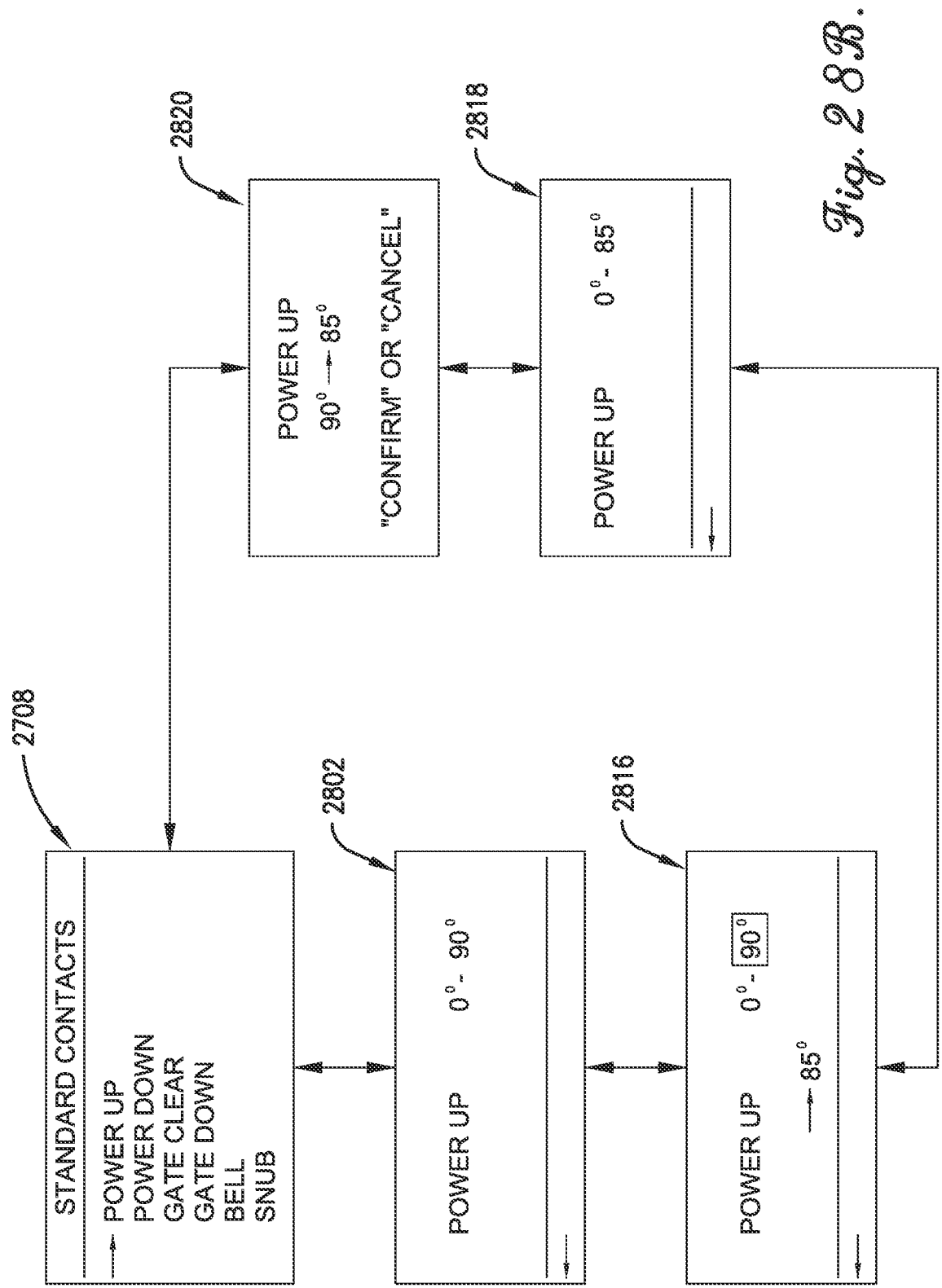
FIG. 28B is a GUI representation of the Standard Contact submenu, illustrating the submenus for Power Up and Power Down contacts.

FIG. 28B is a GUI representation of the Standard Contact 2708 screen, illustrating the submenus for the Power Up 2802 and Power Down 2804 contacts. Generally, the selected contact's submenu is displayed to the user and includes the contact name and angle range for adjustment, along with the value to be changed being highlighted. The user can change the value to any desired value within the selected contact's minimum and maximum limitations. If the value is changed and the user returns from the screen, for example, by pressing the MENU/CANCEL input 216, the user interface 104 prompts the user to confirm or cancel the setting change.

In one example illustrated in FIG. 28B, on the Standard Contact 2708 screen, the user selects Power Up 2802 as the contact to be changed by pressing the ENTER/CONFIRM input 214 or the RIGHT input 222. The Power Up 2802 screen is then displayed with contact name and adjustable parameters on the first line of text. The contact parameter is displayed in the form of a range to maintain consistency with the preexisting system crossing control logic 38. As such, if the gate arm shaft 112 angle is detected by the controller 102 as being within the range, then the contact will be activated. Otherwise, if the gate arm shaft 112 angle is outside of the range, it will be deactivated. It is noted that during adjustment, one value of the range remains fixed, whereas the other value can be adjusted. The fixed value is continuously displayed so the user knows the full range of which the contact will be activated.

To adjust the range values, the user presses the ENTER/CONFIRM input 214 to select the parameter. The selected parameter will be highlighted for the user, for example, by alternating between highlighted and not highlighted, as shown in GUI screen 2816. This alerts the user as to which value will be changed. As shown in screen 2816, the value being changed is the ninety degree (90°) value, which is the upper limit of the Power Up 2802 contact. In one suitable embodiment of the present invention, the value can be changed from its minimum to maximum value, or seventy degrees (70°) to ninety degrees (90°). This value is indicative of how far the gate arm 20 can be raised from horizontal before it stops and is held in place. The user is not allowed to change the value to anything below the minimum or above the maximum values stored in the controller 102.

After the user selects the value he or she wishes to adjust, the current value of the range is copied and displayed below the first text line and in the center of the screen. An indicator arrow is displayed adjacent the selected value. The user may press the UP input 218 or DOWN input 220 to change the value. In this illustrated example, the value is changed to eighty-five degrees (85°). If the user is satisfied with the change, he or she may press the ENTER/CONFIRM input 214 to store the changed value in the parameter slot being changed. Therefore, the value of eighty-five degrees (85°) will replace the ninety degrees (90°), making the newly adjusted range from zero degrees (0°) to eighty-five degrees (85°), as indicated at 2818. This means that the crossing gate mechanism 100 will power up the motor 108 to rotate the gate arm 20 from a horizontal position at zero degrees (0°) to a generally vertical position at eighty-five degrees (85°). The user can return to the Standard Contacts 2708 screen by pressing the MENU/CANCEL input 216. A Confirm or Cancel screen 2820 is displayed to the user to confirm or cancel the changes. The user may then press the ENTER/CONFIRM input 214 or the MENU/CANCEL input 216. Confirming or canceling returns the user to the Standard Contact 2708 screen and will either store or discard the newly adjusted value based on the user's selection.

It is noted that some of the contacts have values that depend on other contacts. For example, the Power Up 2802 contact represents how far the gate arm 20 can be rotated upward, meaning that once the gate arm shaft 112 reaches the angle specified by the Power Up 2802 setting, the gate arm shaft 112 will stop and be held in place at that angle by a brake. The Gate Clear 2806 contact activates each time the gate arm shaft 112 rotates past the Gate Clear angle setting. Therefore, if the Gate Clear 2806 contact is set to eighty-six degrees (86°) and the Power Up 2802 contact is changed from ninety degrees (90°) to eighty-five degrees (85°), then the Gate Clear 2804 contact will never be activated because it is waiting for the gate arm 20 to reach eighty-six degrees (86°). For the prior art cam lobe contacts, the user must be mindful about changing both cams to ensure the gate mechanism functions properly. However, embodiments of the present invention enable the controller 102 to automatically adjust the other contacts to ensure proper functioning of the crossing gate mechanism 100. For example, in the instance case presented above, the controller 102 sets the Gate Clear 2806 contact setting below eighty-five degrees (85°) (e.g., one (1) to two (2) degrees (1° to 2°) below) so that when the crossing gate mechanism 100 is powered up and the gate arm 20 is raised to eighty-five degrees (85°), the Gate Clear 2806 contact will be closed just before the gate arm 20 stops and is held in place.

Figure 29A:
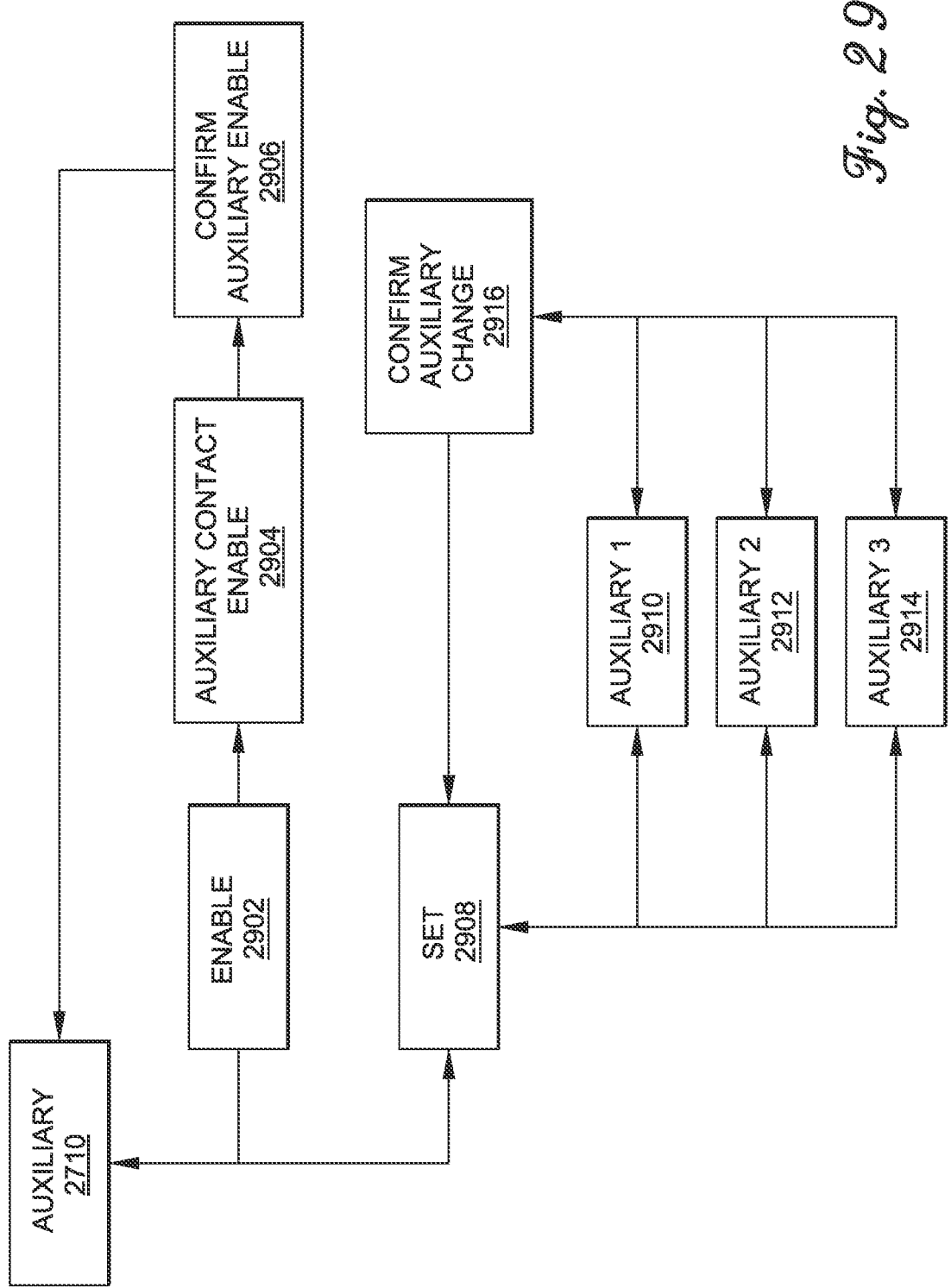
FIG. 29A is a block diagram for the auxiliary Contact submenu of the user interface.

FIG. 29A is a block diagram for the Auxiliary Contact 2710 submenu. Auxiliary contacts, such as Auxiliary 1, Auxiliary 2, and Auxiliary 3, labelled 2910, 2912, and 2914, respectively, are initially disabled and have default value ranges of zero degrees (0°) to ninety degrees (90°). The auxiliary contacts have minimum and maximum limitations stored in the controller 102, but they are the same of zero degrees (0°) to ninety degrees (90°), respectively, as the default value ranges. The Auxiliary Contact 2710 submenu includes two (2) submenus: Enable 2902 and Set 2908. The Enable 2902 submenu includes an auxiliary Contact Enable screen 2904, and after a selection of a contact on that screen, a Confirm Auxiliary Contact Enable screen 2906. The auxiliary contacts may be used, for example, to operate one or more optional components (not shown) of the crossing gate mechanism 100.

As illustrated in FIG. 29B, which is a GUI representation of the Enable 2902 submenu, the auxiliary Contact Enable screen 2904 lists each auxiliary contact, Auxiliary 1, Auxiliary 2, and Auxiliary 3, and the current state (e.g., On or Off) of that contact. The user can scroll through the list and select one or more of the auxiliary contacts to toggle the state On or Off, as shown in the screen 2918. Upon returning from the auxiliary Contact Enable screen 2904 or 2918, the user will be prompted to confirm the changes on the Confirm Auxiliary Enable screen 2906. In particular, in the exemplary embodiment, at the Auxiliary Contact 2710 screen, the user selects "ENABLE" by pressing the ENTER/CONFIRM input 214 or the RIGHT input 222, which takes the user to the auxiliary Contact Enable screen 2904. In the illustrated example, the user enables Auxiliary 1 by pressing the ENTER/CONFIRM input 214. The user presses the MENU/CANCEL input 216 when finished, which causes the Confirm Auxiliary Contact Enable screen 2906 to be displayed to the user. This screen, much like the previous screen, shows the list of auxiliary contacts and the selected state. If the user is satisfied with the selected states of the auxiliary contacts, the user presses the ENTER/CONFIRM input 214 to save the settings to the controller 102. The user may also press the MENU/CANCEL input 216 to discard the settings and return to the Auxiliary Contact 2710.

Referring back to FIG. 29A, the set 2908 submenu lists each enabled auxiliary contact. The user may select any of the enabled contacts and change the parameters of the selected contact. Unlike standard contacts that have one fixed value, the user can change both the upper and lower limit of an auxiliary contact. However, the user interface 104 will not allow the user to set the lower limit above the upper limit or the upper limit below the lower limit. If a change has been made to either parameter, the user will be prompted with a Confirm Auxiliary Change screen 2916 for each parameter that has changed. If the user confirms both, the new parameters will be retained by the controller 102, but if the user cancels either one of the parameters and in any order, then both changes will be discarded by the controller 102.

FIG. 29C is a GUI representation of the Set 2908 submenu. In the illustrated example, the user selects the Set 2908 submenu, which causes the user interface 104 to display an auxiliary contact list 2920 screen, which lists each enabled auxiliary contact. In the instance example, Auxiliary 1 and Auxiliary 3 are illustrated as being enabled. The user selects "AUXILIARY 1" which opens the Auxiliary 1 2910 screen. A cursor is represented on the screen highlighting one value beginning with the left side or zero degrees (0°). The cursor can be moved to the right parameter or ninety degrees (90°) by pressing the RIGHT input 222 and back to the left parameter by pressing LEFT input 224. The user may press the ENTER/CONFIRM input 214 and the highlighted value will begin to flash indicating that it is selected and ready for adjustment. Upon selection, the initial parameter value is copied below the first text line with an arrow pointing toward the value. In the illustrated example, the user changes the value to thirty degrees (30°) degrees by pressing the UP input 218. When the user is satisfied with the selected value, the user presses the ENTER/CONFIRM input 214 to retain that value in the lower parameter range. The user presses the RIGHT input 222 and then the ENTER/CONFIRM input 214 to select the upper parameter. The selected parameter value is copied below the first text line with an arrow pointing to it. The user adjusts the value to sixty degrees (60°) by pressing the DOWN input 220 and retains the value by pressing the ENTER/CONFIRM input 214.

After setting the upper and/or lower values of the range as desired, the user presses the MENU/CANCEL input 216 to return from the Auxiliary 1 2910 settings. The Confirm Auxiliary Changes screen 2916 is then presented to the user. The first adjustment is presented to the user for confirmation and then the second adjustment is presented to the user for confirmation. To confirm each adjustment, the user presses the ENTER/CONFIRM input 214. To discard the adjustment, the user presses the MENU/CANCEL input 216. The adjusted values are kept if and only if both changes are confirmed. If any one of the adjustments are canceled, the new parameter values are discarded. Once both values are kept or discarded, the user is returned to the Auxiliary Contact List 2920 screen.

Figure 30:
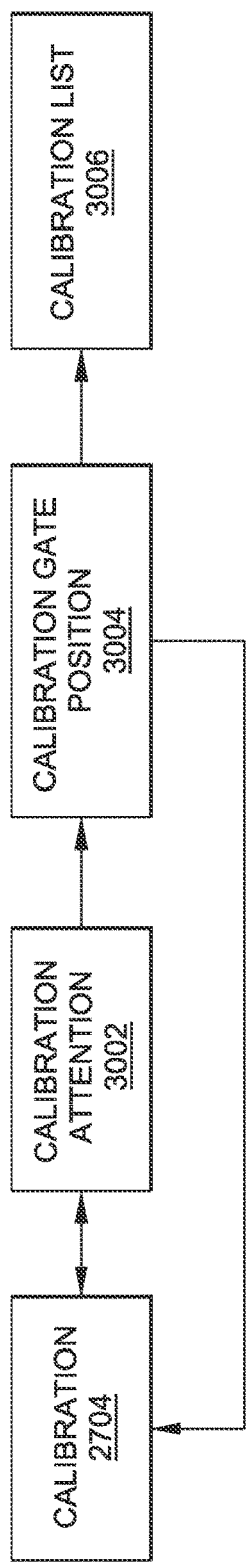
FIG. 30 is a block diagram of the Calibration submenu.

FIG. 30 is a block diagram of the Calibration 2704 section. In the exemplary embodiment, upon selection of the Calibration 2704 section of the user interface 104, a Calibration Attention screen 3002 is presented to the user. The Calibration Attention screen 3002 presents an instruction to the user to refer to the user manual for detailed instruction on calibration. A Calibration Gate Position screen 3004 is then presented to the user instructing the user that the gate arm 20 must be in the down or substantially horizontal position to begin calibration. After acknowledgment from the user, for example, by pressing the ENTER/CONFIRM input 214, a Calibration List screen 3006 is presented to the user.

Figure 31A:
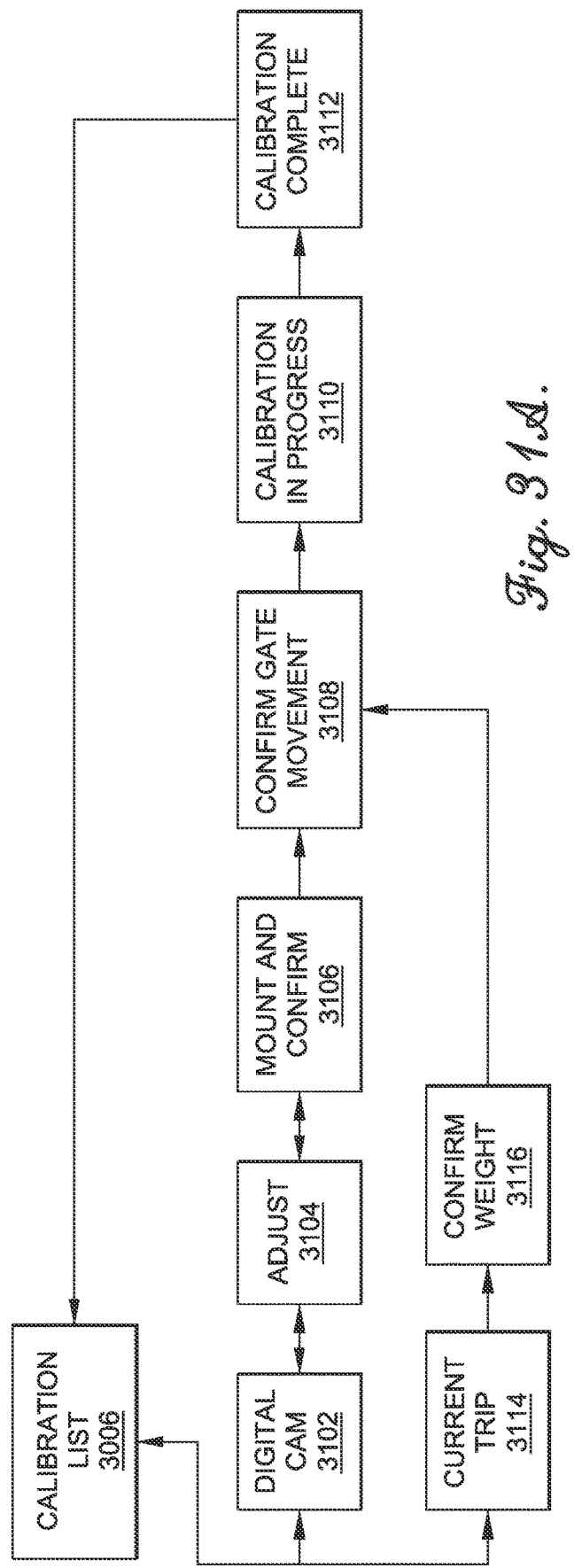
FIG. 31A is a block diagram of the Calibration List screen of the Calibration submenu as shown in FIG. 30.

FIG. 31A is a block diagram of the Calibration List screen 3006. In the exemplary embodiment, the calibration list includes two (2) items for calibration: a Digital Cam 3102 submenu and a Current Trip 3114 submenu. The user selects one of the two (2) options to proceed with calibration.

User selection of the Digital Cam 3102 submenu from the Calibration List 3006 screen causes the user interface 104 to display an Adjust screen 3104. FIG. 31B is a GUI representation of the Digital Cam 3102 submenu. Referring to FIGS. 31A and 31B, the Adjust screen 3104 instructs the user to manually rotate the encoder 120 until the flashing value on the screen is within the range presented on the Adjust screen 3104. In the exemplary embodiment, the displayed range is in the range between and including three and nine tenths (3.9) and four and one tenths (4.1). The highlighted value is the actual value being transmitted from the encoder 120 to the controller 102. The user confirms the value is within the range by pressing the ENTER/CONFIRM input 214. If the user wishes to cancel the calibration process or the encoder 120 cannot be adjusted within the displayed range, the user may press the MENU/CANCEL input 216 and return to the Calibration List screen 3006.

After confirming the encoder 120 is within the displayed range, the user interface 104 displays a Mount and Confirm screen 3106. The user is instructed to mount the encoder 120 to the gate mechanism enclosure 122 while maintaining the encoder value with the displayed range. In the exemplary embodiment, the user couples the encoder 120 to the fixed mount 166 within the gate mechanism enclosure 122, intermeshing the encoder gear 118 with the encoder drive gear 116, as shown in FIG. 14. After mounting the encoder 120, the user may press the ENTER/CONFIRM input 214 to confirm completion of the mounting step. Pressing MENU/CANCEL input 216 cancels the calibration process and returns the user to the Calibration List screen 3006.

If the user confirms successful completion of the encoder mounting step, the user interface displays a Confirm Gate Movement screen 3108. The Confirm Gate Movement screen 3108 operates to present a warning indicating that the gate arm 20 will move once the ENTER/CONFIRM input 214 is pressed. Pressing the ENTER/CONFIRM input 214 causes the gate arm 20 to rotate upward to the generally vertical position and return to the substantially horizontal position. The controller 102 monitors the encoder 120 and position sensor 160 outputs during the movement to determine whether the values indicate a successful calibration of the crossing gate mechanism 100. In addition, during the rotation of the gate arm 20, the user interface displays a Calibration in Progress screen 3110 to the user. After completion of the gate arm 20 rotation, a Calibration Complete screen 3112 is displayed indicating whether the calibration was successfully completed or whether the calibration failed. The user is prompted to press the ENTER/CONFIRM input 214 to return to the Calibration List screen 3006.

Referring back to FIG. 31A, user selection of the Current Trip 3114 submenu from the Calibration List 3006 causes the user interface 104 to display a Confirm Weight screen 3116. FIG. 31C is a GUI representation of the Current Trip 3114 submenu. Referring to FIGS. 31A and 31C, the Confirm Weight screen 3116 instructs the user to confirm that the crossing gate mechanism 100, and in particular the gate arm 20, has been properly weighted in accordance with the user manual. The user may press the ENTER/CONFIRM input 214 to continue or press the MENU/CANCEL input 216 to return to the Calibration List screen 3006. Upon confirmation that the gate arm 20 is properly weighted, the user interface 104 displays the Confirm Gate Movement screen 3108. As described above, the Confirm Gate Movement screen 3108 presents a warning indicating that the gate arm 20 will move after the ENTER/CONFIRM input 214 is pressed. Pressing the ENTER/CONFIRM input 214 causes the gate arm 20 to rotate upward to the generally vertical position and return to the substantially horizontal position. The controller 102 monitors the electrical current supplied to the motor 108, and if the current is within a predetermined range, the controller 102 stores a corresponding current limit value that will allow the gate arm 20 to rotate upward and downward without tripping the current sensor. In addition, during the rotation of the gate arm 20, the user interface displays the Calibration in Progress screen 3110 to the user. After completion of the gate arm 20 rotation, the Calibration Complete screen 3112 is displayed indicating whether the calibration was successfully completed or whether the calibration failed. The user is prompted to press the ENTER/CONFIRM input 214 to return to the Calibration List screen 3006.

FIG. 32A is a block diagram of the Date & Time 2706 submenu. FIG. 32B is a GUI representation of the Date & Time 2706 submenu. In the exemplary embodiment, upon selection of the Date and Time option in the Settings menu 2508, the Date & Time screen 2706 is displayed on the user interface 104. One of the date and/or time values is highlighted on the Date & Time screen 2706, indicating that parameter may be adjusted by the user. The user may press the LEFT input 224 or the RIGHT input 222 to change the highlighted parameter. The parameters in the Date and Time submenu include the hour and minute for time and the month, day, and year for date. Pressing the ENTER/CONFIRM input 214 will select the highlighted parameter causing it to flash. While the parameter is flashing, the user may press the UP input 218 or the DOWN input 220 to change the parameter to a desired value, as indicated in a Set Date/Time screen 3202. The user may then press the ENTER/CONFIRM input 214 to store the value in the controller 102, as shown in a Confirm Date/Time Change screen 3204. Once the user is satisfied with the value, pressing "ENTER/CONFIRM" again will deselect the parameter and store the value into its respective location.

Figure 33A:
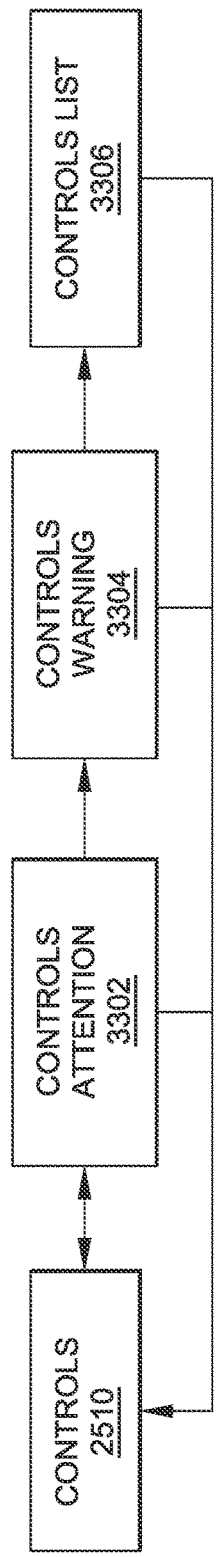
FIG. 33A is a block diagram of the Controls submenu of the user interface.
Figure 33B:
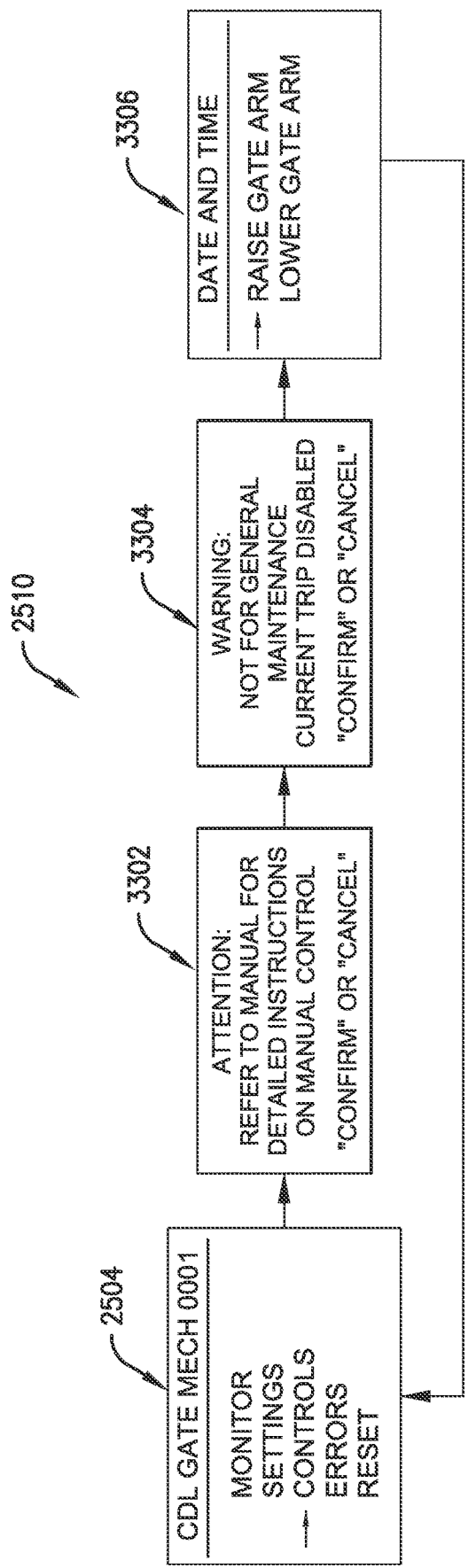
FIG. 33B is a GUI representation of the Controls submenu.

FIG. 33A is a block diagram of the Controls 2510 submenu and FIG. 33B is a GUI representation of the Controls 2510 submenu. The Controls 2510 submenu provides the user an option to override the over current detection of the controller 102 and move the gate arm 20 between the generally vertical position to the substantially horizontal position. Having the ability to control the gate arm 20 rotation position via the controller 102 within the gate mechanism enclosure 122 is beneficial in instances when the gate arm 20 and/or the counterweights 28 are broken away from the counterweight arm 24. If the gate arm 20 is broken away and the counterweights 28 remain, the gate arm shaft 112 will rotate to what is the generally vertical position of the gate arm 20. Because the counterweight arms 24 are off balance, the gate arm shaft 112 will not be able to rotate from the vertical position without tripping the current sensor. For example, if a command signal from the crossing control logic unit 36 is received by the controller 102 commanding the gate arm 20 to be rotated to the horizontal position, the controller 102 will detect an over current error and command the motor 108 to stop. In the opposite situation, if the counterweights 28 are broken away from the counterweight arm 24, the gate arm 20 will drop to the horizontal position and cause an over current error each time the gate arm 20 is commanded to rotate to the vertical position. Therefore, a manual override to the crossing gate mechanism 100 is beneficial for repair and/or maintenance of the crossing gate mechanism 100. In either instance described above, an override to the operation of the over current detection circuit is necessary to rotate the gate arm 20 between the vertical and horizontal positions. However, it is noted that an absolute maximum current trip is stored by the controller 102 to protect the motor 108 and other electrical components of the crossing gate mechanism 100.

In the exemplary embodiment, the Controls 2510 submenu includes a Controls Attention screen 3302 to instruct the user to refer to the user manual for instruction on manual control of the crossing gate mechanism 100. Pressing the MENU/CANCEL input 216 returns the user to the main menu 2504. Pressing the ENTER/CONFIRM input 214 causes the user interface 104 to display a Controls Warning screen 3304 that indicates to the user that the control functions are not for general maintenance purposes. Pressing the MENU/CANCEL input 216 returns the user to the main menu 2504. Pressing the ENTER/CONFIRM input 214 causes the user interface 104 to display a Controls List 3306 that lists the control functions available to the user.

Figure 34A:
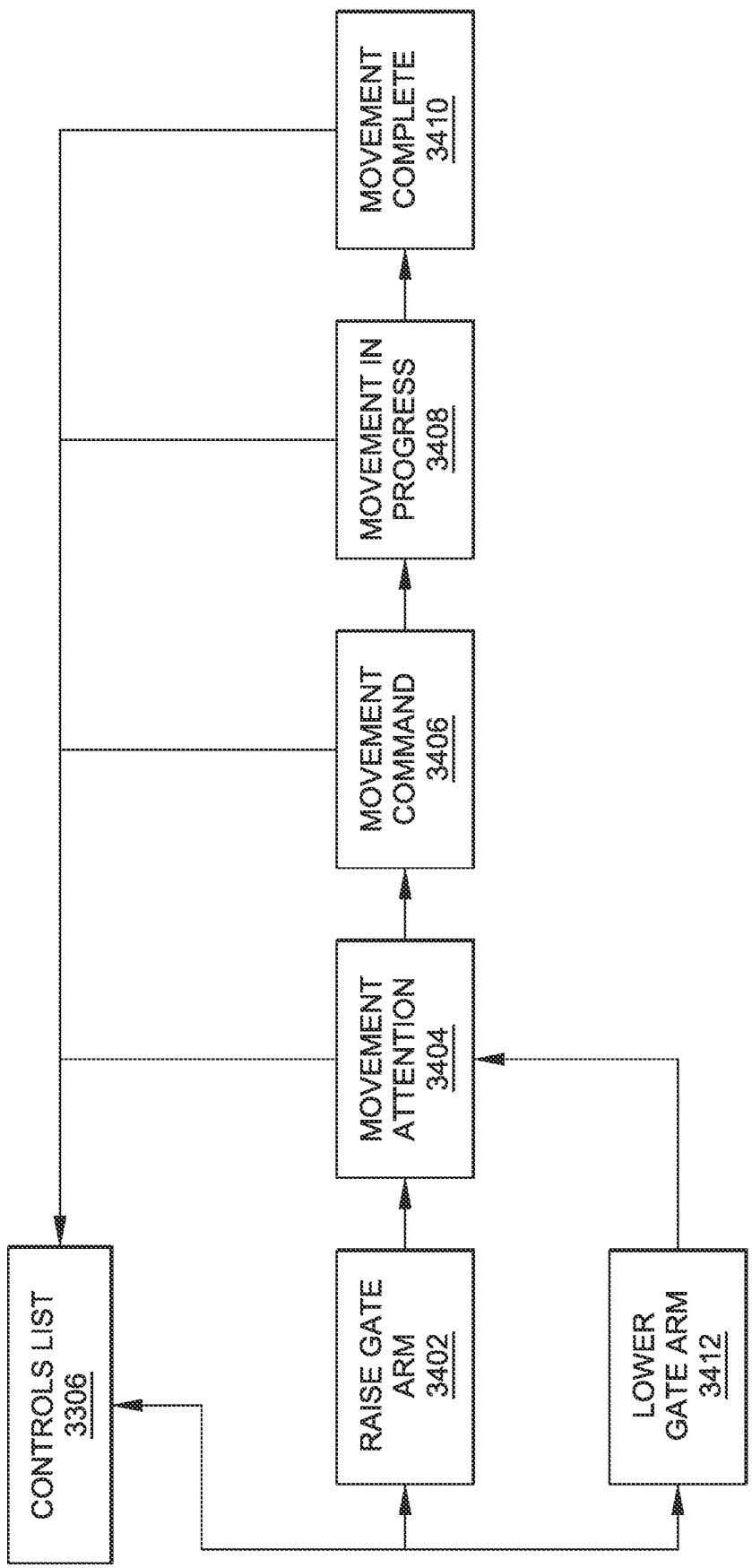
FIG. 34A is a block diagram of the Controls List of the Controls submenu as depicted in FIG. 33A.
Figure 34B:
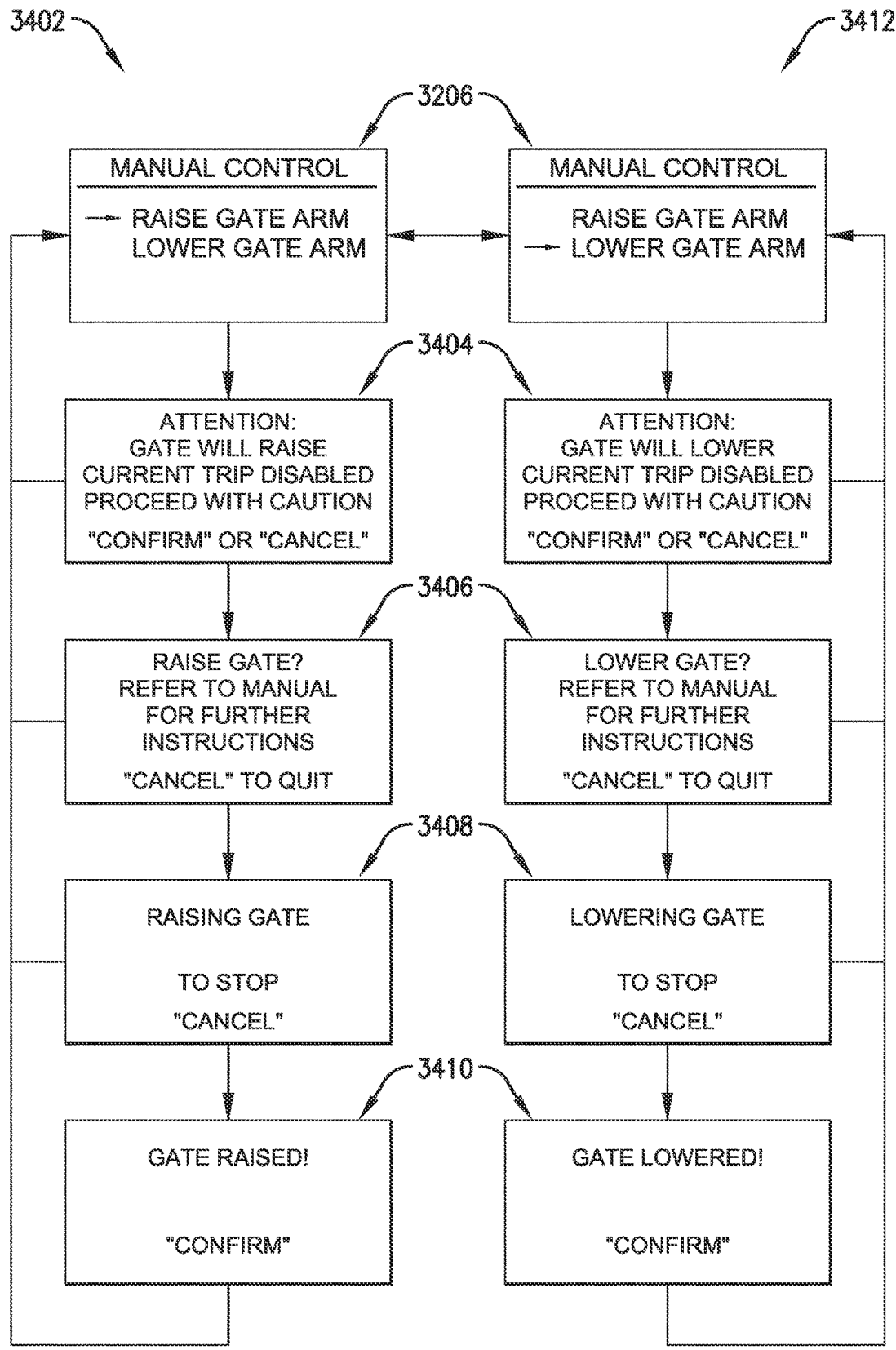
FIG. 34B is a GUI representation of the Controls List and its submenus.

FIG. 34A is a block diagram of the Controls List 3306 and FIG. 34B is a GUI representation of the Controls List 3306 and its submenus. The Controls List 3306 includes two (2) options: a Raise Gate Arm 3402 submenu and a Lower Gate Arm 3412 submenu. Because these submenus enable the user to override the operational current limit protection and operates the motor 108 to rotate the gate arm 20 regardless of any command signals received from the crossing control logic unit 36, the user is required to acknowledge a Movement Attention screen 3404 by pressing the ENTER/CONFIRM input 214.

After the Movement Attention screen 3402 has been acknowledged, the user is presented a Movement Command screen 3406. The Movement Command screen 3406 displays either an option to raise or lower the gate arm 20, based on the user's selection of one of the options presented at the Controls List 3306. In addition, the user is instructed to refer to the user manual for further instructions concerning the manual operation of the crossing gate mechanism 100. In the exemplary embodiment, the command for operating the gate arm 20 is described in the user manual to ensure that the user cannot rotate the gate arm 20 upward or downward in an unsafe manner without first referring to the user manual and reading the potential dangers of using the override controls. In the exemplary embodiment, the input combination command for raising the gate is the simultaneous input of the UP input 218 and the ENTER/CONFIRM input 214, and the command for lowering the gate is the simultaneous input of the DOWN input 220 and the ENTER/CONFIRM input 214. If the proper command is input by the user, the gate arm 20 will begin rotating upward or downward. During movement, the user interface 104 displays a Movement in Progress screen 3408. When the movement is complete, the user interface displays a Movement Complete screen 3410. The user may press the MENU/CANCEL input 216 at any of the submenu screens to stop any movement of the gate arm 20 and return to the Controls List 3306 menu.

FIG. 35A is a block diagram of the Errors 2512 submenu, and FIG. 35B is a GUI representation of the Errors 2512 submenu. In the exemplary embodiment, the Errors 2512 submenu presents to the user errors that are logged by the controller 102 along with a date, time, and any other relevant data associated with the logged error. Logging errors of the crossing gate mechanism 100 facilitates reducing troubleshooting time by a user. Example errors that are logged by the controller 102 include, without limitation, motor over current, motor over and under voltage, gate arm angle past limits, motor relay failure, sensor failure, and broken gate arm. An error log may reduce troubleshooting time when investigating a cause of a faulted crossing gate mechanism 100 by giving the user immediate feedback of a location or, in some instances, a specific component in which the controller 102 has detected a problem. Therefore, in certain instances, the crossing gate mechanism 100 is able to provide sufficient feedback to substantially reduce the time it takes to get the crossing gate mechanism 100 operating correctly.

In the exemplary embodiment, the Error screen 2512 lists errors in reverse chronological order. Each error includes a four digit error code and a date/time stamp of when the error occurred. While on the Error screen 2512, the user can select an error, for example, by pressing the UP input 218 or the DOWN input 220 to highlight the error and pressing the ENTER/CONFIRM input 214 to display the relevant information of the selected error on an Error Details screen 3502. The Error Details screen 3502 displays the four digit error code, an error name, a brief description of the error, relevant data that caused the error, and a date/time stamp of when the error occurred. If the user presses the ENTER/CONFIRM input 214, a Clear Error screen 3504 is displayed by the user interface 104. The Clear Error screen 3504 allows the user to clear the error by pressing the ENTER/CONFIRM input 214 or keep the error in the error log by pressing the MENU/CANCEL input 216. If the user chooses to clear the error, the error is removed from the error log as shown in the updated Error screen 3506.

The controller 102 facilitates trouble shooting in the field by monitoring the crossing gate mechanism 100 and logging/displaying errors that do occur. In the exemplary embodiment, the controller 102 includes a current monitor, a movement monitor, and a relay monitor. The current monitor continuously monitors the electrical current supplied to the motor 108. If the electrical current exceeds a predetermined maximum limit, it may be an indication that one or more of the motor 108, the gear train 110, the gate arm shaft 112, or the gate arm 20 is obstructed. In the event of an over current detection, the average current, max current, over current angle, and direction are all recorded as part of the error. The error allows the user to identify the electrical current value that tripped the crossing gate mechanism 100, the maximum electrical current detected, and the direction of rotation of the gate arm 20 when the error occurred. The controller 102 will deactivate the motor 108 and apply a snubber circuit (not shown) when over current is detected to keep from damaging the crossing gate mechanism 100.

It is noted that in the exemplary embodiment, the controller 102 will operate to maintain the safety of the crossing gate mechanism 100 based on each detected error. For example, if a detected error is one that could cause damage to components of the crossing gate mechanism 100, render the crossing gate mechanism 100 unsafe, or render crossing unsafe, the error flags the controller 102 to act to prevent accidents. In one particular example, if the controller 102 detects that the motor 108 is drawing too much electrical current during an upward rotation of the gate arm 20, then the over current error will flag the controller 102 to turn off the motor 108 and turn on the snubber circuit to affect a slow descent of the gate arm 20, putting the gate arm 20 into a fail-safe state. This type of error is called a soft error. With soft errors, the controller 102 will automatically reset the error flag after a predetermined recovery period and subsequently attempt to rotate the gate arm 20 upward again if crossing control logic 38 is continuing to transmit a command signal to rotate to gate arm 20 upward.

The movement monitor of the controller 102 continuously detects changes in the angle or degree position detected by the encoder 120. The movement monitor also uses the output signals from the proximity sensor 160 to cross reference with the position indicated by the encoder 120. If the encoder 120 and proximity sensor 160 outputs indicate a difference greater than an acceptable limit (e.g., ±two degrees (2°)) or if the encoder angle changes sporadically, the controller 102 will alert the user with an error that indicates that the encoder 120 requires calibration or replacement. However, if the encoder 120 detected position changes consecutively over a short range of time without a movement command, the controller 102 can determine that the gate arm shaft 112 was rotated by an external force. Such a rotation may be indicative of the gate arm 20 or the counterweights 28 being broken away from the one or more of the counterweight arms 24. The error can be narrowed down based on the direction of rotation of the gate arm shaft 112. For example, if the gate arm 20 is broken, the angle positions received from the encoder 120 will indicate an ascending condition, whereas if the counterweights 28 are broken, the angle positions indicate a descending condition. When such an error occurs, the controller 102 may activate the snubber circuit until the gate arm shaft 112 comes to a stop. This will slow down the rate of speed of the gate arm 20 and reduce the chances of injury and/or damage to the crossing gate mechanism 100. This type of error is considered a hard error. Unlike a soft error, a hard error cannot automatically be reset by the controller 102. If the controller 102 detects a hard error, the controller 102 locks out all automatic movement functions until the error is cleared by a user.

The relay monitor continuously compares the status of a plurality of relays (not shown) to an expected state of the respective relay. Each relay has a feedback loop to the controller 102. The relays monitored by the controller 102 include four (4) motor relays oriented in an H-bridge, a snubber circuit relay, a brake relay, two (2) status indication relays for 'gate clear' and 'gate down' orientations, three (3) auxiliary contact relays, and a bell relay. If one or more relays vital to proper functioning of the crossing gate mechanism 100, such as the motor relays, snubber circuit relay, or brake relay, fail or produce a feedback signal that is inconsistent with an expected state of the relay, the controller 102 will set a hard error specific to the respective relay. The controller 102 will hold the gate arm 20 in the substantially horizontal, or downward, position until the error is cleared by a user. If the relay is not vital to the crossing gate mechanism 100 function, the controller 102 will set a soft error and record the error for the user to acknowledge during inspection of the crossing gate mechanism 100.

Advantageously, embodiments of the present disclosure provide a user interface and controller at a crossing gate mechanism, separate from the traditional control shelter. The controller enables a user to operate the gate mechanism independent of the crossing control logic unit contained in the control shelter. The controller further enables a user to calibrate the crossing gate mechanism and/or diagnose error conditions of the crossing gate mechanism. Another advantage of the present disclosure is that a digital encoder and position sensor is provided to monitor a position of a gate arm of the crossing gate mechanism, eliminating a need for the typical cam lobe assembly that requires course field adjustments. This facilitates reducing the time for troubleshooting the crossing gate mechanism, as well as increasing the accuracy and safety of the crossing gate mechanism.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

Those of ordinary skill in the art will appreciate that any suitable combination of the previously described embodiments may be made without departing from the spirit of the present invention.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

What is claimed is:

1. A crossing gate mechanism comprising:
   a gate mechanism enclosure defining an interior space;
   a terminal board mounted inside the interior space of the gate mechanism enclosure,
   said terminal board being swingable relative to the gate mechanism enclosure between an operative configuration, in which the terminal board overlies a portion of the interior space, and an access configuration, in which the terminal board is swung away from the operative configuration such that said portion of the interior space is accessible; and
   an electrical component located within said portion of the interior space, such that the electrical component is substantially inaccessible when the terminal board is in the operative configuration and accessible when the terminal board is in the access configuration, said terminal board being selectively secured in the operative configuration so as to restrict access to the electrical component.

2. A crossing gate mechanism as claimed in claim 1, further comprising:

at least one closure component selectively securing the terminal board in the operative configuration.

3. A crossing gate mechanism as claimed in claim 2, said at least one closure component comprising a threaded fastener threadably engageable with the gate mechanism enclosure.

4. A crossing gate mechanism as claimed in claim 2, further comprising:

external wires located at least substantially outside the gate mechanism enclosure, said external wires being connected to the terminal board, said terminal board electrically coupling the electrical component to one or more of the external wires.

5. The crossing gate mechanism as claimed in claim 1, further comprising:

a controller positioned within the interior space, with the controller being operably coupled to the electrical component and configured to monitor and/or control the electrical component, and said controller being supported on the terminal board for swinging movement therewith.

6. The crossing gate mechanism as claimed in claim 5, said controller comprising an operator panel operable to receive input from a user, said controller providing a user interface displayed by the operator panel, said controller being operable to present information associated with the electrical component on the user interface.

7. The crossing gate mechanism as claimed in claim 6, said operator panel comprising one or more input devices operable to receive the input from the user, said operator panel comprising a display operable to display the user interface, said one or more input devices and said display being accessible to the user when the terminal board is in the operative and access configurations.

8. The crossing gate mechanism as claimed in claim 1, further comprising:

a hinge swingably coupling the terminal board to the gate mechanism enclosure.

9. The crossing gate mechanism as claimed in claim 8, said hinge comprising a lift off hinge, such that the terminal board is removable from the gate mechanism enclosure, when the terminal board is unsecured from the operative configuration.

10. The crossing gate mechanism as claimed in claim 1, said gate mechanism enclosure comprising a base and a lid together at least in part defining the interior space, said lid being movably positionable relative to the base, such that the gate mechanism enclosure is shiftable between a closed configuration, in which the terminal board is substantially enclosed, and an opened configuration, in which the terminal board is accessible to a user.

11. The crossing gate mechanism as claimed in claim 10, said base comprising a back panel, a top wall, a bottom wall, laterally opposite sidewalls, and at least one upstanding wall extending outward relative to the back panel.

12. The crossing gate mechanism as claimed in claim 11, one of said laterally opposite sidewalls including a first outer edge relative to the back panel, said first outer edge defining a mounting surface, said terminal board being swingably coupled to the mounting surface by a mounting component.

13. The crossing gate mechanism as claimed in claim 12, said at least one upstanding wall comprising a second outer edge relative to the back panel, said second outer edge defining a support surface, said at least one upstanding wall including at least one securing structure.

14. The crossing gate mechanism as claimed in claim 13, further comprising:

at least one closure component selectively securing the terminal board in the operative configuration.

15. The crossing gate mechanism as claimed in claim 14, said at least one closure component comprising a threaded fastener threadably engageable with the at least one securing structure.

16. The crossing gate mechanism as claimed in claim 12, said mounting component comprising a hinge.

17. The crossing gate mechanism as claimed in claim 16, said hinge comprising a lift off hinge, such that the terminal board is removable from the gate mechanism enclosure, when the terminal board is unsecured from the operative configuration.

18. The crossing gate mechanism as claimed in claim 1, further comprising:

a swingable gate arm; and a rotatable gate arm shaft fixed to the gate arm so that rotation of the gate arm shaft corresponds with swinging of the gate arm, said gate arm shaft extending through the gate mechanism enclosure, said gate arm shaft being rotatable between a first position and a second position, said electrical component comprising an electronic sensor assembly operably coupled to the gate arm shaft to sense an angular position of the gate arm.

19. The crossing gate mechanism as claimed in claim 18, said gate mechanism enclosure comprising a base and a lid together at least in part defining the interior space, said lid being movably positionable relative to the base, such that the gate mechanism enclosure is shiftable between a closed configuration, in which the terminal board and electronic sensor are substantially enclosed, and an opened configuration, in which the terminal board is accessible to a user, said base comprising a back panel, a top wall, a bottom wall, laterally opposite sidewalls, and at least one upstanding wall extending outward relative to the back panel, said electronic sensor assembly coupled to the back panel of the base.

20. The crossing gate mechanism as claimed in claim 19, said terminal board comprising a front surface, an opposite back surface, and plurality of double-sided terminals, each double-sided terminal extending through the terminal board such that a first terminal portion extends outward from the front surface and a second terminal portion extends outward from the back surface; and a local electrical connection between the second terminal portion of one of the double-sided terminals and the electrical component, said local electrical connection being substantially inaccessible when the terminal board is in the operative configuration, and accessible for servicing when the terminal board is in the access configuration.

21. The crossing gate mechanism as claimed in claim 1, said terminal board comprising a front surface, an opposite back surface, and plurality of double-sided terminals, each double-sided terminal extending through the terminal board such that a first terminal portion extends outward from the front surface and a second terminal portion extends outward from the back surface;

a plurality of power and control wires extending into the interior space of the gate mechanism enclosure, the power and control wires coupled to a remote crossing control logic unit located remote from the crossing gate mechanism, each power and control wire being coupled to the first terminal portion of one of the double-sided terminals; and a local electrical connection wire, said local electrical connection wire being coupled to the second terminal portion of one of the double-sided terminals and the electrical component, said local electrical connection wire being substantially inaccessible when the terminal board is in the operative configuration, and accessible for servicing when the terminal board is in the access configuration.

22. The crossing gate mechanism as claimed in claim 21, said terminal board including a cable management opening defined therethrough, said plurality of power and control wires being routed through the cable management opening to access the first terminal portions of the double-sided terminals.

* * * * *